United States Patent [19]

Neches

[11] Patent Number: 4,814,979
[45] Date of Patent: Mar. 21, 1989

[54] NETWORK TO TRANSMIT PRIORITIZED SUBTASK POCKETS TO DEDICATED PROCESSORS

[75] Inventor: Philip M. Neches, Pasadena, Calif.

[73] Assignee: Teradata Corporation, Los Angeles, Calif.

[21] Appl. No.: 755,436

[22] Filed: Jul. 16, 1985

Related U.S. Application Data

[62] Division of Ser. No. 601,808, Apr. 19, 1984, Pat. No. 4,543,630, which is a division of Ser. No. 250,094, Apr. 1, 1981, Pat. No. 4,445,171.

[51] Int. Cl.$^4$ .......................... G06F 13/38; G06F 7/00
[52] U.S. Cl. ...................................... 364/200; 370/94; 340/825.02
[58] Field of Search ........... 340/825.02, 825.5, 825.52; 370/85, 94, 60; 379/269; 364/200 MS File, 900 MS File

[56] References Cited

U.S. PATENT DOCUMENTS

| | | | |
|---|---|---|---|
| 3,944,723 | 3/1976 | Fong | 340/825.02 |
| 4,145,733 | 3/1979 | Misunas et al. | 364/200 |
| 4,156,798 | 5/1979 | Doelz | 364/200 X |
| 4,228,496 | 10/1980 | Katzman et al. | 364/200 |
| 4,251,861 | 2/1981 | Mago | 364/200 |
| 4,344,134 | 8/1982 | Barnes | 364/200 |
| 4,347,498 | 8/1982 | Lee et al. | 340/825.02 |
| 4,388,683 | 6/1983 | Beifuss et al. | 364/200 |
| 4,434,463 | 2/1984 | Quinquis et al. | 364/200 |
| 4,718,002 | 1/1988 | Carr | 364/200 |

Primary Examiner—Raulfe B. Zache
Assistant Examiner—Thomas C. Lee
Attorney, Agent, or Firm—Merchant & Gould

[57] ABSTRACT

A multiprocessor system intercouples the processors with an active logic network having a plurality of priority determining nodes. Messages applied concurrently to the network in groups are sorted, using the data content of the messages, to a single or common priority message which is distributed to all the processors with a predetermined total network delay time. Losing messages are again retried concurrently in groups at a later time. Message routing is determined by local acceptance or rejection of messages at the processors, based upon destination data in the messages. All messages occupy places in a coherent priority scheme and are transferred in contending groups with prioritization on the network. Using data, status, control and response messages, and different multiprocessor modes, the system is particularly suited for configuration in a relational data base machine having capability for maintaining an extended data base and handling complex queries.

26 Claims, 33 Drawing Sheets

FIG.10

```
                                    05XX
        ┌ TOP ┐  INCOMING          0518
        │ GET │  MESSAGE           0517
        │ PUT │  BUFFER            0516
  DATA  │ BOT ┘  POINTERS          0515
MESSAGE ┤
POINTERS│ TOP ┐  OUTPUT            0514
        │ GET │  MESSAGE           0513
        │ PUT │  COMPLETE          0512
        └ BOT ┘  BUFFER            0511
                 POINTERS          0510
        ┌ 0F  NAP                  050F
        │ 0E  ACK                  050E
        │ 0D  SACK/INITIAL         050D
        │ 0C  SACK/NOW PARTICIPANT 050C
        │ 0B  SACK/DONE            050B
        │ 0A  SACK/RECEIVE RDY     050A
        │ 09  SACK/SEND RDY        0509
RESPONSES┤ 08  SACK/WAITING         0508
        │ 07  SACK/BUSY            0507
        │ 06  SACK/ASSIGNED        0506
        │ 05  SACK/UNASSIGNED      0505
        │ 04  NA                   0504
        │ 03  NAK/OVERRUN          0503
        │ 02  NAK/TN ERROR         0502
        │ 01  NAK/LOCKED           0501
        └ 00  NA                   0500
```

COMMAND CODE — RESPONSES AND POINTERS STORED IN DIRECTORY RESPONSE SECTION OF H.S. RAM — LOCATION (HEX)

FIG.11

| COMMAND CODE | TAG | COMMAND DESCRIPTION |
|---|---|---|
| 00 |  | NA |
| 01 | OPID | NAK/LOCKED |
| 02 | OPID | NAK/TN ERROR |
| 03 | OPID | NAK/OVERRUN |
| 04 | OPID | NA |
| 05 | OPID | SACK/UNASSIGNED |
| 06 | OPID | SACK/ASSIGNED |
| 07 | OPID | SACK/BUSY |
| 08 | OPID | SACK/WAITING |
| 09 | OPID | SACK/SEND READY |
| 0A | OPID | SACK/RECEIVE READY |
| 0B | OPID | SACK/DONE |
| 0C | OPID | SACK/NON-PARTICIPANT |
| 0D | OPID | SACK/INITIAL |
| 0E | OPID | ACK |
| 0F | OPID | NAP |
| 10 | TNO | STOP MERGE |
| 11 | TN | DATA MESSAGE |
| 12 | TN | ' |
| 13 | TN | ' |
| 14 | TN | ' |
| 15 | TN | ' |
| 16 | TN | ' |
| 17 | TN | ' |
| 18 | TN | ' |
| 19 | TN | ' |
| 1A | TN | ' |
| 1B | TN | DATA MESSAGE |
| 1C | TN | STATUS REQUEST |
| 1D | TN | RELINQUISH TN |
| 1E | TN | ASSIGN TN |
| 1F | TN | START MERGE |

RESPONSES / PRIMARY MESSAGES

MESSAGE PRIORITY PROTOCOL

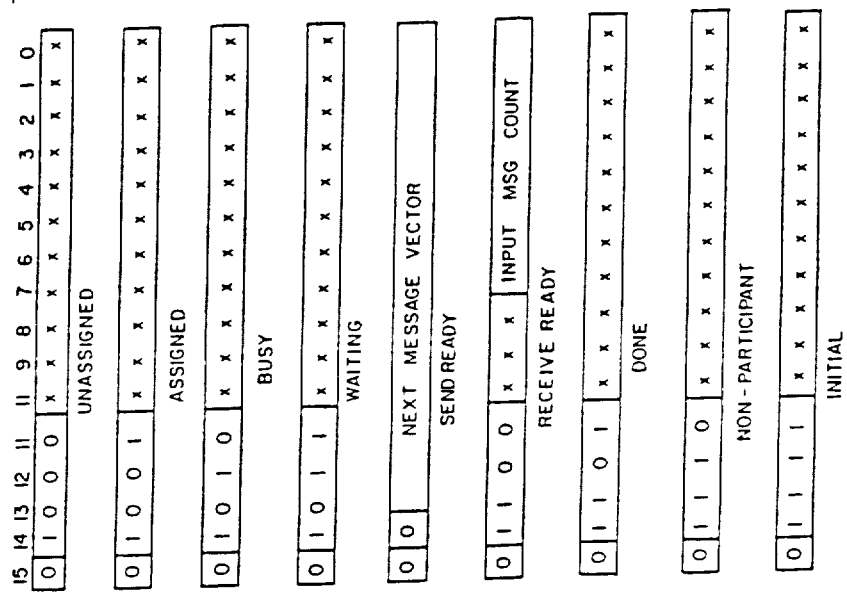
FIG.12 TRANSACTION NUMBER WORD FORMAT

FIG. 18

RESPONSE GENERATION AND ACTION

|  | | LOCK | TNER | OVER | S-UNASSIGNED (UAS) | S-ASSIGNED (ASG) | S-BUSY (BSY) | S-WAITING (WAT) | S-SEND REG. RDY (SRD) | S-RECV REG. RDY (RRD) | S-DONE (DNE) | S-INACTIVE (INA) | S-INITIAL (INT) | ACKR | NAPR |
|---|---|---|---|---|---|---|---|---|---|---|---|---|---|---|---|
| DATA | RESP | L | 1 | 2 | * | * | * | * | * | * | * | * | * | 12 | 13 |
|  | ACT | R | RP | RP | E | E | E | E | E | E | E | E | E | 14 | R |
| STOP | RESP | L | * | * | * | * | * | * | * | * | * | * | * | 18 | 19 |
|  | ACT | R | E | E | E | E | E | E | E | E | E | E | E | RP | RP |
| STATUS | RESP | L | * | * | 3 | 4 | 5 | 6 | 7 | 8 | 9 | 10 | 11 | * | 19 |
|  | ACT | R | E | E | R | R | R | R | R | R | R | R | R | E | R |
| RELQ | RESP | L | * | * | * | * | * | * | * | * | * | * | * | 18 | 19 |
|  | ACT | R | E | E | E | E | E | E | E | E | E | E | E | 15 | R |
| ASGN | RESP | L | 20 | * | * | * | * | * | * | * | * | * | * | 21 | 19 |
|  | ACT | R | R | E | E | E | E | E | E | E | E | E | E | 16 | R |
| STRT | RESP | L | * | * | 3 | 4 | 5 | 6 | 7 | 8 | 9 | 10 | 11 | * | 19 |
|  | ACT | R | E | E | R | R | R | R | 17 | R | R | R | R | E | R |

PRIMARY MESSAGE

\* = NOT A VALID RESPONSE

1 = LOCK·MAP≠O·
  TN≠(RRD+DNE·INA+INT)

2 = LOCK·MAP≠O·
  TN≠(RRD (TN=ASSIGNED)

3 = LOCK·MAP≠O·
  TN=UAS

4 = LOCK·MAP≠O
  (TN=ASSIGNED)

5 = LOCK·MAP≠O·
  TN=BSY

6 = LOCK·MAP≠O·
  TN=WAT

7 = LOCK·MAP≠O·
  TN=SRD

8 = LOCK·MAP≠O·
  TN=RRD

9 = LOCK·MAP≠O·
  TN=DNE

10 = LOCK·MAP≠O·
  TN=INACTIVE

11 = LOCK·MAP≠O·
  TN=INT

12 = LOCK·MAP≠O·
  TN=RRD·TNCT≠O·PUT≠GET

13 = LOCK·[MAP≠O·
  TN≠(DNE+INA+INT)+MAP=O]

14 = ACCEPT(TN-1)→TN.
  I/O INTERRUPT IF TN=RRD.
  MAP≠O ELSE REJECT

15 = UNASSIGNED
  →TN IF MAP≠O

16 = ASSIGNED
  →TN IF MAP≠O

17 = REJECT,TN→PTNR
  NOTE: NO TNCK MACE

RP = REJECT
  O→PTNR

R = REJECT FROM INPUT BUFFER

L = INTERFACE LOCKED

18 = LOCK·MAP≠O

19 = LOCK·MAP =O

20 = LOCK·MAP≠O·
  TN≠(UAS+INT)

21 = LOCK·MAP≠O·
  TN=(UAS+INT)

E = ERROR

RESP = RESPONSE
  GENERATION

ACT = ACTION UPON
  RECEIVED RESPONSE

MSG SEND CYCLE

A. SEND MESSAGE FORMAT

B. RECEIVE MESSAGE FORMAT

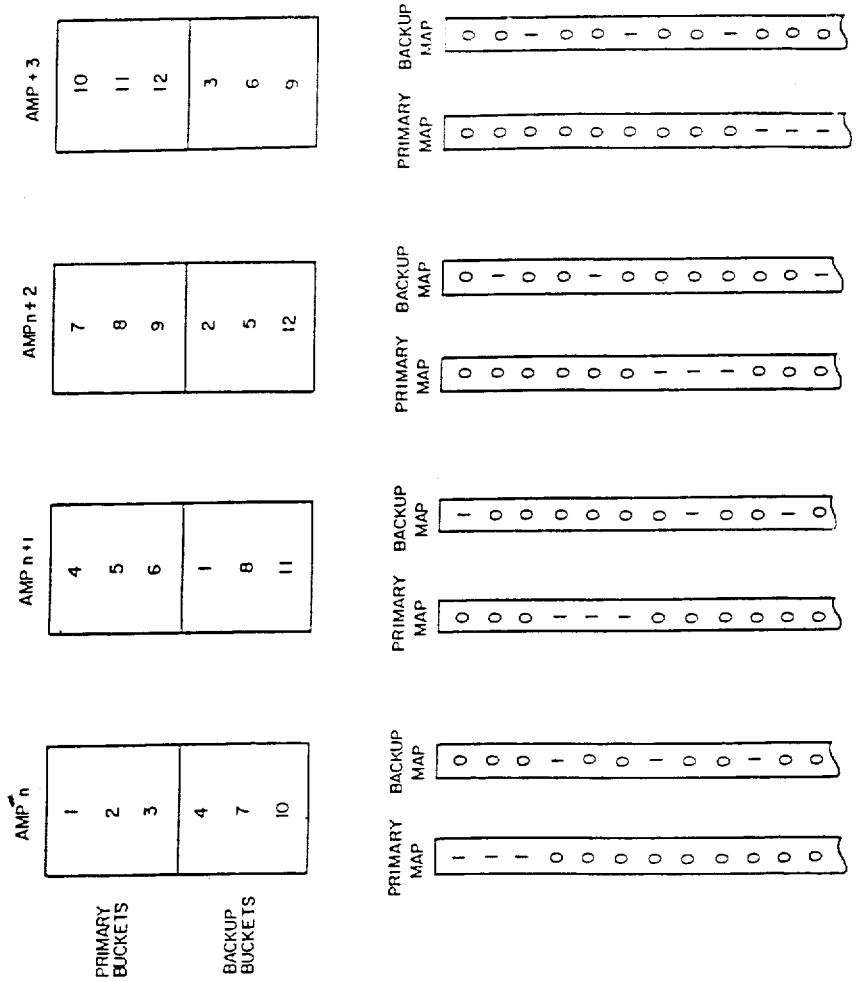
FIG. 22 — SIMPLIFIED EXAMPLE OF THE ASSIGNMENT OF HASH BUCKETS TO PROCESSORS 4,814,979

NETWORK TO TRANSMIT PRIORITIZED SUBTASK POCKETS TO DEDICATED PROCESSORS

This is a divisional of application Ser. No. 601,808, filed Apr. 19, 1984, now U.S. Pat. No. 4,543,630, issued Sept. 24, 1985, which is a divisional application of U.S. Pat. No. 4,445,171, issued Apr. 24, 1984, of Philip M. Neches.

BACKGROUND OF THE INVENTION

Since the advent of the electronic computer in reliable form, workers in the art have given much consideration to systems employing a number of computers functioning together in interrelated fashion to accomplish a given overall task. In some of these multiprocessor systems a large computer utilizes its superior speed and capacity to perform the complex portions of a program, but assigns smaller and slower satellite processors the less complicated and less urgent tasks in order to reduce the load and demands upon the large computer. The large computer is required to undertake the responsibilities of assigning subtasks, making sure that the smaller processors are kept occupied, ascertaining the availability and performance of the smaller processors, and providing a unified result.

Other multiprocessor systems utilize a different approach, employing multiple processors and a common bus system, with the processors having essential equality of function. In this type of system, separate control computers or control systems are often used to monitor the availability and capability of an individual processor for a given subtask, and to control the routing of tasks and information between processors. The processors may be arranged and operated so that they themselves monitor the status and availability of the other processors and determine the routing of messages and programs. The common and substantial drawback of these systems is that the software and operating time required for overhead and maintenance functions interfere with the performance of the principal objectives. Problems of routing and monitoring may increase quadratically in relation to the number of processors involved, so that ultimately a disproportionate amount of effort is spent in overhead functions.

The following are some patents that are illustrative of the state of the art:

| | |
|---|---|
| 3,962,685 | Belle Isle |
| 3,962,706 | Dennis et al |
| 4,096,566 | Borie et al |
| 4,096,567 | Millard et al |
| 4,130,865 | Heart et al |
| 4,136,386 | Annunziata et al |
| 4,145,739 | Dunning et al |
| 4,151,592 | Suzuki et al |

Since the days of the early "Binac" (two parallel processors) and comparable systems it has been recognized that a multiprocessor provides a redundant capability that can substantially improve the overall reliability of an operating system. Actual installations of multiprocessor systems have until recently been quite limited, largely due to the extensive software problems involved. Nonetheless, the advantages of multiprocessor operation for real time applications and other situations in which system down time cannot be tolerated have led to the development of systems which are successful in operation but which nevertheless involve significant commitments to overhead software and operating time. Illustrative of these are U.S. Pat. Nos. 3,445,822, 3,566,363 and 3,593,300, all relating to a system in which multiple computers access a single shared main memory, and in which capabilities and requirements are compared in order to assign tasks optimally to individual processors.

Another example of the prior art is U.S. Pat. No. 4,099,233, in which a number of processors share a single bus and a control unit incorporating a buffer register is used in the transfer of data blocks between a transmitting miniprocessor and a receiving miniprocessor. This concept has been employed in a distributed mail sorting system in Europe.

U.S. Pat. No. 4,228,496 pertains to a commercially successful multiprocessor system in which buses between processors are coupled to bus controllers which monitor transmissions and determine the priority of data transfers between processors, each of which can be coupled in to control a certain part of a number of peripheral devices.

The "Ethernet" system (U.S. Pat. Nos. 4,063,220 and 4,099,024) being jointly promoted by Xerox Hewlett-Packard and Intel evidences another approach to the problem of intercommunicating between different processors and peripherals. All units are coupled to a common multiple access network and compete for priority. Collision detection is based upon time priority, which in turn means that global capabilities cannot readily be controlled, coordinated or given specificity.

Details of these complex systems can only be fully appreciated by close analysis of the patents and any related publications. However, review will show in each instance that the prioritizing of data transfer and the selection of processors requires extensive intercommunication and supervisory control if tasks are to be shared. Expansion of the systems to include additional processors does not present identical problems with these different systems, but in each instance substantially complicates system software, applications programming, hardware, or all three. Analysis will show that inherent constraints on multiprocessor system size and capability are imposed by the usage of one or two logically passive ohmic busses. While different techniques can be employed to facilitate intercommunication, such as the grouping of subsystems into global resources evidenced in recent U.S. Pat. No. 4,240,143, the amount of useful traffic must reach a limit and variable delays impose insuperable problems when large numbers of processors are used. Situations can arise in which one or more processors become locked out or deadlocked, and these circumstances in turn require added circuitry and software to resolve the problems. The impracticality of substantially extending the number of processors, say to 1024, thus becomes evident.

It is desirable for many applications to depart from the constraints of these existing approaches and to utilize modern technology to best advantage. The lowest cost technology available today is based upon mass produced microprocessors, and high capacity rotating disk memories, such as Winchester technology devices using small head to disk spacing in a sealed environment. It is desirable to be able to expand a multiprocessor system without disproportionate or even concomitant software complexity. It is desirable further to be able to handle computer problems that may be characterized as having a distributed structure, in which an overall function can be dynamically subdivided into limited or iterative processing tasks. Virtually all data base machines fall into this category, which also includes such other typical examples as sorting, pattern recognition and correlation, digital filtering, large matrix computations, simulation of physical systems and the like. In all of these situations there is a requirement for widely dispersed, relatively straight-forward individual processing tasks with a high instantaneous task load. This situation unduly burdens prior art multiprocessor systems because it tends to increase the time and software involved in overhead, and because practical difficulties arise in implementation of the systems. Using a shared passive bus, for example, propagation rates and data transfer times introduce an absolute barrier as to the rate at which transactions can be processed.

Data base machines thus provide a good example of the need for improved multiprocessor systems. Three basic approaches, namely the hierarchical, network, and relational, have been proposed for the implementation of large scale data base machines. The relational data base machine, which permits easier user access to given data in a complex system by using tables of relationships, has been recognized as having powerful potential. Typical publications, such as an article entitled "Relational Data Base Machines", published by D. C. P. Smith and J. M. Smith, in the March 1979 issue of IEEE Computer magazine, p. 28, U.S. Pat. No. 4,221,003 and articles cited therein illustrate the state of the art.

Sorting machines also provide an example of the need for improved computing architecture. A review of sorting machine theory can be found in Searching and Sorting by D. E. Knuth, pp. 220-246, published (1973) by Addison-Wesley Publishing Co., Reading, Mass. A number of networks and algorithms are disclosed that must be studied in detail to appreciate their limitations, but it is generally true that they are typically complex schemes having only specific sorting purposes. Another example is provided by L. A. Mollaar in an article entitled "A Design for a List Merging Network", in the IEEE Transactions on Computers, Vol. C-28 No. 6, June 1979 at pp. 406-413. The network proposed utilizes external control of network merge elements and requires programming to perform specific functions.

Various workers in the are have considered and are considering specialized memory and system approaches that are intended to improve access to and maintenance of information in a relational data base. These approaches evidence the general recognition of the desirability of the relational data base machine. In their present forms, however, they violate the principle of utilizing the most advantageous cost per bit technology that is presently available, because they inherently require development of futuristic systems of ultimately unknown performance and economic viability. Furthermore, these proposals are so preliminary in nature that they cannot for some time confront the practical difficulties involved with a working data base machine, in which data must not only be accessed, but must further be updated, corrected as necessary, sorted, merged, rolled back, recovered, and otherwise manipulated to meet the user's requirements. The incorporation of other features, such as a capability for expansion of the system, would tend to further delay practical usage of such system.

Significant recent work on relational data base machines has been concerned with responding interactively to ever more complex queries. However, the ability to answer high level and sophisticated queries and the resultant ease of use and user productivity should not impose penalties on the user in terms of throughput and response time. It is also evident that, where a large data base has been accumulated in an organization, the needs of different activities seeking information from the data base can vary widely, and thus to meet all the needs satisfactorily requires extensive knowledge of the system. Although some systems have been devised that perform all of the needed functions, they do so only for small data bases and at great expense.

It is highly desirable for many organizations to be able to utilize a given large main frame system, while obtaining the further cost and reliability advantages of a multiprocessor. If this can be done, all of the organization's existing software and hardware can continue to be used and the effort required to convert to a relational data base system will be minimized and continuity of day-to-day operations will be assured.

SUMMARY OF THE INVENTION

Systems and methods in accordance with the invention utilize a novel architecture and organization in which multiple processors are intercoupled by an active bidirectional network. The bidirectional network is arranged in a hierarchy of precedence determining nodes, each of which can concurrently resolve contentions for priority between competing pairs of messages. It also broadcasts to all processors, from an apex node at the highest tier in the hierarchy, that message packet having priority. Tasks to be performed by the individual processors are accepted and responsive message packets are returned, again via the bidirectional network.

The network serves in one direction as a high speed decision making tree whose active circuit nodes function in the time and space domains to make a prioritized sort. Priority between contending message packets is determined in accordance with predetermined rules and based upon the data content in the message packets themselves. Messages of lower priority that lose in contention within the network are again retried when the prior transmission is completed.

The priority scheme pertains as well to acknowledgment messages, status and control messages and special communications. Employing coherent priority relationships, and timing the application of messages to the network so that they are entered concurrently, the system eliminates the need for extensive prefatory and confirmatory exchanges. A message gaining priority on the network is delivered concurrently to all processors, and the messages that lose in contention may substantially immediately vie again for transmission.

The delay introduced by the network is balanced, in the sense that it is the same for all processors, and is dependent only on the number of node levels in the hierarchical network. The delay therefore increases only by one increment for each doubling of the number of processors. In consequence of such factors, the minimization of support functions, and the fact that prioritizing is done without interruption of message flow, transfers on the network contain a very high proportion of data messages.

Systems and methods in accordance with the invention can be advantageously configured to stand alone or to interface to the I/O subsystems of existing computers, such as a large or small applications processing machine (referred to herein as the "host" or "main frame" computer). They also permit existing operating systems software and applications software on the "host" which do not use the invention to be used without modification.

The multiprocessor system utilizes highly cost effective microprocessors. For a data base system, some microprocessors may be characterized as interface processors and others of which may be characterized as access module processors. Both processor types are coupled to the base tier of the bidirectional network. The access module processors individually control different secondary storages, such as large capacity disk memories, each of which contains a portion of the relational data base arranged in scatter storage fashion. Each secondary storage has both primary and backup storage portions that are unique and nonredundant portions of the data base.

When a host computer generates a request, it communicates it via its I/O channel to an interface processor. The interface processor may determine that information stored by the access module processors must be retrieved or otherwise manipulated to satisfy the request.

In all applications of the invention, requests for processing are communicated by a processor to other processors via packets on the active logic network. The network delivers such requests on a prioritized basis and is capable of directing the request to either the specific processor(s) or to the class of all processors which have the information or capabilities needed to process the packet. Those processor(s) then perform the indicated activity and may generate message packets in answer to the assigned task.

The processed message packets may be either routed back to the processor which originated the request or may be distributed to other processors for further processing. In either case the bidirectional active logic network means has the capability of accepting for contention packets responsive to the request from a plurality of responding processors and causing them to be merged in a sequential order by outputting them in successive packet contention time intervals. The interface processor completes processing of the host's request by returning response information via the I/O channel.

The high speed network continually receives synchronous message packet tries from the processors that are on line, determining priority at some initial or intermediate hierarchical level within the network and communicating the preferred message packet to its destination, but at a later time also and without significant delay transmitting the lower priority message packets to their appropriate destinations. Acknowledgment signals are locally generated and interspersed in the data messages, using the network merge and prioritize capability in the same way. Control signals are generated to govern the pacing of both the external host system and other processors within the system.

An important aspect of the invention is that in the general distribution mode of operation there is automatic and unsupervised activity at a given processor in answer to a message packet that refers to that portion of the data base for which the processor is responsible. The message packets may include destination indications that comprise hash values used to define placement in the relational data base. Interface circuits at each processor then execute a table lookup or hashing function to determine whether the data is in range for that particular processor. Although the hash value may be computed by the sending or by the receiving processor, the use of hash mapping in conjunction with concurrent message broadcasting is of significant value in this relational data base machine.

The invention thus improves upon the state of the art of multiprocessor computer systems by providing means to:

distribute work to a plurality of processors
collect the results of work from a plurality of processors
ascertain the status of each resource (processor) in the network
provide redundancy
provide capability to readily expand the total processing capacity of the system
with a minimum of complexity and overhead in operating system and applications software.

The system architecture and operation permit expansion by the addition of further processors without requiring any modification or addition of supervisory software The nature of the network is such that the individual transmission line connection sets the maximum distance between one processor and another. In contrast, for an ohmic bus the bus length determines the maximum distance in which all processors must be accommodated, and consequently severely limits maximum system size. Thus, systems in accordance with this invention are freed from a fundamental geometrical constraint on the size of multiprocessor systems that confronts prior art systems. Further, merge and sort functions may be carried out by using the inherent priority determination within the network in conjunction with individual microprocessor operation. The microprocessor can first determine message priority between the outgoing messages in the random access buffer memory, and the network can then select messages from different processors in proper order.

In a typical data base system, dual networks are employed. The system remains modular in character and can be expanded simply by adding access module processors with proper insertion of primary and backup stores in the data base. There is thus no single point of failure within the system and because of the use of scatter storage with both primary and backup copies, failure of even two units has a minimal effect on the reliability of the system and the recoverability of data.

BRIEF DESCRIPTION OF THE DRAWINGS

A better understanding of the invention may be had by reference to the following description, taken in conjunction with the accompanying drawings, in which:

FIG. 2 and FIGS. 2A to 2J comprise a set of sequential diagrams showing the transmission of data and control signals in a simplified example of the network of FIG. 1;

FIG. 10 is a block diagram of the arrangement of data within one reference portion of the high speed random access memory of FIG. 8;

FIG. 11 is a chart showing the message priority protocol used in the system;

FIG. 12 is a graphical representation of transaction number word formats;

FIG. 18 is a matrix diagram showing the relationship between primary messages and generated responses and between primary messages and responsive actions;

FIG. 22 is a simplified diagram of one way in which parts of a data base may be distributed among different processes in a data base system.

DETAILED DESCRIPTION OF THE INVENTION

Data Base Management System

Figure 1:
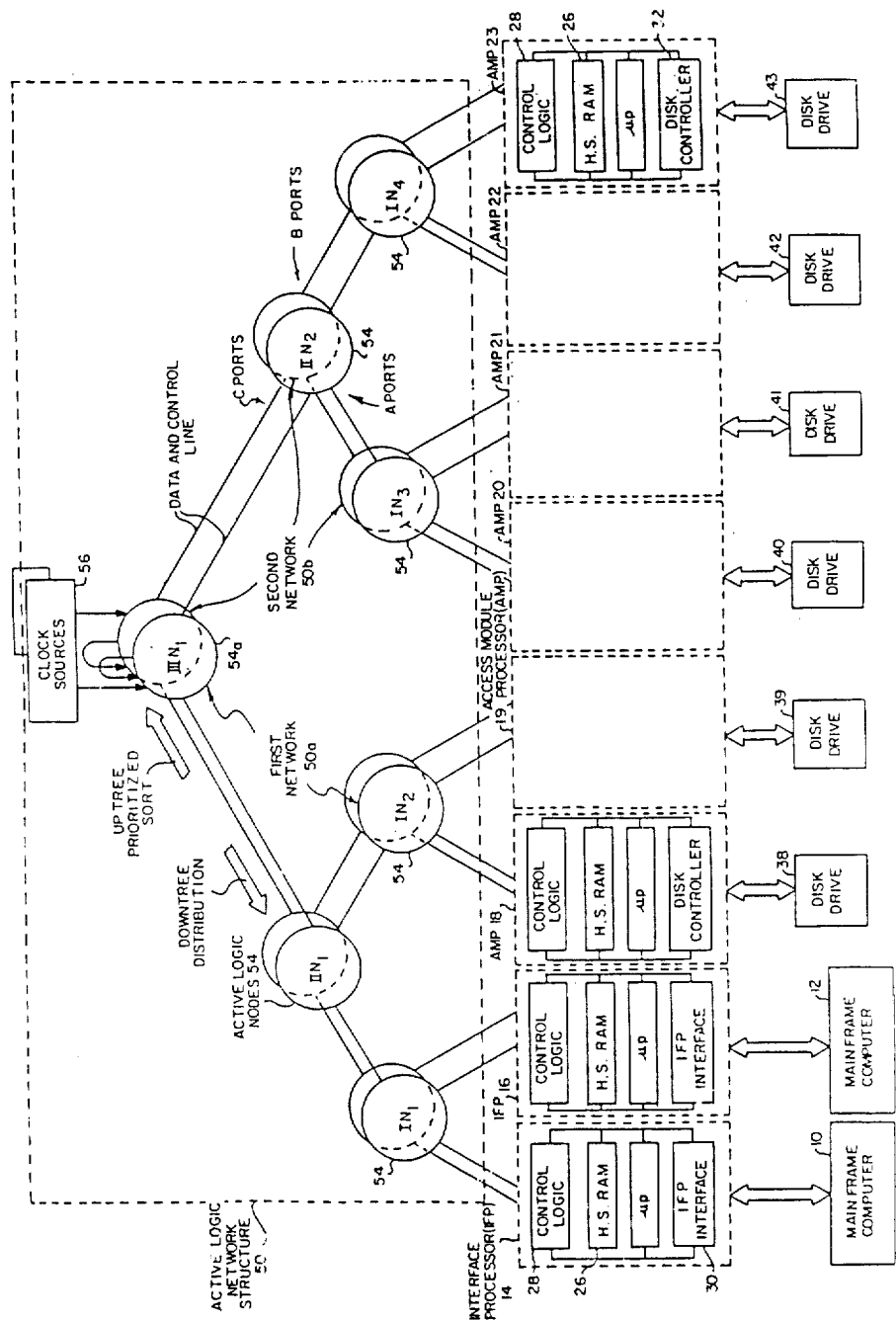
FIG. 1 is a block diagram of a system in accordance with the invention including a novel bidirectional network.

The system depicted generally in FIG. 1 is illustrative of usage of the concepts of the invention in a data base management application. Specifically, the system is configured for cooperation with one or more host computer systems 10, 12, such as one of the IBM 370 family or DEC PDP-11 family, which advantageously, for purposes of this example, operate with existing and conventional operating system and applications software. In the IBM terminology the principal intercommunication networks between the host and the data base computer are referred to as channels while in the DEC terminology the equivalent is referred to as a "UNIBUS" or "MASSBUS" or some other variant. Whether one of these systems or the main frame computer of another manufacturer is used, the channel or bus is an ohmic or logically passive pathway on which data base tasks and subtasks are presented.

The example of FIG. 1 shows a backend processor complex in association with host systems 10, 12. The system accepts tasks and subtasks from the host system, references the appropriate part or parts of an extensive data base storage, and returns appropriate processed or responsive messages in such fashion that no more than menial software management is required of the host systems, irrespective of the configuration of the backend processor complex. Consequently, the user's data base can be structured in a new multiprocessor system in which the data are organized in relational data base files of broadly expandable capacity; expansion can occur without any need to change the operating system or existing applications software resident in the user's host system. An example of a stand alone system is described below in conjunction with FIG. 20.

It will be recognized by those skilled in the art that relational data base management involves an overall function which is divisible into processing tasks that are separable, at least temporarily, because the data entries in storage are not interdependently linked by address pointers. It will also be recognized that many other data processing situations exist in which dynamic subdivision and independent processing of limited or iterative tasks can be used. Thus while this example of the invention is described in terms of the demanding and widely encountered data base management processing problem, the novel methods and implementations disclosed herein are of broad applicability elsewhere as well.

A large data management system involves both potential advantages and the inherent difficulties when multiple processors are to be used. Vast numbers of entries, ranging into the hundreds of millions, must be held conveniently and rapidly accessible in storage. With the relational data base format, a wide range of data entry and information retrieval functions can be carried out concurrently.

In the great majority of data base systems, however, it is as important to maintain the integrity of the data base as it is to process transaction data rapidly. Integrity of data must be preserved across hardware failures, power outages, and other operational mishaps. Further, the data base system must be capable of restoring the data base to a known state to recover from user errors which can include bugs in applications software code. However, the data cannot be lost or entered erroneously, and all parts of the data base that relate to a specific entry must be changed responsively, whether the event involves new data, corrections for past errors or revision of a portion of a data base.

Integrity therefore implies that a degree of redundancy is required in the data base system, along with data roll back and recovery operations, error detection and correction, and detection of and compensation for changes in status of individual parts of the system. The system may have to be used in a number of different specific modes to accomplish these objectives.

It is further required of modern systems to be able to accept discretionary queries that can be complex in form and to respond if necessary in an interactive fashion. Those who seek access to the system should not, despite the complexity of the query, be required to be experts in the system. Examples of discretionary queries that may be generated pertaining to a large production operation include the following:

A. A production manager might ask not merely for an item in inventory but for an inventory aging that identifies all parts inventories which are in excess of the monthly production rate for a part whose production rate is at least 10% less than in the comparable month for the prior year.

B. A marketing manager might ask, not merely if a particular account is 90 days overdue, but for all 90 day receivables as to customers from a particularly depressed geographic area who have exceeded 120 days in the past.

C. A personnel director might ask not merely for a listing of all employees having in excess of two weeks sick leave for a given year but for a listing of all employees with more than ten years longevity who were on sick leave for more than one week during frogging season in more than two of the prior five years.

In all of these examples, the user seeks to gain an insight into a real problem confronting him professionally by correlating, in unanticipated ways, information stored in the computer. The user's experience with his own problem areas and thus his intuition and imagination permits the non-computer-trained professional to make facile use of a data base system that is capable of handling complex queries.

Modern multiprocessor systems seek to satisfy these many and often conflicting requirements through the use of elaborate overhead and maintenance software systems, which inherently militate against easy expansion of the system. Expandability, however, is a highly desirable concept, because any growing business or operation inherently wishes to enlarge and retain its existing data base management system and not to be forced into the adoption of a new system and software.

The multiprocessor array—In FIG. 1, a typical system in accordance with the invention includes multiple microprocessors of two principal types, herein designated the interface processor (IFP) and the access module processor (AMP). Two IFPs 14, 16, are depicted, each coupled to the I/O system of a different host computer 10 or 12. A number of access module processors 18-23 inclusive are also incorporated in what may be termed a multiprocessor array. The term "array" is used in the conventional sense of referring to a set, collection or number of processor units disposed in a generally ordered linear or matrix fashion, and does not connote what has come to be referred to as an array processor. Although only eight microprocessors have been depicted as a simplified example of the system concept, many more IFPs and AMPs can and typically will be used.

The IFPs 14, 16 and AMPs 18-23 incorporate Intel 8086 16 bit microprocessors having an internal bus and a main memory with direct memory access for peripheral device controllers. Any of a wide variety of microprocessors and microprocessor system products of different manufacturers may be utilized. The "microprocessor" is merely a specific example of one type of computer or processor that may be used in the array, because the system concept can be used to advantage with minicomputers or large computer systems where the application demands such computing power. The 16 bit microprocessor is an advantageous example of a low cost unit having substantial data processing power and a standard replaceable configuration with a wide range of available hardware and software options.

The IFPs and AMPs utilize similar active logic, control logic and interface circuitry; microprocessors; memories; and internal busses, as described below in conjunction with FIGS. 1 and 8 respectively. These two processor types differ, however, in the nature of and control logic for their associated peripheral devices. Those skilled in the art will readily appreciate that other processor types with different peripheral controllers and functional assignments can be readily incorporated into this invention.

Each microprocessor has associated therewith a high speed random access memory 26 (described in conjunction with FIG. 8) which not only provides buffering of input and output messages but also coacts uniquely with other parts of the system to provide message management. Briefly, the high speed random access memories 26 function as a circular buffer for variable length input (called "receive") messages, provide sequential message output (called "send") storage, incorporate a table lookup portion for use in hash mapping and other modes, and store control information for orderly and sequenced handling of receive and send messages. The memories 26 are further used to fulfill unique roles in multiprocessor mode selection and in handling data, status, control and response message traffic. As described in detail hereafter, they are also arranged such that, based upon transaction identities in the messages, local and global status determinations and control functions are processed and communicated in highly efficient fashion. Control logic 28 (described below in conjunction with FIG. 13) at each IFP 14, 16 and AMP 18-23 is used in data transfer within the module and in the performance of overhead functions.

The IFPs 14, 16 each include an interface control 30 coupling the IFP to the channel or bus of the associated host computer 10 or 12. In the AMPs 18-23, however, the comparable unit is a disk controller 32 which may be of conventional configuration and which is employed to interface the AMPS 18-23 respectively with individually associated magnetic disk drives 38-43 respectively.

The magnetic disk drives 38-43 provide the secondary or mass storage for the data base management system. In the present example, they comprise proven commercial products, such as Winchester technology, to provide high capacity and high reliability storage with extremely low cost per byte.

The relational data base is stored on these disk drives 38-43 in scatter storage fashion as shown in simplified form in FIG. 22. Each processor and associated disk drive is assigned a disjoint primary subset of the records comprising the complete data base, so that each of n storages has 1/nth of the data base. Further, each processor also is assigned disjoint backup data subsets making up 1/nth of the data base. As seen in FIG. 22, each primary file is duplicated by a backup file at a different processor, giving two complete data bases distributed in different ways. This redundant arrangement of the primary and backup data subsets protects the integrity of the data base, because no large blocks of data or groups of relations can be substantially affected by a single failure.

Distribution of the data base is interrelated, as also shown in FIG. 22, with hashing of the various files, and incorporation of hash mapping data in the messages. The files at each processor are designated by simplified hash buckets shown as groups of binary series. The relations and tuples in a relational data base system thus can be located by the tables of relationships defined by the buckets. Hashing algorithms are used to derive the bucket assignments from keys in the relational data base system, so that expansion and modification of the data base system are readily feasible.

Selection of storage capacity is dependent upon data base management needs, transaction volume, and the processing power of the associated microprocessors. While a number of disk drives may be coupled to a single AMP, or a single disk file coupled to more than one AMP, such modifications will usually be limited to special applications Extension of the data base typically is achieved by expanding the number of processors (and associated disk drives) in the multiprocessor array.

Active logic network—The objectives of providing orderly message packet flow and facilitating task performance are met by the use of a unique system architecture and message organization, centered upon a novel active logic network structure 50. This structure comprises, relative to the outputs of the microprocessors, a converging, ascending hierarchy of bidirectional active logic nodes 54. The nodes 54 comprise three port bidirectional circuits which may be described as forming a tree network, with couplings to the microprocessors 14, 16 and 18–23 being made at the base of the tree.

It will be recognized by those skilled in the art that nodes may be constructed where the number of logical sources is greater than 2, say 4 or 8, where the greater number of source inputs may also be resolved in the same time by the addition of more combinatorial logic.

For convenience of reference, all nodes (N) in the first tier are designated by the prefix I, in the second tier by the prefix II, and so forth. Individual nodes within a tier are designated by the subscripts $_{1, 2} \ldots$, so that, for example, the fourth node in the first tier may be referred to as $IN_4$. At the up-tree (or upstream) side, there is a single port, called the C port, which is coupled to one of the two down-tree ports, called the A and B ports, of a node in the next higher tier. The tiers converge to an uppermost or apex node 54a representing a convergence and recirculating means which directs upstream (up-tree) messages back in the downstream (down-tree) direction. Two tree networks 50a, 50b are utilized, the nodes and interconnections of the two networks being disposed in parallel to provide the redundancy desired for a large scale system. Inasmuch as the nodes 54 and the networks are identical, only one need be described.

To aid in visualization, it should be understood first that multiple message packets in the form of serial signal trains are or can be launched concurrently into the active logic network 50 on the couplings for many of the microprocessors. The active logic nodes 54 each function in binary fashion in determining priority between two colliding packets, using the data contents of the message packets themselves. Further, all nodes 54 in a network are under the command of a clock source 56 arranged with the nodes 54 in such fashion as to synchronously advance the message packet trains toward the apex node 54a. In this manner each succeeding byte or other incremental segment of a serial train progresses to the next tier at the same time as the corresponding bytes of other messages also advance along other paths in the network 50.

A prioritized sort of competing signal trains takes place for message packets moving up-tree, ultimately to select a single message train to be redirected from the apex node 54a downstream. Because of the system organization, the decision as to ultimate priority need not occur at any particular point in the message packet, so that message transmission can be carried forward without requiring any nature than the binary decisions between two colliding packets that are being made at the individual nodes 54. As a result the system provides message selection and data transfer in the space and time domains but does not delay message transmissions for purposes of gaining control of the bus, identifying sending or receiving processors, or performing handshaking operations between processors.

Further, it is important to recognize that when several processors send identical packets at the same time, if successful, it will appear that all such sending processors were successful. This property is extremely useful in exercising efficient control of a large multiprocessor complex, because of the savings in time and overhead.

The nodes 54 also operate in bidirectional fashion to enable unimpeded downstream distribution of the message packets. At a given node 54 downstream messages received at the port C on the up-tree side are distributed to both ports A and B on the down-tree side and then transmitted on to both associated nodes at the next lower tier. Under the control of the common clock circuit 56, the message packet advances synchronously down-tree to be broadcast to all microprocessors simultaneously, enabling one or many of the processors to carry out the desired processing task or to accept a response.

The network 50 has a high data transfer rate in comparison to the data transfer rates of the microprocessors, typically being a multiple greater than two. In this particular example the network 50 has a byte clock interval of 120 nanoseconds and the data transfer rate is five times that of the microprocessor. Each node 54 is coupled, at each of its three ports, to the associated node port in the next tier, or to the microprocessor, by a set of data lines (here 10 in number) and by control lines (here 2 in number) and devoted to clock and collision signals respectively. The data and clock lines run in pairs, with separate lines for the uptree and downtree directions. The collision line propagates down tree only. The connections form a full duplex data path, with no delay needed to "turn around" the drive sense of any line.

Figure 3:
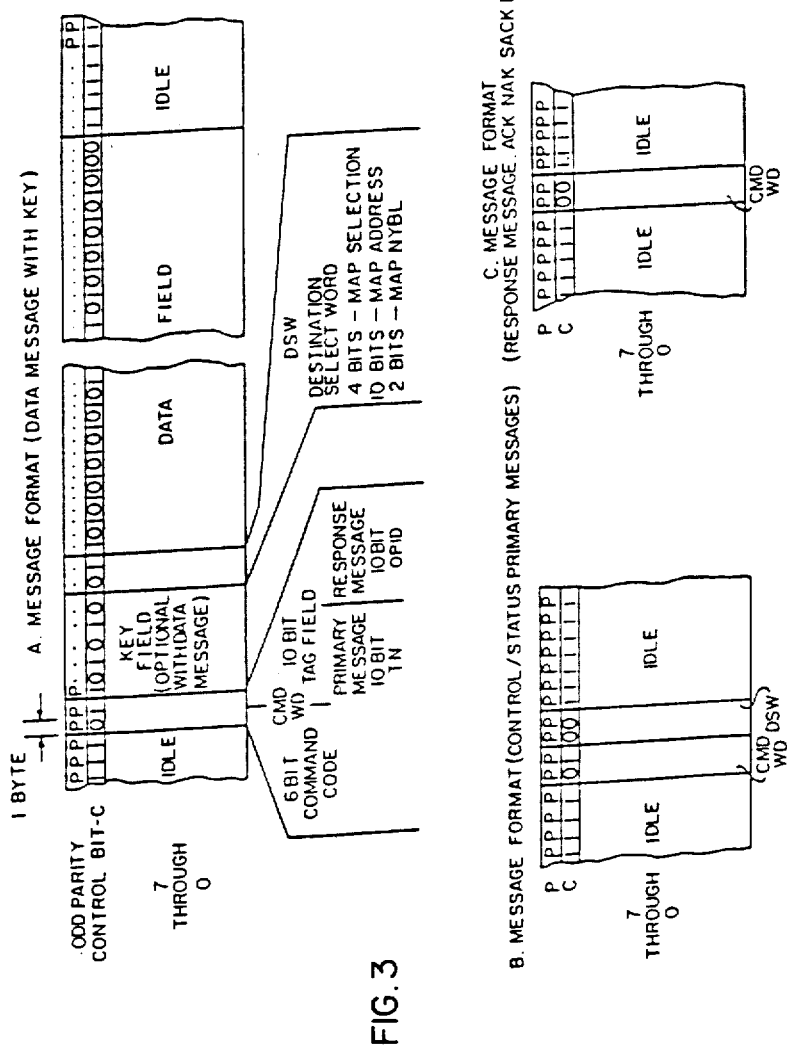
FIG. 3 is a graphical representation of the organization of a message packet used in the system of FIG. 1.

Referring now to FIG. 3, the 10 data lines comprise an 8 bit byte, designated as bits 0–7 inclusive, occupying 8 of the 10 data lines. Another line, designated C, is a control line, carrying a control sequence that is used to characterize different parts of the message packet in particular ways. The 10th bit is used for odd parity in the present example. Practitioners skilled in the art will recognize that the system can readily be operated with more or fewer bits in the data path.

The byte sequences are arranged in successive fields, basically divided into command, key, destination selection, and data fields. As is discussed further below, a message may utilize only a single field, and concludes with a detectable End of Message code. An intervening idle field between messages is designated by an unbroken sequence of 1's on the C line as well as on lines 0–7, and is transmitted whenever no message packet is available. The parity line is also employed in a unique fashion to communicate a change of status of an individual processor.

The idle state is an intermediate state and is not a part of the message packet, which typically begins with a 2 byte command word that includes a tag in the form of a transaction number (TN) for data messages or an originating processor ID (OPID) for response messages The transaction number has many levels of significance in the system and serves as the basis for a number of functional communications and controls The packet may thereafter contain any or all of a variable length key field and a fixed length destination selection word (DSW) as the first part of a variable length data field. The key field serves the purpose of providing sorting criteria, where messages are otherwise substantially identical. The DSW provides the basis for a number of special functions and also merits particular attention, along with the TN.

The system operates with the interfaces in word synchronism, so that the first bytes of the command words are provided to the network 50 concurrently by all processors which have a packet to transmit. The data contents of the successive fields are used by the network in sorting on a binary basis at each node, with the lowest numerical value being given priority. Taking bit C as the largest quantity and bit 0 as the smallest in the successive data bits, the sorting priority order is:

1. first arrival at the network 50;
2. lowest command code (word);
3. lowest key field;
4. shortest key field;
5. lowest data field (including the destination selection word);
6. shortest data field.

For purposes of this general overview it should be noted primarily that when a priority decision has been made at a node 54, a collision indication (referred to as $A_{col}$ or $B_{col}$) is returned along the path from which the losing transmission was received. This indication enables the transmitting microprocessor to recognize that the network 50 is busy with a higher priority transmission so that the transmission is terminated and must be retried again at a later time.

Figure 2:
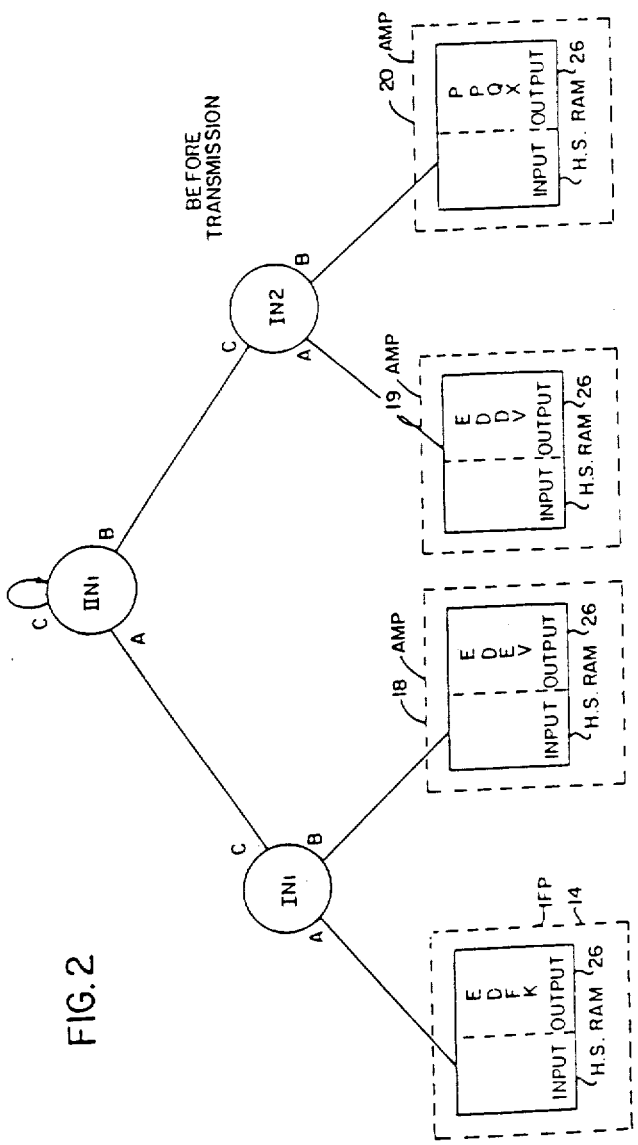
Figure 2A:
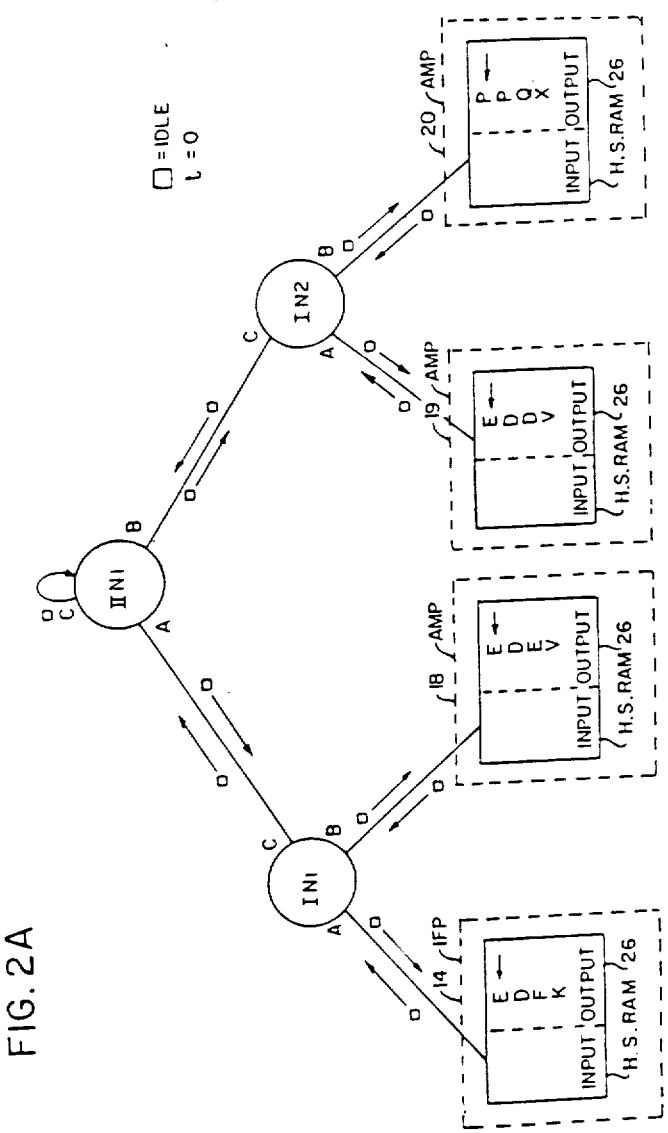

A simplified example is shown in the various representations of FIG. 2 of the manner in which the network 50 operates with the high speed random access memories in a tree using four different microprocessors, specifically an IFP 14 and three AMPs 18, 19 and 20. Ten subfigures 2A, 2B, ... 2J each correspond to one of ten successive time samples, from t=0 to t=9, to show the distribution of different simplified (four character) serial messages from each of the microprocessors within the network at each of these points in time, and the communications between ports and microprocessors at the different times. The diagram labeled simply FIG. 2 shows the state of the system prior to the beginning of signal transmission. In these separate views, the null or idle state requires a transmission designated □. With the convention of lowest data content having priority, the message packet "EDDV" from AMP 19 in FIG. 2A should be the first to be transmitted through the system. These messages are retained, as described in greater detail below, in the high speed random access memories (sometimes H.S.RAM) 26 in the microprocessors. The H.S. RAMs 26 have input and output subdivisions that are depicted generally in FIG. 2, with the packets being arranged in FIFO vertical order in the output portion at t=0, thus being available for transmission, as indicated by the cursor arrow in H.S. RAM 26. At this point in time all transmissions in the network 50 indicate the null or idle state □.

Figure 2B:
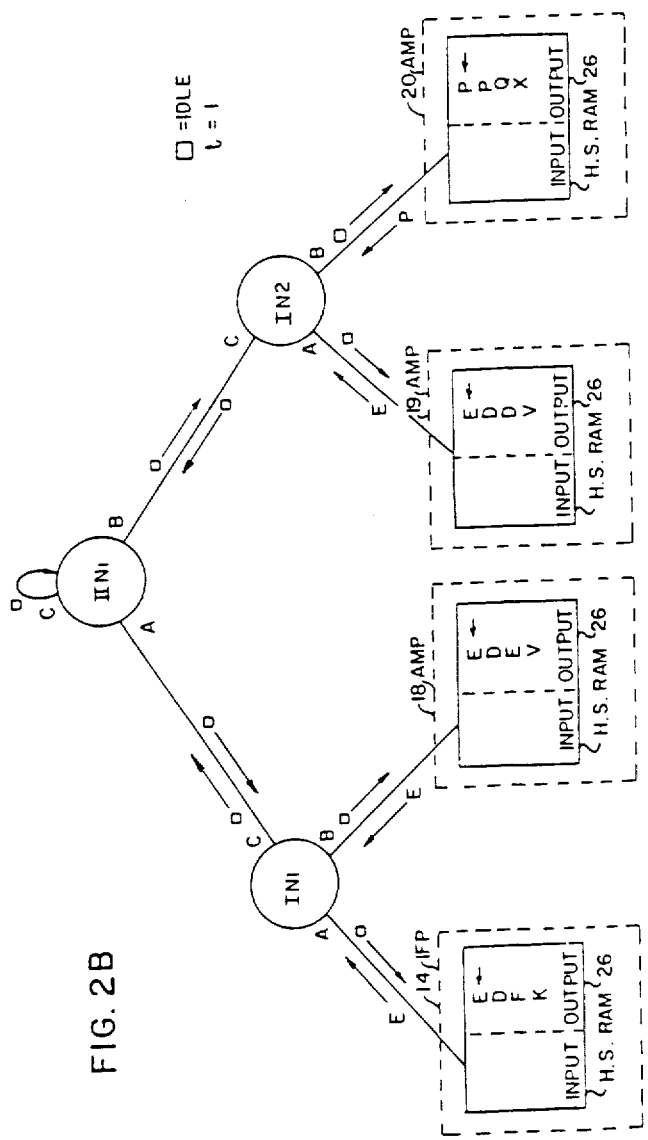

At t=1, however, as designated in FIG. 2B, the fist byte of each of the message packets is launched into the network 50 concurrently, with all nodes 54 still returning the idle state indications and all transmissions above the first tier also being in the idle state. In the first clock interval, the initial bytes of the messages are set into the lowest tier nodes, $IN_1$ and $IN_2$, so that at t=2 (FIG. 2C) contentions have been resolved and both upstream and downstream transmissions continue. Node $IN_1$ has received an "E" on both input ports and is transmitting this upstream to the next tier, indicating the undecided state downstream to both sending processors. At the same tier, however, node $IN_2$ has determined collision priority between the "E" from processor 19 and the "P" from microprocessor 20, in favor of the former, thus coupling port A to up-tree port C and providing the $B_{col}$ signal back to microprocessor 20. As the $B_{col}$ signal is returned toward the microprocessor 20, the $IN_2$ node in effect locks the A input port to the C output port, so that the serial train from microprocessor 19 is transmitted on to the apex node $IIN_1$.

Figure 2C:
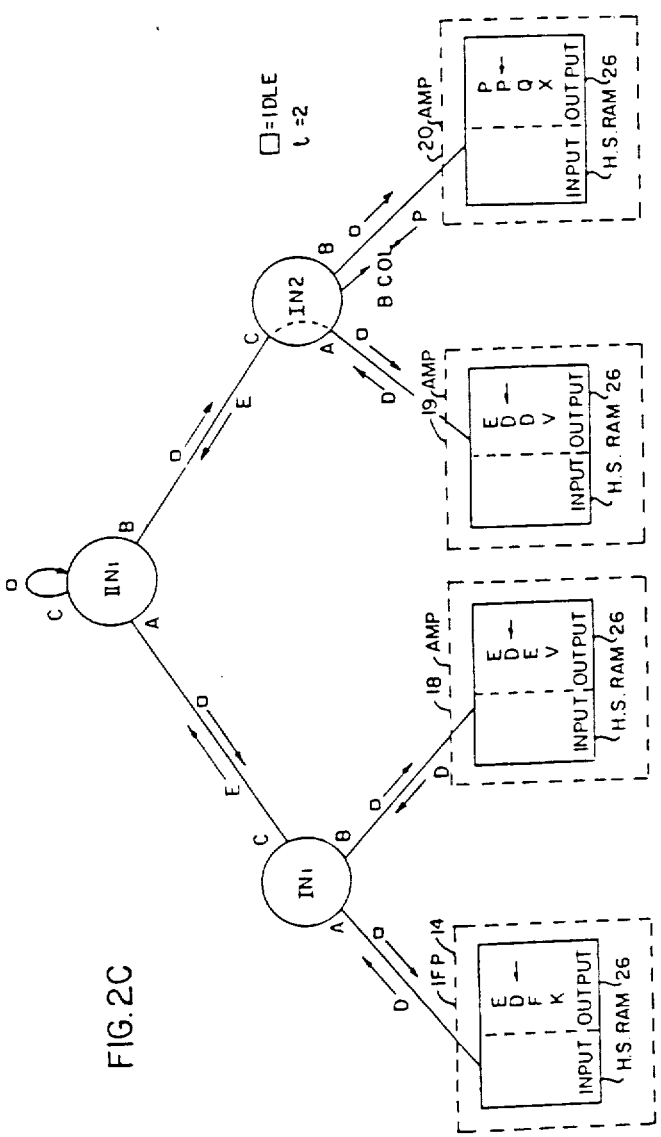
Figure 2D:
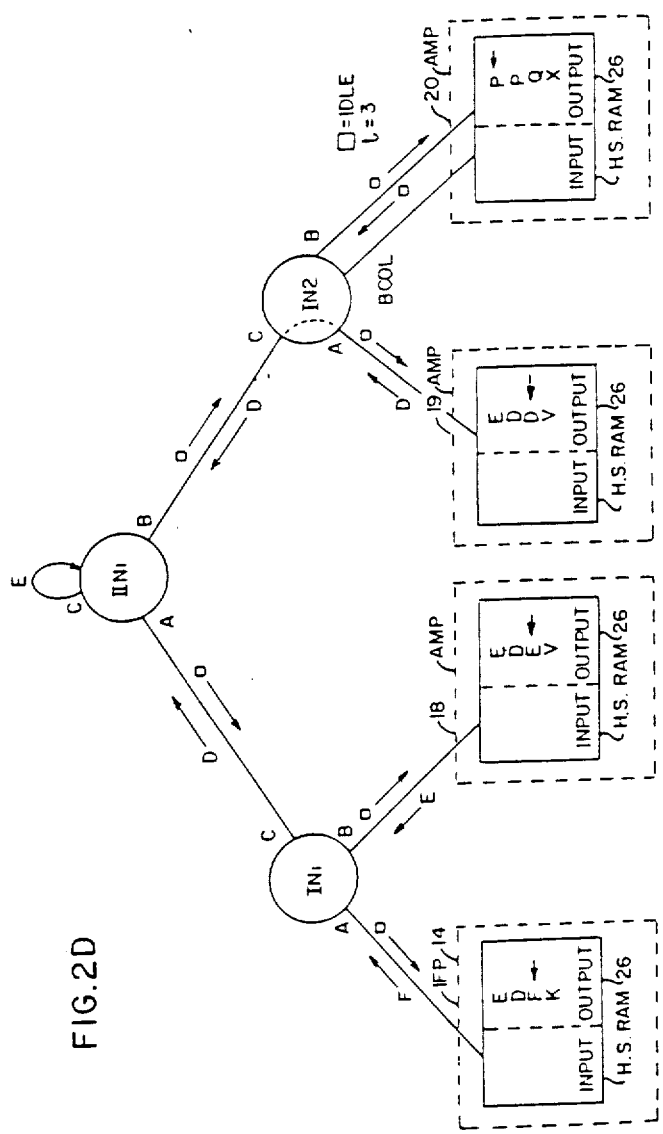
Figure 2E:
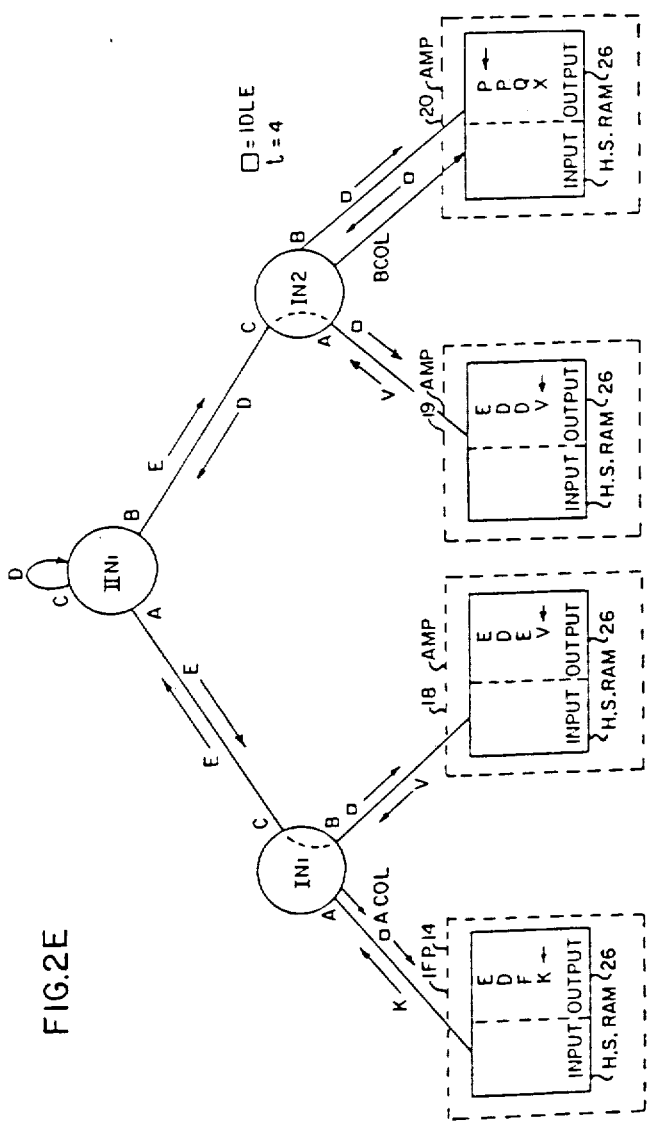
Figure 2F:
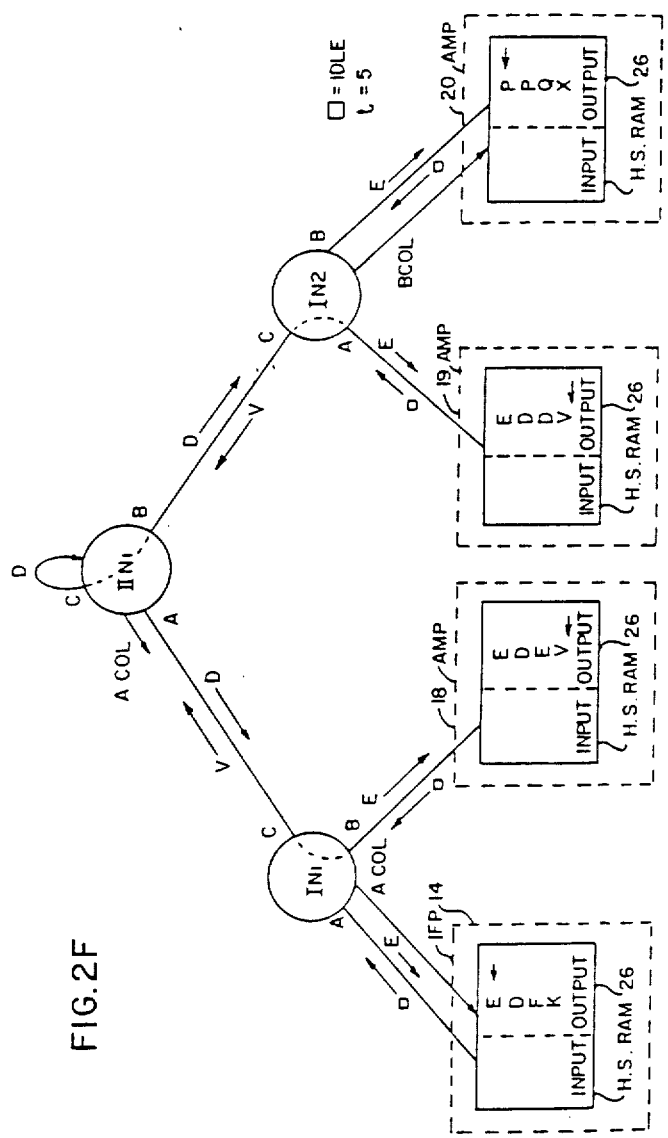

At the $IN_1$ node the first two characters are both "ED", and no decision can be made at this node at time t=2, as shown in FIG. 2C. At t=3 (FIG. 2D), moreover, the common initial character "E" from the three microprocessors 14, 18, and 19 reaches the $IIN_1$ apex node and is redirected toward the downstream direction, as the second character "D", also common to all messages, is transmitted toward apex node $IIN_1$. Node $IN_1$ cannot yet make a decision at this time, but the third characters, "F", "E" and "D" from the successive microprocessors 14, 18, and 19 respectively are in the course of transmission to that node. Reception of the $B_{col}$ signal at the microprocessor 20 designates that its contention for priority has been lost, and it then and thereafter transmits only the idle indication □. The cursor arrows in the output buffers show that the microprocessor 20 has been returned to its initial state but that the other microprocessors continue to send successive characters. Thus at t=4 (FIG. 2E) the significant events are the decision for the port at node $IN_1$ and the return transmission toward the first node tier of the initial character ("E") on all lines. The next collision is indicated at t=5 (FIG. 2F), with the B port of node $IIN_1$ winning contention and $A_{col}$ being generated.

Figure 2G:
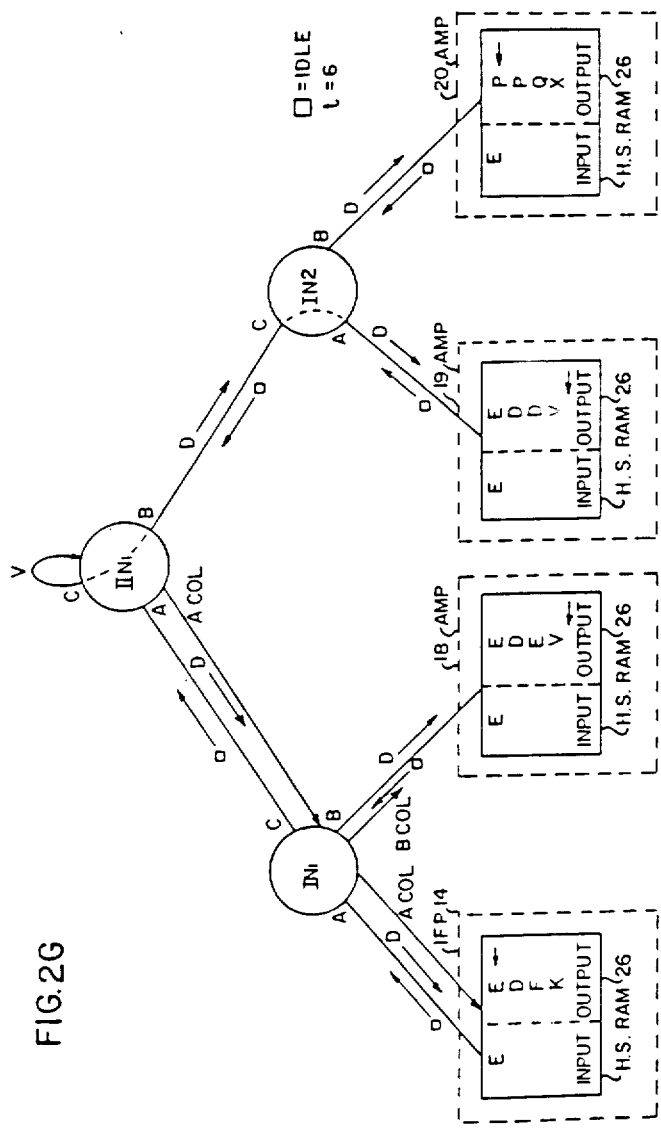
Figure 2H:
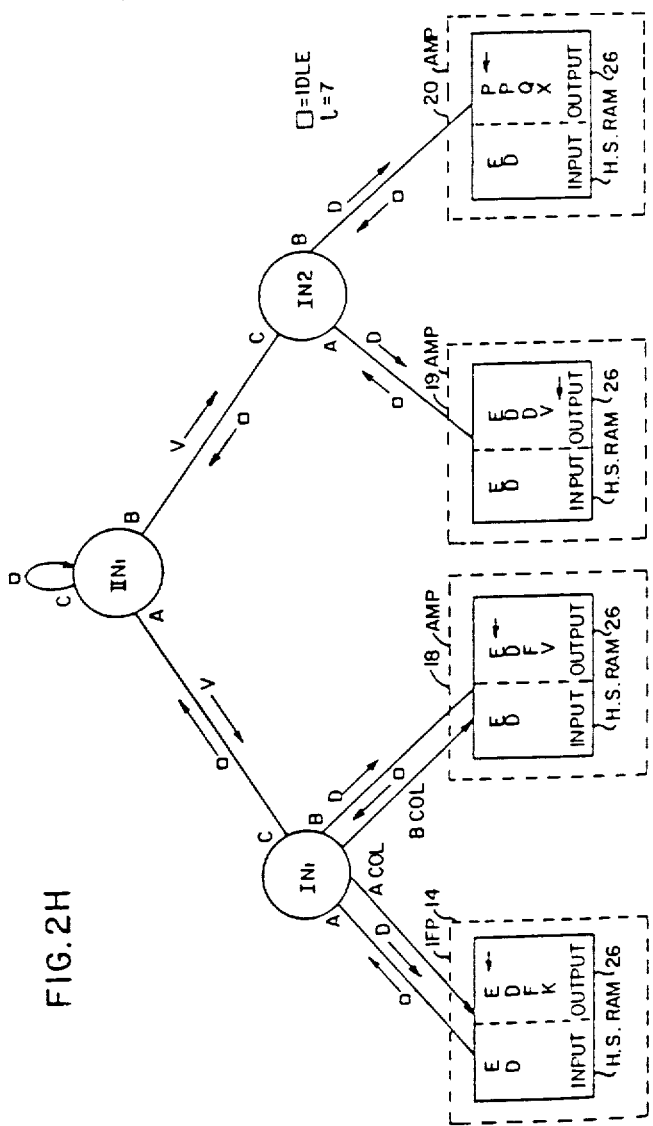
Figure 2I:
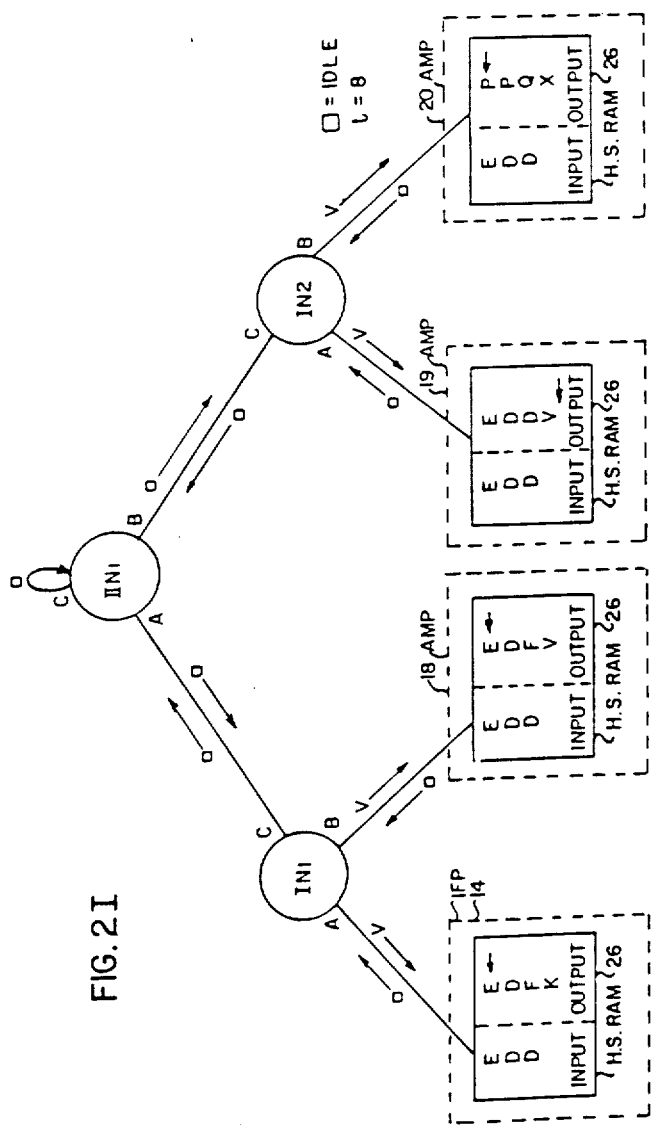
Figure 2:
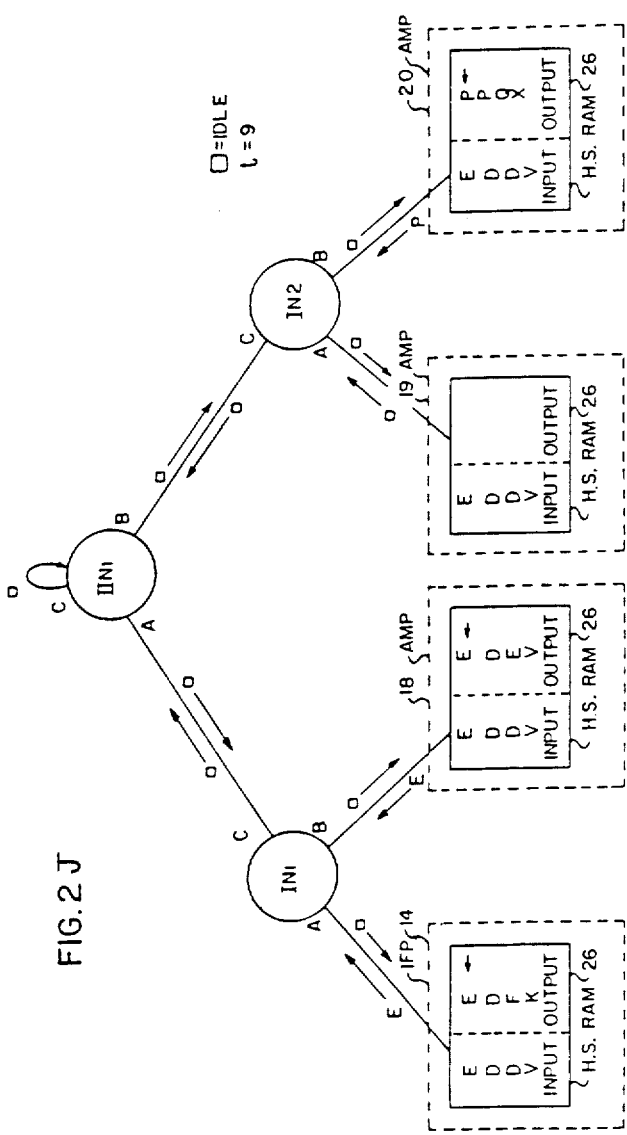

Broadcasting of the serial signal train in the downstream direction continues through successive clock times, and at time t=6 (FIG. 2G) the initial message character is set into the input portions of all H.S. RAMs 26. Concurrently it should be noted that the earlier priority determination at node $IN_1$ is now overridden by the $A_{col}$ indication from the higher tier node $IIN_1$ when the third character ("E") from the microprocessor 18 loses in contention with the third character ("D") from the microprocessor 19. As the cursor arrows show in FIG. 2H, microprocessors 14, 18 and 20 have returned to their initial states and winning microprocessor 19 previously completed its full transmission at time t=4. All input buffers are successively loaded with the priority message "EDDV" as seen in FIGS. 2H, 2I and 2J. At t=8 (FIG. 2I), the message has run out of the first tier and the apex node $IIN_1$ has been reset at t=7, because only idle signals are in contention, as the last downstream character is transferred to the microprocessors. At t=9 (FIG. 2J) the nodes $IN_1$ and $IN_2$ in the first tier are reset, and all the losing microprocessors 14, 18 and 20 now contend again for priority on the network by emitting the first message character when the network is again indicating idle. In practice, as described hereafter, acknowledgment signals are transmitted to the winning microprocessor(s), but this is not required for the most general case of the invention.

The message, once broadcast to all microprocessors in this manner, may be used by any or all as required This depends upon the mode of operation and the functions being performed, which include many variations.

Global Intercommunication and Control

Figure 13:
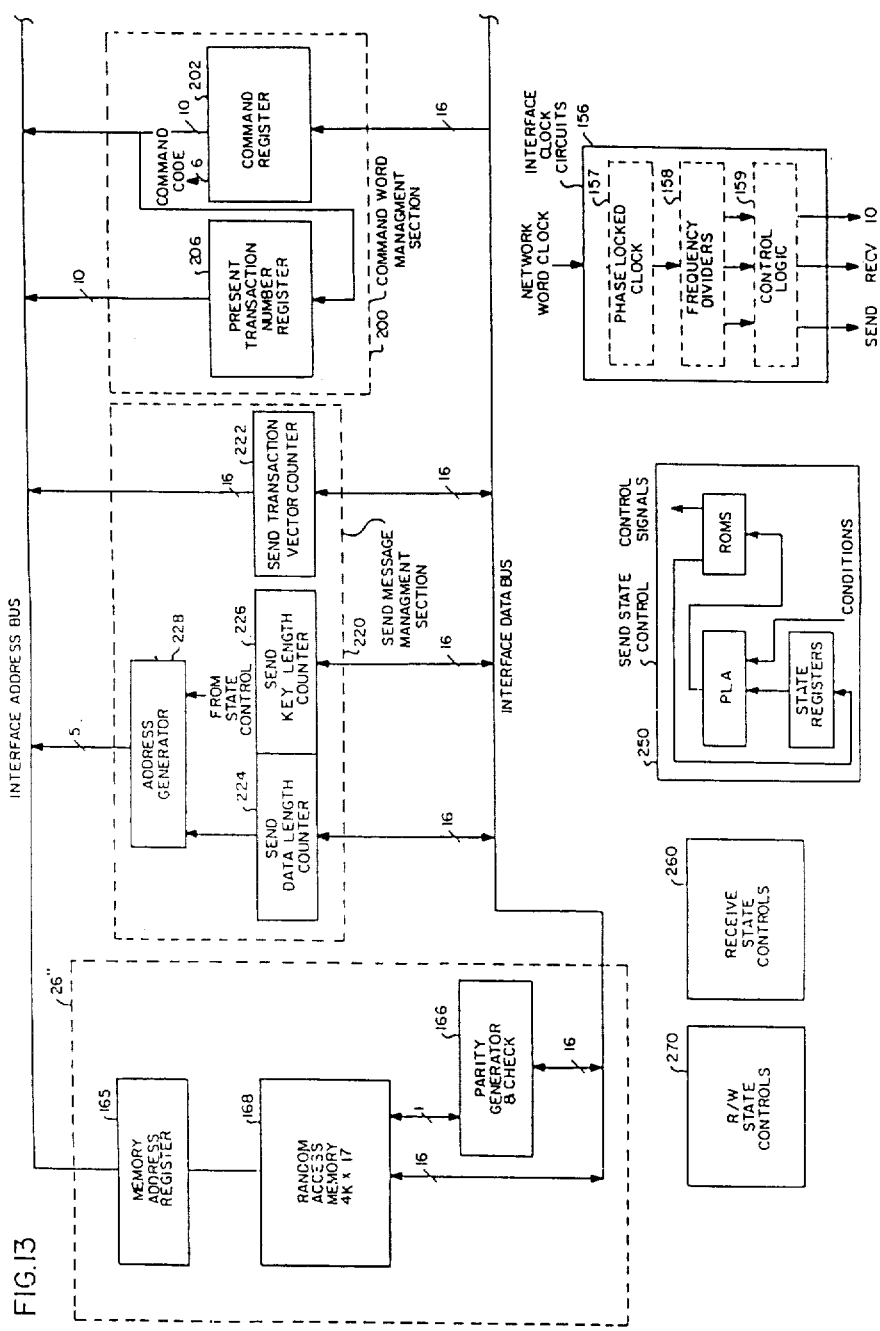
FIG. 13 comprises two sheets (FIG. 13 and FIG. 3A) containing block diagram of interface circuits employed with each processor module in the system of FIGS. 1 and 8 and comprises two sheets (FIGS. 13 and 13A) that are to be placed together with FIG. 13A on the right.
Figure 13A:
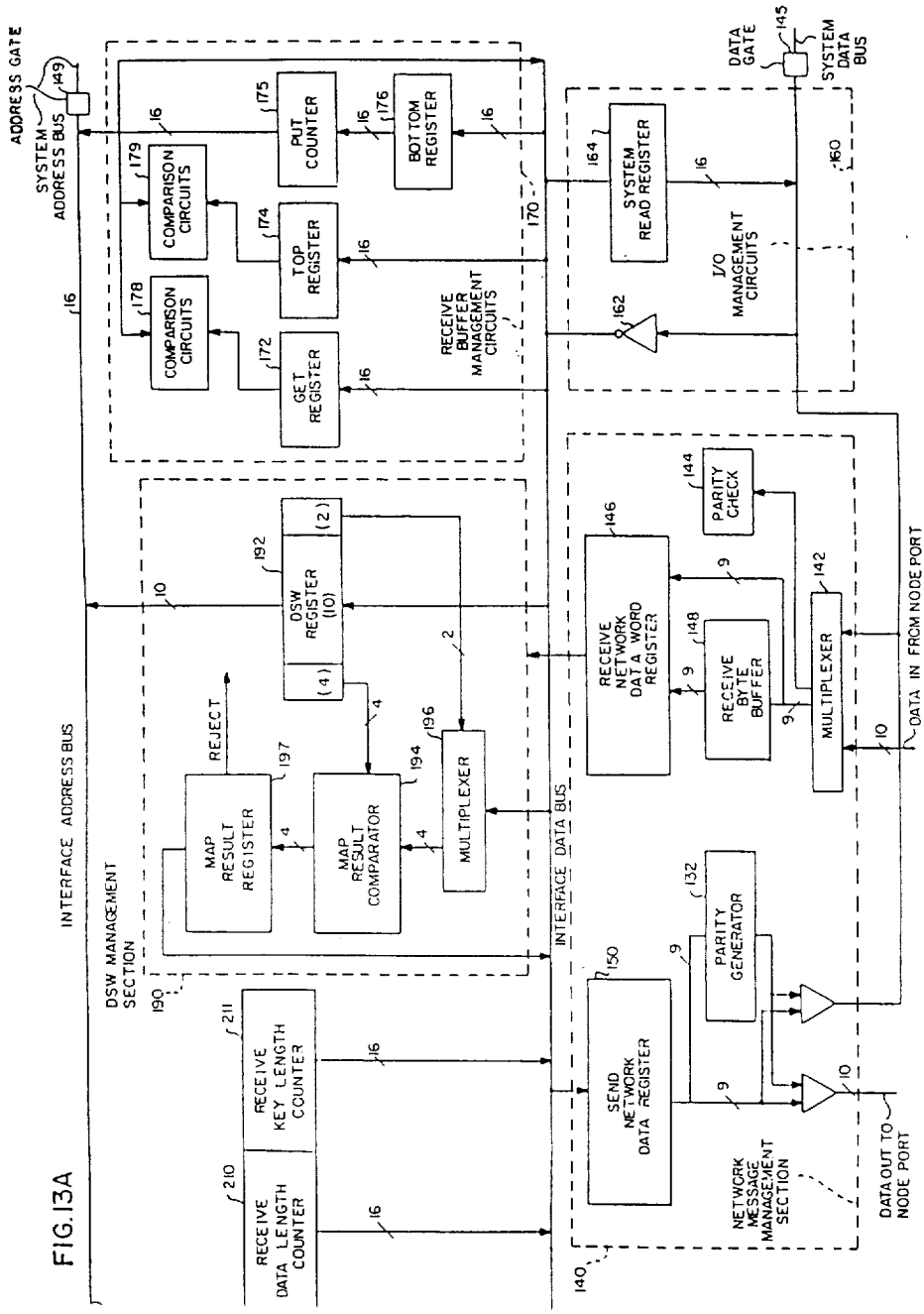

The foregoing example of the manner in which the network prioritizes a given message out of a group of contending messages pertains to the transfer of primary data messages. A complex multiprocessor system must however use many other types of communications and commands to have the efficiency and versatility now required. The principal functions to be supplied encompass, in addition to primary data transfer, what may broadly be termed multiprocessor modes, message acknowledgments, status indications and control signals. The following section provides a general overview from the global, or multiprocessor system, standpoint as to how different modes and messages coact with the prioritized sorting and communication network. Reference should be made to FIGS. 8 and 13 and the accompanying descriptions hereafter for a more detailed understanding.

In the general distribution or broadcasting mode, messages are simultaneously delivered to all processors without specific delineation of one or more recipients. This mode is typically used for responses, status queries, commands, and control functions.

Where there is to be a delineation as to the recipient, the destination selection information within the message packet itself provides criteria for local acceptance or rejection of the packet. For example, interface logic in the receiving processor modules identifies whether the data is in range for their particular processor according to map information stored in the high speed RAM 26. A variety of selection criteria can be readily implemented by means of various settings of the map bits in the high speed RAM, including selection of a specific recipient processor, portion of the data base stored ("hashed"), logical process type ("class"), etc. The use of broadcasting with local access control is of particular benefit for a data base management system, inasmuch as minimal overhead software is needed to gain access to any part of the widely dispersed relational data base or to dispersed local copies of any of a number of globally known logical processes. The system is thus capable of specifically selecting a single destination or a class of resources as the destination for a message.

Also, high level data base inquiries often require cross-referencing between different portions of the data base, and consistent reference to a given task. The TN incorporated in the messages provides this global transaction identity and reference, among other features. Many tasks may be worked on concurrently by the asynchronous local processor modules, and each task or subtask has its appropriate TN. Using various combinations of the TN, DSW and commands, virtually infinite flexibility is achieved. An extended sort/merge operation can be undertaken on a large number of tasks that are asynchronously assigned and processed. TNs can be assigned and relinquished and merges can be started and stopped. Certain messages, such as continuations, can have priority over other transmissions. Using the TNs and local processor updating of status as to the TNs, one query can determine the status of the global resource as to a given TN. A distributed update can also be accomplished in one communication. The present system enables all these functions to be performed without extending the software or materially increasing the overhead load.

As a consequence of the invention, multiprocessor systems with much larger numbers of processors than feasible in the prior art can be operated with high effectiveness against problem tasks. Because of the present low cost of microprocessors, systems of high performance in a problem domain, and not just in "raw" power, can be realized at low cost.

A coherent priority protocol that encompasses all message types, and various subtypes, embraces all the different messages that are applied to the network. Although responses, status and control messages are of a different form than the primary data messages they also use the contention/merge operation of the network and thus are prioritized during transfer. Response messages in the present system are positive acknowledgment (ACK), negative acknowledgment (NAK), or an indication that the processor does not have the resources to process the message meaningfully ("not applicable processor"—NAP). The NAK response may be any of several different types, indicating a locked, error or overrun condition. Because an originating processor or processors require such responses after termination of a message transmission, the responses have a higher priority level than primary data messages.

The present system also employs SACK (status acknowledgment) messages that denote the readiness state of a local processor with respect to a particular task or transaction. Such SACK responses are locally updated and held accessible to the network. They provide, in conjunction with the merge operation of the network, a single query global status report for a given task or transaction. Because the status responses are in accord with the priority protocol, the lowest data content response automatically gains priority and establishes the least ready status as the global system state for a transaction number in one uninterruptible operation. The SACK indications also are used in conjunction with certain primary messages to implement various protocols, such as system initialization and lockout operations.

The priority protocol definition for the various message types begins with the command code, using the initial 6 bits of the command word that starts each message and response, as shown in FIG. 11. An adequate range of distinctions as to message types, and subtypes, is available although more could be used. Here the SACK response differentiates seven different status levels (and provides a basis for prioritizing as well), as can be seen by reference to FIG. 11. For responses these first 6 bits are followed by the tag in the form of a 10 bit OPID (see FIG. 3). Both the TN and OPID can serve as further sorting criteria because of their differing data contents, within the tag.

After each primary message has been transmitted through the network, the interface section of every processor generates a response message, even if it is only a NAP. The responses also contend on the network, and the single or common winning response message is broadcast to all processors. Losing message packets are retried later, synchronously, after a minimal delay so that the network is substantially constantly in use. Where a number of processors provide an ACK response, the responses are sorted by the OPID.

As a consequence of the invention, tasks can be started, stopped, controlled, and interrogated in synchronism in a very large number of physical processors with a minimum of overhead. This permits the raw power of a large number of processors to be effectively applied to problem-state processing with a minimal diversion of that power to coordination and control.

The overhead of coordination and control is a fundamental limitation on the efficacy of any distributed processing system.

Different types of control communications are employed where the purpose is globally (i.e. network) oriented. Thus, Stop Merge, Status Request, Start Merge, and certain task assignment and relinquishment messages have the same format as data messages and are also referred to herein as primary messages. These control messages also include the TN and have their places in the priority protocol, as is later discussed relative to FIGS. 10 and 11.

The term "global semaphore buffer system" has been adopted to connote the fact that the high speed random access memory 26 and control logic 28 shown in FIG. 1 also play a significant role in both multiprocessor mode selection and bidirectional communication of status and control indications. The global semaphore buffer system provides duality of access, in that both the high speed network structure 50 and the slower speed microprocessors can reference a message, response, control or status indication in the memory 26 without delay or requiring direct communication with each other. To this end the control logic 28 time multiplexes the memory 26 to network 50 and to the microprocessor in interleaved word cycles, creating in effect different ports having common access to the memory 26. The global resource or network 50 and microprocessors can use the transaction number as an address locater to a portion of the memory 26 devoted to transaction status. At the local level, the status of a subtask relating to a given transaction covering all useful states, is updated in the memory 26 under control of the microprocessor and locked by the control logic 28 at the buffer system. One of seven different readiness states is used, the entries conveniently being derived from a different dedicated portion of the memory 26. Upon a query from the network, the status of the processors is communicated (the "semaphore" is read) and prioritized in the network with the least complete readiness state taking priority. This arrangement provides an immediate hardware response from all processors to a query. Thus it can be known without delay or the use of software whether all of the distributed subtasks of a given task have been accomplished. In the instant system, moreover, any communicating processor module can assign an available transaction number for use with the messages and in each global semaphore buffer system.

A good example of this integrated use of transaction identity and status indication is presented by a complex merge operation, in which each of a number of processors is called upon to place in order all messages pertaining to a given criterion. In prior art systems each processor would have to receive and complete its tasks and then communicate the results to some "master" processor, which would do the final merge operation. That master processor thus constitutes a significant bottleneck to system throughput.

When the global readiness state establishes that all affected processors are ready, the messages of highest priority from the memory 26 at each processor are entered on the network concurrently and prioritized during merger as previously described Successive retries with groups of messages generate a serial train of messages of descending priority, ending with the lowest for that transaction number. Specific command messages provide the system with the ability to suspend and resume the merge operation partway through so that the network 50 can be shared by a number of copending merge operations and thus make most effective utilization of the resources of the systems.

At any given time, therefore, all active processors connected to the network 50 can be working asynchronously on messages pertaining to different transaction numbers. When referenced to the same or "present" transaction number by a status query, all respond synchronously with one of the available status levels. For example, The START MERGE message tests the global semaphore represented by a particular transaction number, and if the global state is ready (SEND READY or RECEIVE READY), the present transaction number (PTN) is set to the TN conveyed in the START MERGE message. (If the global state is not ready, the PTN reverts to a value of TN0).

A STOP MERGE message also resets the present transaction number to 0. TN0 is thus utilized as the "default" transaction number used for single processor to single processor (point-to-point) messages. In another sense, it identifies the "non-merge" mode of operation.

Figure 7:
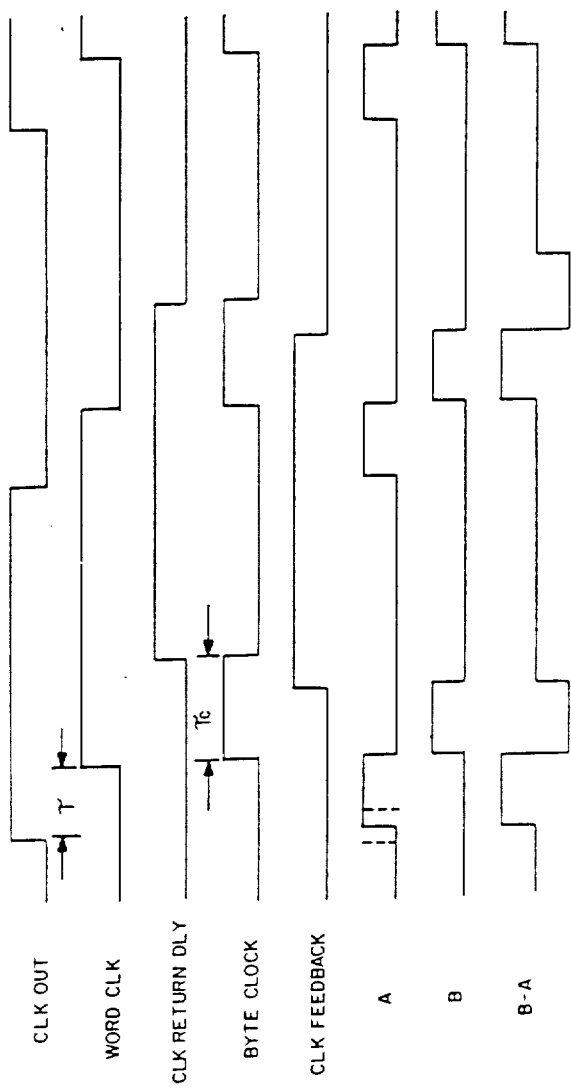
FIG. 7 is a diagram of timing waveforms useful in explaining the operation of the clock circuits of FIG. 4.
Figure 8:
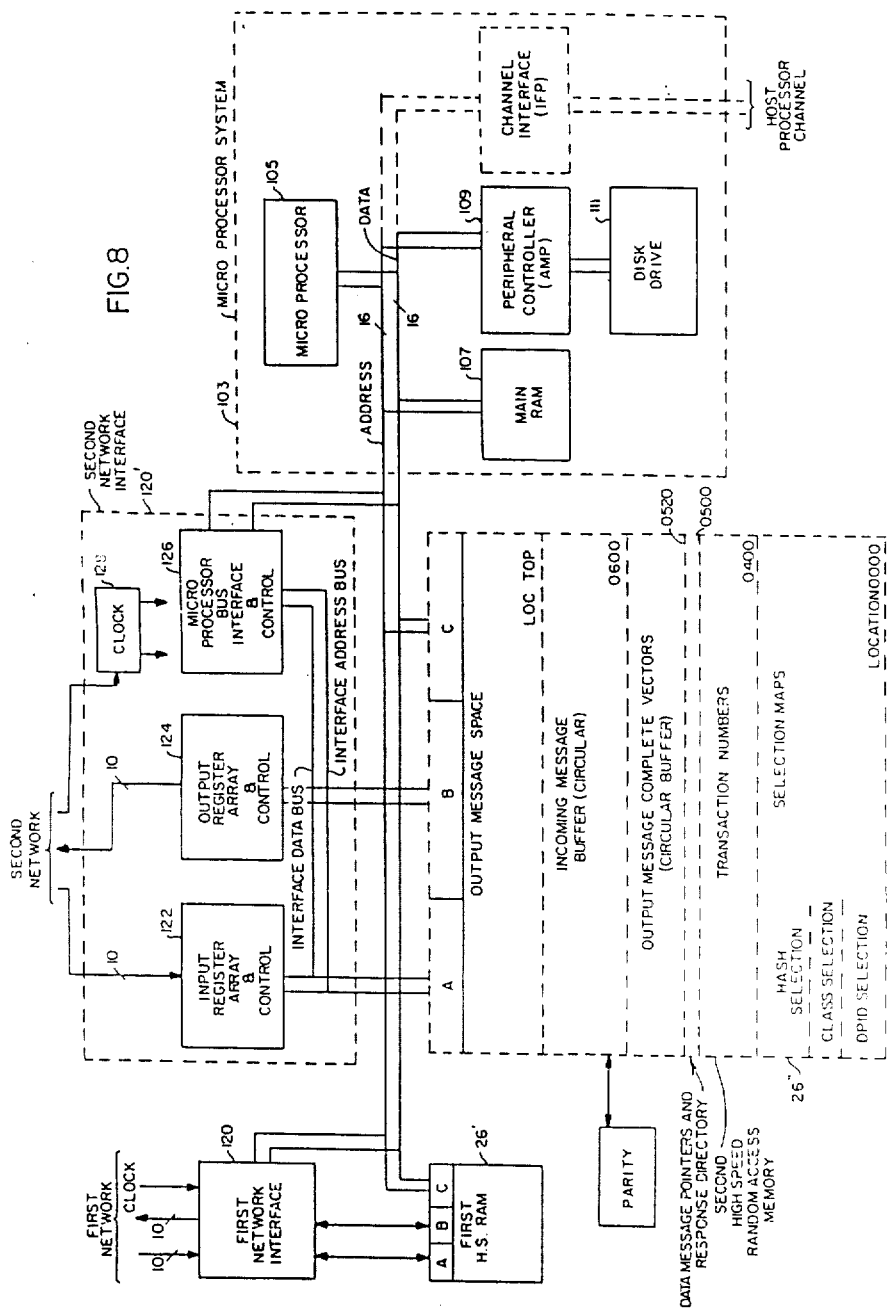
FIG. 8 is a block diagram of a processor module, including a high speed random access memory, that may be employed in the system of FIG. 1.

The global intercommunication system uses the message organization shown in FIGS. 3A, 3B, 3C and 11, and the high speed random access memory 26 organization shown in FIGS. 8 and 10. More detailed examinations are made below in conjunction with FIGS. 5, 7, 9 and 13.

In FIGS. 3A-3C and FIG. 11 it can be seen that command codes for the responses range from 00 to 0F (hexadecimal) and that those for primary messages range from 10 (hexadecimal) to some higher value. Thus, responses take priority over primary messages, lowest value first, in the sequence shown in FIG. 11.

One dedicated section of storage in the high speed RAM memory 26" (FIG. 8), (designated "transaction numbers") is used for storage of the word formats (the seven readiness states, an Assign TN and an Unassigned TN state) of FIG. 12. Other dedicated portions of the memory 26" include a circular buffer for input (receive messages) and an output message space. Another separate section of the memory 26" is used as a message complete vector section, in which pointers can be placed to completed output messages so that output message space can be used efficiently.

It should be appreciated, therefore, that while the queuing and data buffering functions of the memory 26 and control logic 28 are of importance, the multiple coactions by which global transactions are dispersed and manipulated in relation to the individual processors are uniquely significant.

Active Logic Nodes

Figure 4:
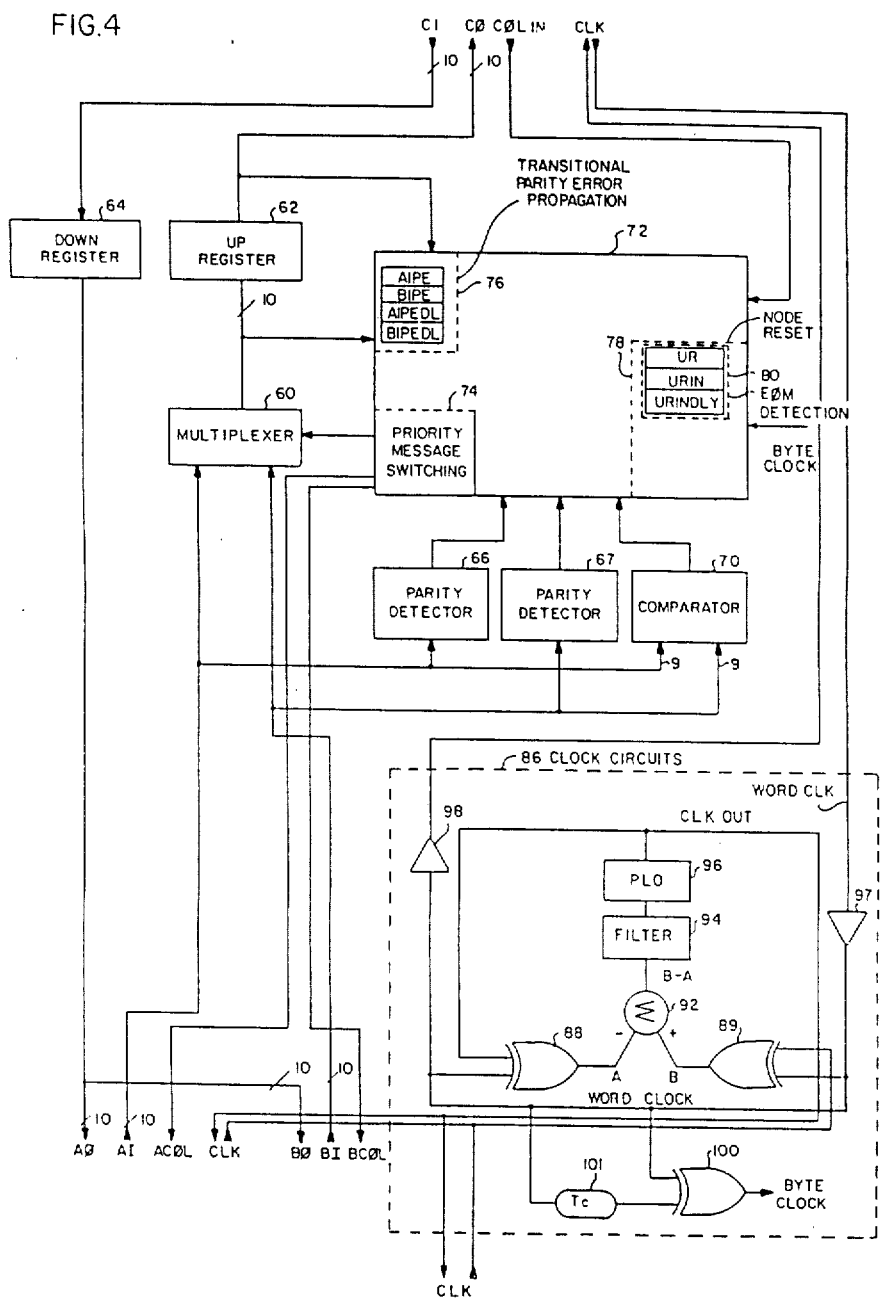
FIG. 4 is a block diagram showing further details of the novel bidirectional network of FIG. 1 as to the active logic nodes and clock circuits employed therein.

The active logic nodes 54 of FIG. 1 are alike, in both of the redundant networks, except that the recirculation node 54a at the apex of each network has no upstream port, but merely a signal recirculation path that returns to the downstream direction. As shown in FIG. 4, each node 54 may be broadly divided into functional groupings, one of which pertains to message and collision signal transmissions and the other of which pertains to generation and retransmission of the common clock signal. Clock signals are synchronized such that there is zero skew between them at the different nodes. These two functional groupings are not separate, inasmuch as the zero skew clock circuits form important parts of the signal transmission system. Both a word clock (two serial bytes) and a byte clock are utilized. Note should be taken of the fact that external control of the active logic nodes 54 is not required or utilized, whether to establish or reset the node's state or to set up different modes of operation. Furthermore, the identity between the nodes 54 enables them to be made in quantity using modern IC techniques, substantially reducing cost while improving reliability.

The A, B and C "ports" previously referred to each have ten input data lines and ten output data lines. Taking the A port as an example, the input lines are designated AI and the output AO. The single "collision" line is used at each port (e.g. $A_{col}$ for the A port), along with upstream and downstream clock lines. The data lines from the A and B ports are applied to a multiplexer 60 which switches the priority word of two competing words, or the common word (if both words are alike) to an up register 62 coupled to the upstream port (C) as the C0 data signals. Concurrently, the downstream data received at the C port from a higher tier node is shifted into and out of a down register 64, appearing as output at both of the A and B ports.

Although one upstream byte serial signal train may be blocked, no added upstream or downstream delay is introduced and words are advanced in unbroken sequence through the up register 62 and down register 64 under control of the word and byte clocks.

Competing bytes concurrently applied at the A and B ports are supplied to first and second parity detectors 66, 67 and also to a comparator 70 which determines priority on the basis of the eight data bits and one control bit, with lowest data content having priority. The "idle" or no message signal in this protocol is an unbroken sequence of 1's. Parity errors can occur due to typical causes, such as the presence of excessive noise or some other factor affecting signal transmission or circuit operation. In the present system, however, an important additional use is made of parity error indications. Each transition of a microprocessor to an inoperative state is marked by all output lines, including the parity line, going high (or 1 valued), thus establishing an odd parity error. This indication is transferred through the network once upon the presence of an error, as a marker which enables the system to identify a change in global resources and initiate procedures to determine the nature of the change.

The pair of parity detectors 66, 67 and the comparator 70 feed control circuits 72 that include priority message switching circuits 74, responsive to the comparator 70 for locking the multiplexer 60 in one state or the other if priority is determined, and for generating and propagating the downstream collision signals. Transitional parity error propagation circuits 76 are so called because they force the one-time all 1's parity error state along the network. Reset circuits 78 for returning the node to its initial state include an end of message (EOM) detector 80.

It will be appreciated that the functions described above and hereinafter may be accomplished at each active logic node by the use of a microprocessor chip, but they may even more readily be implemented in accordance with the state diagram of FIG. 5 and the logic equations set out below. In the state diagram, the state S0 represents the idle state, and also the state in which competing messages are equal, so that no decision is made to favor one port against another. The S1 and S2 states are the states favoring the A port and B port respectively. Thus the A port is favored (S1 state is established) if the data content of BI is greater than AI and there is no parity error on AI or if there is a parity error on BI (these conditions being designated $\overline{AIPE}$ and BIPE respectively and represented by flip-flop states). The converse logic conditions as to AI and BI exist for the system to go into the S2 state. Any indication from a higher tier node that a collision has occurred at that tier is reflected back in a downstream signal as $COL_{IN}$. Whether the system is in the S0, S1 or S2 states, it goes into the S3 state, transferring the collision signal downstream as $A_{col}$ and $B_{col}$. In the S1 and S2 states, with the node having made a decision, the collision signal is sent downstream to the lower tier nodes in like fashion, with the priority message switching circuits 74 locked to the A port or B port as the case may be.

Figure 5:
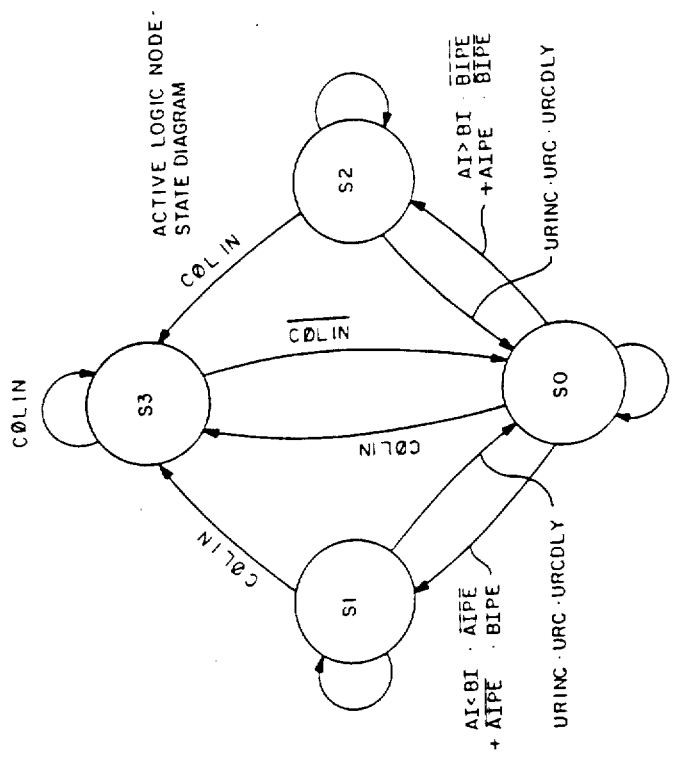
FIG. 5 is a state diagram depicting various conditions of operation in the active logic nodes.
Figure 6:
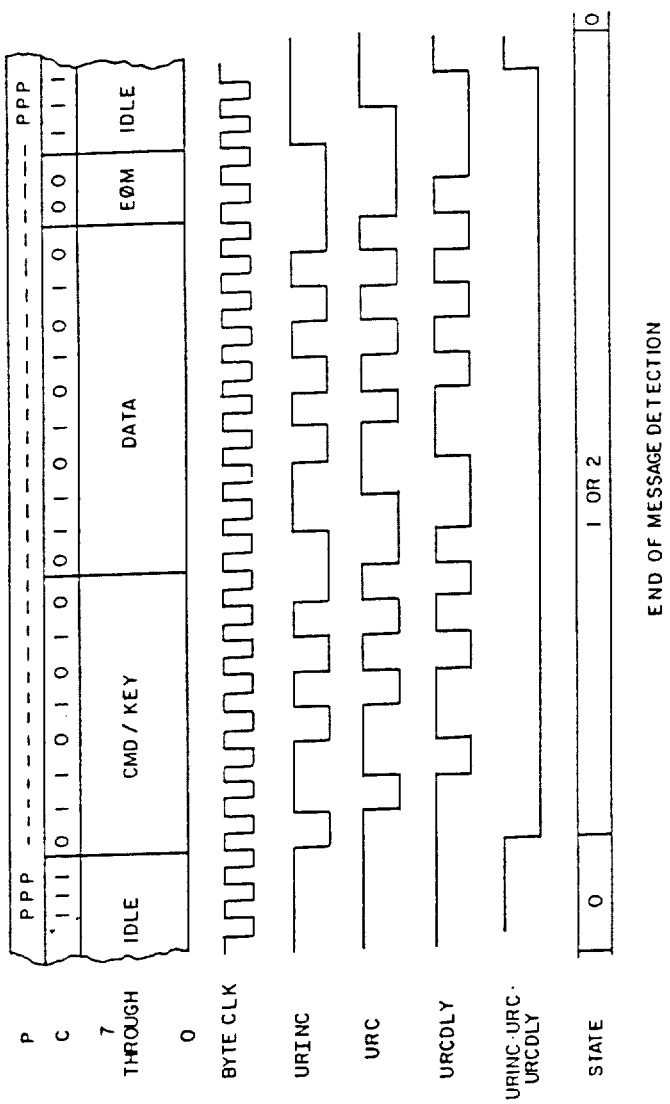
FIG. 6 is a timing diagram useful in explaining end of message detection in the active logic nodes.

The reset circuits 78 include the EOM detector 80, used to reset the node from S3 to S0 (FIG. 5). A first reset mode uses the end of message (EOM) field that concludes the data field in a primary message, as shown in FIG. 6. A group of flip flops and gates are used to establish the logic:

URINC.URC.URCDLY where URC represents the control bit in the up register, URINC represents the control bit value in the up register input and URCDLY represents the C value in an up register delay flip flop.

As seen in FIG. 6, control bit sequence pairs establish certain fields and transitions between them. For example a transition from the all 1's used during idle to a 0, 1 bit sequence defines the start of a field. The same 0, 1 sequence is used to identify the start of the data field. Successive 1, 0 control bit strings denote the internal field or subfield, and the end of message (EOM) is identified by the 0, 0 control bit pair. The condition in which the string of 1, 0 pairs is followed by the 0, 0 pair is unique and readily identified. The URINC, URC and URCDLY signals are ANDed together, with each having a 1 byte clock delay from the other. The result is a waveform that is high until the start of the message packet, and at which point it goes low and stays low through the data. It returns high 2 byte clocks following the EOM occurrence. This positive-going transition in the waveform URINC. URC.URCDLY is the EOM detection. It triggers, as shown by the legend in FIG. 5, a return from S1 or S2 to S0.

A higher node tier that is reset goes to $COL_{IN}$, indicating that the collision state has been removed. This logic state initiates a return from S3 back to the base state, S0. Note that the $COL_{IN}$ state will propagate down the tiers of the network as the end of the message "runs out". The nodes are thus self-resetting no matter how long or short the message. Also note that no matter the state in which the network starts out, all nodes will be reset to the S0 state by the idle signals.

Collision signals are returned to the processor modules, which store the collision state information and revert to the transmission of the idle sequence as the winning processor continues to transmit. A processor may begin a new transmission as soon as it detects the transition from $COL_{IN}$ to $\overline{COL_{IN}}$. In addition, a processor may begin a new transmission after receiving idles for 2N byte times, where N is the number of tiers in the network, as this also indicates that the network is clear of any prior transmissions. This latter method of enabling new transmissions permits a processor entering a network for the first time to get into message synchronism with the network under conditions of light traffic, so that it need not wait for a poll from another processor in order to start interchange with other processors on the network.

Parity error states have been noted in the state diagram of FIG. 5 and are established pursuant to the following logic:

$$PESIG = AIPE \cdot \overline{AIPEDLY} + BIPE \cdot IPEDLY/$$

If PESIG then (URIN 0:7, C, P=1 . . . 1, 1, 1) to implement this logic, the transitional parity error propagaton circuits 76 comprise an AIPE, or A input parity error flip flop and a delay flip flop (AIPEDLY). The latter is set 1 byte clock later in accordance with the AIPE setting. For A inputs, the PESIG value thus goes high for 1 byte clock when the AIPE flip flop is set by a parity error, so that the PESIG signal is propagated once, at the first indication of the parity error. The same condition arises when all of the data bits, control and parity bit are 1 values, which occurs at the previously noted transition in the state of the global resources All lines then go high, forcing all 1's and establishing an even total (odd parity) so that the AIPE and AIPEDLY flip flops are set as previously described, to denote the parity error. This system operates in the same way when the message packet received on the B port contains a parity error or a forced parity indication of change of status.

Parity errors arising because of noise effects or other variables will typically not affect processor operation because of the redundant networks. For monitoring and maintenance purposes, indicator lights (not shown) are utilized to indicate the occurrence of parity error. The once-propagated parity error denoting change of status, however, initiates routines for assessing the significance of the change.

The clocking system used in the node 54, as shown in FIG. 4, provides a unique means for maintaining zero skew between the clocks at all the node elements, despite the number of tiers used in the network. The clock circuits 86 include first and second EXCLUSIVE OR gates 88, 89 respectively, the outputs of which, designated A and B, respectively, are subtractively combined (in the B-A sense) by a summing circuit 92, the output of which is passed through a low pass filter 94 to control the phase of the output from a phase locked loop or oscillator 96. The inputs to the first gate 88 are the output of the PLO 96 and a downstream clock passed from the next higher tier node element through an isolating driver 97. This line is designated as the word clock, and is derived from the next higher tier after a certain known delay, $\tau$, the same signal being returned through another isolating driver 98 to the node at the next higher tier. The inputs to the second gate 89 comprise the word clock and a clock feedback from the next lower tier, which also receives a signal from the PLO 96.

The word clock line feeds the two inputs of a third gate 100, both directly and through a $\tau_c$ delay line 101, to derive a byte clock signal at twice the frequency of the word clock and in timed relation to it.

The functioning of the clock circuits 86 may be better understood by reference to the timing diagram of FIG. 7. The clock out signal is the output of PLO 96. Inasmuch as a paramount objective of the system is to maintain a zero time skew between these outputs for all nodes in the network, it is clear that they must also have the same nominal frequency. The transmission line delay, $\tau$, between nodes is kept substantially constant, but can be long. Using the presently disclosed technique the length could be as long as 28 feet, with the network and node byte clock rates (nominally 120 ns.) used in a practical system. Those skilled in the art will recognize that lengths which are integer multiples of 28 feet can readily be obtained by adding tiers to the network which are not fully populated with the maximum possible number of processor modules. There will be a corresponding increase in the latency or transmit time through the network.

The word clock derived from the next higher tier, as shown by the next lower waveform, is a similar waveform but delayed by $\tau$. The word clock constitutes the basic timing reference throughout all the nodes, and this is made possible because the leading edge of each clock out signal is controllable within the circuit and can be made to lead the word clock so that all nodes can be held in synchronism. Referring to the waveforms A and B, it can be seen that the first gate 88 generates a pulse A which terminates with the leading edge of the word clock, while the second gate 89 generates a pulse B whose leading edge is coincident with the word clock. The trailing edge of the B pulse is defined by the initiation of the feedback pulse from the next lower tier mode, which is delayed by $\tau$, so that the B pulse is of fixed duration. The clock circuits 86 function to keep the pulse A of the same duration as pulse B, because the summed signal, B-A, tends toward a null, as the PLO 96 is advanced in phase so as to establish synchronism. In effect, the leading edge of the A signal, which may lead or lag the desired position as shown by dotted lines, is adjusted to precede the leading edge of the word clock by the interval $\tau$. When the leading edge of the clock out signal is in this desired nominal position at all the nodes, there is zero skew between the word clocks. For this reason the processors coupled to the network are freed from any constraints as to the total length of the path between one processor and another, because additive delays and differential propagation times are eliminated.

To produce the double frequency byte clock, the word clock signal is replicated at a delay $\tau_c$ by the delay line 101, which also feeds the gate 100. Thus, as seen in the waveform labeled byte clock in FIG. 7, at either edge of the word clock, a byte clock pulse is produced having a duration $\tau_c$. This occurs twice each word clock interval and in synchronism with the word clock throughout all the nodes. It is implicit in the prior description that the delays introduced by the transmission lines between nodes are nearly identical in both directions between tiers so that in effect all word clocks and byte clocks within the system are held in stable phase relationship. The locally generated byte clocks therefore provide clocking at each node for the individual bytes in the 2 byte words of the messages.

The active logic nodes are of potential benefit wherever a competition between concurrent message packets is to be resolved on the basis of data content. Most known systems as exemplified by U.S. Pat. No. 4,251,879 issued Feb. 17 1981 on a "Speed Independent Arbiter Switch for Digital Communication Networks" are directed toward determining the first signal received in time, and utilize external processing or control circuits.

Processor Modules

The individual processors in the overall system diagram of FIG. 1 are identified as examples of interface processors (IFPs) 14 and 16 and access module processors (AMPs) 18 to 23 respectively, and are broadly subdivided into principal elements. A more specific example of the organization of the processor modules shows the correspondence to the broad functional subdivisions of FIG. 1 but also reveals a substantial number of further subdivisions. As used herein, the term "processor module" refers to the entire assembly shown in FIG. 8, which with the optional features that are noted can serve either as an IFP or an AMP. The term "microprocessor system" refers to a system 103 that incorporates a microprocessor 105 such as a 16 bit microprocessor of the Intel 8086 type. The address and data busses of the microprocessor 105 are coupled within the microprocessor system 103 to conventional peripheral systems, such as the main RAM 107, and a peripheral controller 109. The peripheral controller 109 exemplifies what may be used when the processor module is an AMP and the peripheral unit is a disk drive 111. As shown in the dotted line rectangle, however, this controller or interface may alternatively be a channel interface if the processor module is to serve as an IFP. In this instance the channel interface would communicate with the channel or bus of a host system. Inasmuch as conventional controllers and interfaces may be used in the microprocessor system 103, they need not be further described.

It is noteworthy that it can be shown to be advantageous to use one disk drive per microprocessor, in terms of both cost and performance. This is true as to data base machines in general, even though there may be benefit at times in arranging one microprocessor so as to have access to a number of secondary storages. The diagram omits, for purposes of brevity, the incorporation of other subsystems that would typically be used, such as interrupt controllers that are supplied by semiconductor manufacturers for use in conjunction with their systems. Those skilled in the art will recognize the importance of a suitable scheme for distribution of electrical power to the processor modules to attainment of the full degree of redundancy and reliability the invention can provide.

The peripheral controller 109 and the channel interface depicted as an option in the microprocessor system 103 correspond to the IFP interface and disk controller in FIG. 1. The high speed RAM 26 of FIG. 1, however, actually comprises first and second H.S. RAMs 26', 26" respectively, each of which through time multiplexing is effectively a three-port device coupled to the microprocessor bus system at one of its ports (designated C). Each of the H.S. RAMs 26', 26" cooperates respectively with a first or second network interface 120, 120', providing communication with the first and second networks 50a and 50b (not shown in FIG. 8) respectively at an input (receive) port A and output (send) port B. With these redundant systems, only the second network interface 120' and the second H.S. RAM 26" need be described in detail. The network interfaces 120, 120' are further shown and described in conjunction with FIG. 13, but can be generally subdivided into four principal parts:

Input register array and control circuits 122 coupling the ten input lines from the second network 50b to the A port of the H.S. RAM 26" via an interface data bus and address bus.

An output register array and control 124 coupling the output lines of the second network 50b to the interface data and address busses and to the B port of the second H.S. RAM 26".

A microprocessor bus interface and control 126 coupled to the interface address and data busses and to the A and B ports of the H.S. RAM 26".

A clock generator 128 that receives the word clock from the network and generates synchronized, properly phased clocks for controlling the interface 120'.

The second network interface 120' and H.S. RAM 26" cooperate with the microprocessor system 103 in coordinating data transfers between the high speed network and the relatively slower speed microprocessor and also provide queuing of messages between these different systems. The microprocessor bus interface and control 126 may be referred to as performing read/write (R/W) functions with the microprocessor system which (at least with the Intel 8086) has the capability of writing directly into and receiving data from the H.S. RAM 26".

Although the IFP and AMP systems are functionally alike, there can be a substantial disparity in the sizes of the incoming message storage and outgoing message storage in the H.S. RAM 26", as between the IFP and the AMP. In a relational data base system, the IFP has a large incoming message space in the H.S. RAM 26", in order to receive new messages from the high speed network so that the needs of the host computer may be serviced by constant usage of the network. In the AMP the reverse is true, because more storage space should be available to send processed message packets to the high speed network. The H.S. RAM 26" functions with the main RAM 107 in the microprocessor system 103, which has message buffer sections for each network.

Figure 9:
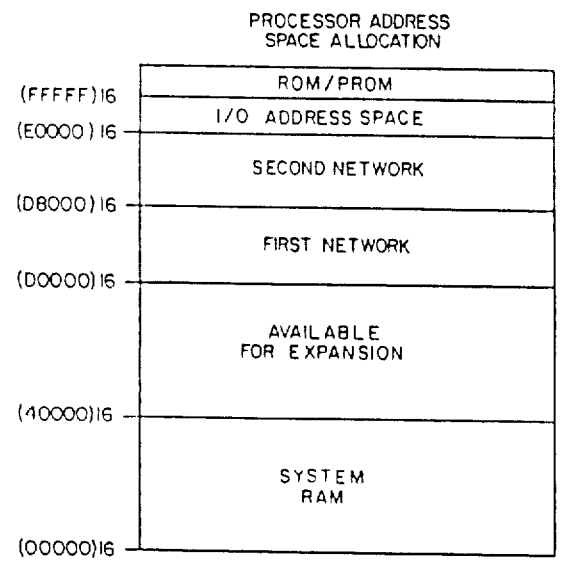
FIG. 9 is a diagram of address allocation in the main RAM of a microprocessor system as shown in FIG. 8.

The allocation of system address space in the main RAM 107 for the microprocessor system 103 is shown in FIG. 9, to which reference should briefly be made. It is conventional in having addresses devoted to system random access functions to provide an expansion space for use in the event the random access capacity is increased, an I/O address space and an address space reserved for ROM and PROM (including EPROM) functions. In addition, portions of the system address space are reserved for message packets from and to the first and second high speed RAMs 26', 26" respectively. This provides greater flexibility in the system operation, inasmuch as even though the microprocessor 105 can address the H.S. RAMs 26", the main RAMs 107 assure greater freedom from software and hardware interdependence.

It has been stated, referring again to FIG. 8, that the bidirectionally accessible H.S. RAMs 26" are organized in such fashion that they perform central functions in multiprocessor mode control, distributed updating and the management of message packet flow. For these and other purposes, the H.S. RAM 26" is divided into a number of different internal sectors. The relative disposition of the different sectors shown in FIG. 8 is used throughout the different processor modules in the system, and the specific addresses that designate the limits of the sectors refer to those used in an actual system. It will be appreciated that the sizes of these sectors of memory and their relative disposition are widely variable dependent on the specific system context. Sixteen bit memory words are employed in this example. The selection map and response directory are dedicated lookup tables of the type that may be written in once during initialization, while the transaction number section provides a dynamically revisable lookup table.

The selection map section of memory starts with location 0 but is based upon the use of four different maps used in interrelated fashion within the memory section. The destination selection word (DSW) that is contained within the message packet is used cooperatively with the dedicated selection maps in the H.S. RAM 26". The destination selection word, comprising 16 total bits, has a map address in 12 bit positions, and map selection data in the four other bits. Each of the first 1024 16 bit memory words of the H.S. RAM contains four map address values. The address value specified by the DSW provides, with a single memory access to the H.S. RAM, map bits for all four maps, while the map selection bits in the DSW determine which map is to be used.

Figure 15:
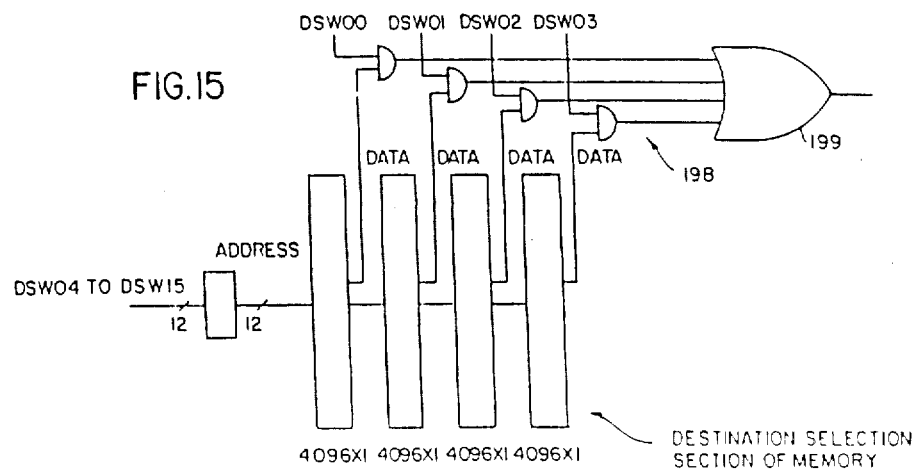
FIG. 15 is a block diagram showing further details of organization of memory and a system for mapping in accordance with destination selection words.

FIG. 15 shows the conceptual organization of the map section as if each map had physically separate 4096-by-1-bit RAM. As a matter of implementation convenience all map data is stored in a single portion of the H.S. RAM, as shown by FIG. 8. The DSW Management Section 190 (FIG. 13) controls multiplexing of four bits from each of the four maps of FIG. 15 from one 16-bit word of H.S. RAM. Those skilled in the art will recognize the advantage of the scheme in that the maps can be initialized by the processor by the same means as used to access other parts of the H.S. RAM.

There are also three different classes of destination selection word that are used, and the selection map locations are correspondingly divided into a hash selection portion, a class selection portion and a destination processor identification (DPID) selection portion. The DPID specifies whether the processor 105 is the specific one for which the message packet is intended, whereas the class selection portion specifies whether or not the processor is one of the number of processors in a particular process class that is to receive the message packet. The hash values are stored in accordance with the manner in which the data base is distributed throughout the relational data base system, following a predetermined algorithm for the particular relations and method of scatter storage that are employed. The hash value in this instance can designate the processor either as having primary or backup responsibility for the data. Thus the selection maps provide a technique for directly addressing the H.S. RAM 26" so as to determine processor destination. This function complements the broadcasting of prioritize messages to all network interfaces 120' and enables local accessing without interruption of microprocessor 105 status.

A separate section of H.S. RAM 26" serves as a pivotal means for checking and controlling globally distributed activities. Transaction numbers (TNs) are assigned to various ones of the processes that are sent on and received from the network 50b, as discussed above and shown in FIG. 3. TNs within messages are retained as global transaction identities as each microprocessor system 103 independently performs the subtasks accepted by it. The block within the H.S. RAM 26" that is dedicated to a number of available transaction number addresses contains status entries that are locally controlled and updated by the microprocessor system 103 as these subtasks are performed. The TN is used in a number of different ways, both locally and globally, in performing intercommunication functions. The transaction number is used to identify subtasks, to call forth data, to provide commands, to control message flow and to characterize the dynamics of a global process. Transaction numbers may be assigned, relinquished and changed in the course of global communication. These aspects are explained more fully in the following description.

The most complex, but perhaps the most dramatic, aspect of the TN is the capability it affords, with the sort network, for distributed updating of the status of local processors as to a given control process. Each control process (i.e., task or multiprocessor activity) has its own TN.

Readiness state values are held in the transaction number section of H.S. RAM 26" and are locally modified under control of the microprocessor system 103. The microprocessor 103 can initialize the appropriate entry (e.g. SACK/Busy) in the response directory (address 050D (hex)) of FIG. 10, and enter the SACK/Busy status by transferring the exact image thus reproduced to the H.S. RAM 26". An entry at a TN address is accessible to the network 50b via the interface 120', at the A and B ports of the H.S. RAM 26". Queries are made using a Status Request message containing the status request command code (see FIG. 11) and TN. The interface 120' uses the content of the designated TN to reference the response directory which contains a properly formatted response message. A global status query as to a given TN, when received at the second network interface 120' elicits a direct response that is solely hardware controlled. No prefatory communication is needed, and the microprocessor system 103 is not interrupted or affected. However, the microprocessor 103 can assure against interruption when setting the status by transmitting a LOCK indication to the interface 120', which communicates the Lock word derived from 0501 (hex) until removed at a later time.

The word format of the readiness states is shown by the seven states from "busy" to "initial" in FIG. 12, which depict the useful variants employed in a practical system. More or fewer status variants may be used, but these seven states provide versatile and comprehensive control. It is the responsibility of the microprocessor system continually to update status levels for different TNs in the H.S. RAM 26" to reflect availability for, or progress toward the completion of a subtask. Such updates are made simply by writing into the TN address in the H.S. RAM 26", using the formats shown in FIG. 12.

In FIG. 10 each status response is accompanied by an initiating status acknowledgment command code (SACK), from 05 to 0D (hexadecimal). The SACK responses sent to the network are essentially the command codes of FIG. 10, the numeric portions of the word formats of FIG. 12, and an originating processor ID (OPID), as seen in FIG. 11. The SACK responses thus define a consecutive priority subgrouping within the overall coherent priority scheme shown in FIG. 11. The OPID is significant in the priority scheme, because if a number of processors are working on a TN but are "Busy", the highest priority message that is broadcast is determined by the OPID. Transfers and system coordination can be based on this data.

The SACK message priority schedule, the simultaneous responses from a number of microprocessor systems 103, and the dynamic prioritizing in the network 50b, enable the status of global resource as to a given task to be determined in a vastly improved manner in comparison to prior art systems. The response given is unambiguous, cannot represent an invalid state and requires no software or local processor time. Thus Deadlock cannot arise due to repeated requests interfering with task performance, for example. Numerous multiprocessor options can be used at the different status levels. It is unique that the local processors can continue to operate independently and that a single query derives a global, prioritized, response.

Some specific discussion of the successive states depicted in FIG. 12 may be useful. The "busy" and "waiting" states connote successively more complete phases as to the assigned subtask, the latter identifying a condition in which a further communication or event is required. These states exemplify the "elevation" of the status of the TN until it reaches a level at which a message packet corresponding to the TN can be sent or received.

When a message packet is to be sent or received, however, a different feature of the TN comes into play, namely its capability for message control. When the microprocessor system 103 has a message for transmission, the status indication becomes "send ready". The microprocessor system 103 not only updates status but it also enters a "next message vector" value in the H.S. RAM 26", using the word format of FIG. 12. This entry defines the location at which the corresponding output message may be fetched from H.S. RAM 26". This vector is used internally in the network interface 120' in chaining together output messages pertaining to a specified TN.

A related function is performed during the "receive ready" state, in which the TN storage location retains an input message count from the microprocessor system 103 as to the number of messages that may be received pertaining to a given TN. This count can be decremented until reduced to zero as successive input messages are transferred. At zero, no more messages can be received and an overrun condition can be indicated. This enables the TN to be used in pacing transfer between the network 50b and the microprocessor system 103.

Locally, at each processor the TN is retained in the send and receive messages during processing, as a constant and uniform reference throughout the system. The TN0 or default state also provides a local command to identify the fact that a message is to be used in a non-merge mode.

From the global standpoint, moreover, the distinction between TN0 and TN>0 values establishes one of the command functions for which the TN is used. The merge/non-merge characterization thus inherent in each message packet, provides a valuable systems approach to prioritizing and sorting messages. Similarly, the "Assigned", "Unassigned", "Non-Participant" and "Initial" status are used to fulfill global intercommunication and control functions. The "Unassigned" state is one in which the processor has previously relinquished a TN, so that it must receive a new primary message reactivating the TN. If the processor indicates "Unassigned" when it should be "Assigned", this establishes that the TN was not properly entered and that corrective action should be taken. When a TN is "Assigned" where it should be "Unassigned", this may indicate a faulty transfer or a competition between two processors for a new TN. Neither "Assigned" nor "Unassigned" is treated as a readiness state, inasmuch as the processor has not yet undertaken work on the TN at these stages.

The "Initial" and "Non-Participant" states are also significant in global resource terms. A processor which comes on line and which therefore must be brought into the system is in the "Initial" state, which indicates that administrative steps are needed to bring the processor on line. Those processors which are "Non-Participants" in a given task do not need to do any processing locally, but must keep track of the TN so as not to inadvertently use it in an erroneous manner.

The dedicated directory or reference section of the H.S. RAM 26", referring again to FIG. 10, also includes other types of prioritized messages for use in generation of responses by hardware. NA (not assigned) entries are held available for future use. Three different types of NAK responses (Overrun; TN Error; Locked) are of lowest data content and at highest priority levels because they identify error conditions. The SACK responses are followed, in order of decreasing priority, by the ACK response and the NAP (not applicable processor) response. In the present implementation, two response command codes are not assigned (NA) and are available for future use. This directory can be initialized by software and is used by hardware to quickly and flexibly generate any of the range of response message texts.

A separate portion of this directory is used to store TOP, GET, PUT, and BOTTOM addresses or pointers related to the functioning of circular buffers for input messages and completed output message pointers. These pointers function in conjunction with the dedicated sectors of H.S. RAM 26" devoted to input message management and output message management respectively. For incoming messages, a circular buffer scheme is used, with "TOP", stored in the directory section of the H.S. RAM 26", being a variable address defining the upper position for incoming messages. The PUT address, also stored in the directory section, defines where the circuits are to store the next message that is received. The GET address is provided and kept updated by software to enable the hardware to recognize the location at which the software is emptying the buffer.

The incoming message buffer is managed by setting PUT at the bottom of the buffer and starting with the GET address equal to TOP. The rule of operation assured by software is that GET is not set equal to PUT, which would create an ambiguous condition. As messages are entered into the incoming message buffer in H.S. RAM 26", the message length value in the message itself establishes the beginning point of the next message and the PUT address stored in the directory is then changed to indicate where the next succeeding message is to be received in the buffer. Incoming messages can thus be fetched by the microprocessor system 103 as its capabilities permit.

Data in the output message space within the H.S. RAM 26" is utilized in conjunction with the output message complete vectors held in a separate circular buffer and the next message vector in the H.S. RAM 26". Messages can be assembled and stored in arbitrary locations, and related messages can be chained together for transmission on the network. In the directory section of the H.S. RAM 26", TOP, BOTTOM, PUT and GET addresses are entered and updated as previously described to maintain active present references to locations within the output message complete buffer. The message complete vectors constitute addresses which reference messages in the output message space that have been successfully transmitted as indicated by a response received. As described below, the system enables the microprocessor system 103 to enter output messages readily, but to handle complex linkage vector sequences in orderly fashion so that output message space is efficiently used and message chains can be transmitted.

The protocol of FIG. 11, which was previously discussed as to responses, is continuous with respect to the primary messages as well. Response messages are given in sequence, the hexadecimal command codes being stated in ascending order. In the primary message grouping, the stop merge (also the base or non-merge control) message is of lowest data content and highest priority. This message constitutes a control communication that terminates merge mode within the network and at the processor modules.

A substantial number of different types of primary data messages can be used in ascending priority, and can be categorized in priority order based upon application and system requirements. As mentioned, continuation messages can have higher priority so as to maintain continuity with the preceding message packet to which they relate.

The last grouping of four primary messages in FIG. 11 comprise, in descending order of priority, the status request message, which is the only type of status message needed to obtain the status response, control messages calling for "relinquish TN" and "assign TN", and, of lower priority, a "start merge" control message.

This system permits versatile operation, as will be evident from the more detailed examples given hereafter. A processor module operates on a present transaction number (PTN hereafter), whether this is externally commanded from the network or generated internally in the course of successive operations. When merge operations are being carried out, the processor modules utilize the global reference or transaction identity defined by the TN. Starting, stopping and restarting of merge operations utilizes only simple message changes. When subtasks do not require messages to be merged, or message packets are generated that have no specific relationship to other messages, they are queued to an output against TN0 and are transmitted when the base or default condition defined by Present Transaction Number (being 0), holds true. TN0 condition enables messages to be queued for transmission whenever a merge mode is not utilized.

Network Interface System

FIG. 13, to which reference is now made, depicts in further detail one example of interface circuits useful in systems in accordance with the invention. This section of the description includes a number of detailed features that are not necessary to an understanding of the invention but are embedded in a practical system example and are therefore included to place the examples more firmly in context. Specific gating arrangements and details not the subject matter of the invention and involving well known expedients for which many alternatives are available have been omitted or abbreviated. FIG. 13 is an elaboration of the second network interface 120' and the H.S. RAM 26'' from FIG. 8. The interfaces 120 for both networks function in like fashion and thus description of one will suffice.

In FIG. 13, inputs from the particular active logic network 50 associated with the interface are applied at network message management circuits 140 via a multiplexer 142 and known parity check circuit 144. The multiplexer 142 is also coupled to the microprocessor system data bus, enabling access to the message management circuits 140 via the bus. This feature permits the microprocessor system to operate the interface in a step-by-step test mode, transferring data as if the interface were on line to the network. Inputs from the networks are applied to a receive network data register 146, both directly in a first section and through a receive byte buffer 148 which thereafter enters the byte into a different section of the receive network data register 146. Consequently, both bytes of each word received are entered into and held available at the receive network data register 146.

Figure 21A:
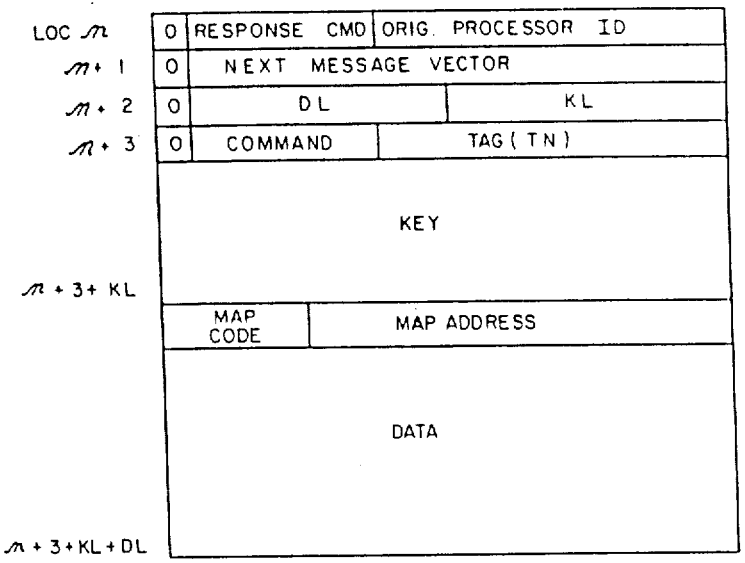
FIGS. 21A and 21B, are diagrams of messages stored in the high speed random access memory.

Output messages for transmission are entered into a send network data register 150, while a parity bit is added in a conventional parity generator 132. Messages are sent to the associated network from the network message management unit 140, or (where the test mode is to be used) to the microprocessor system data bus. For message management purposes within the interface, the send message format in the random access memory 168 comprises identifying data as well as message data. As seen in FIG. 21A, command, tag, key and DSW can all be incorporated along with primary data that is to be transmitted.

The organization shown in FIG. 13 is essentially the same as that shown in FIG. 8, which illustrates the interface data bus and address bus as separately coupled to input ports A and B at the H.S. RAM 26', while the address and data busses of the microprocessor system 103 are illustrated as coupled to a separate C port. In actuality, as seen in FIG. 13, this separate bidirectional access is achieved by time division multiplexing of input and output address functions within the interface and at the H. S. RAM 26''. The microprocessor data and address busses are coupled to the interface busses via gates 145, 149 respectively so that the microprocessor can operate asynchronously on its own internal clock.

Figure 14:
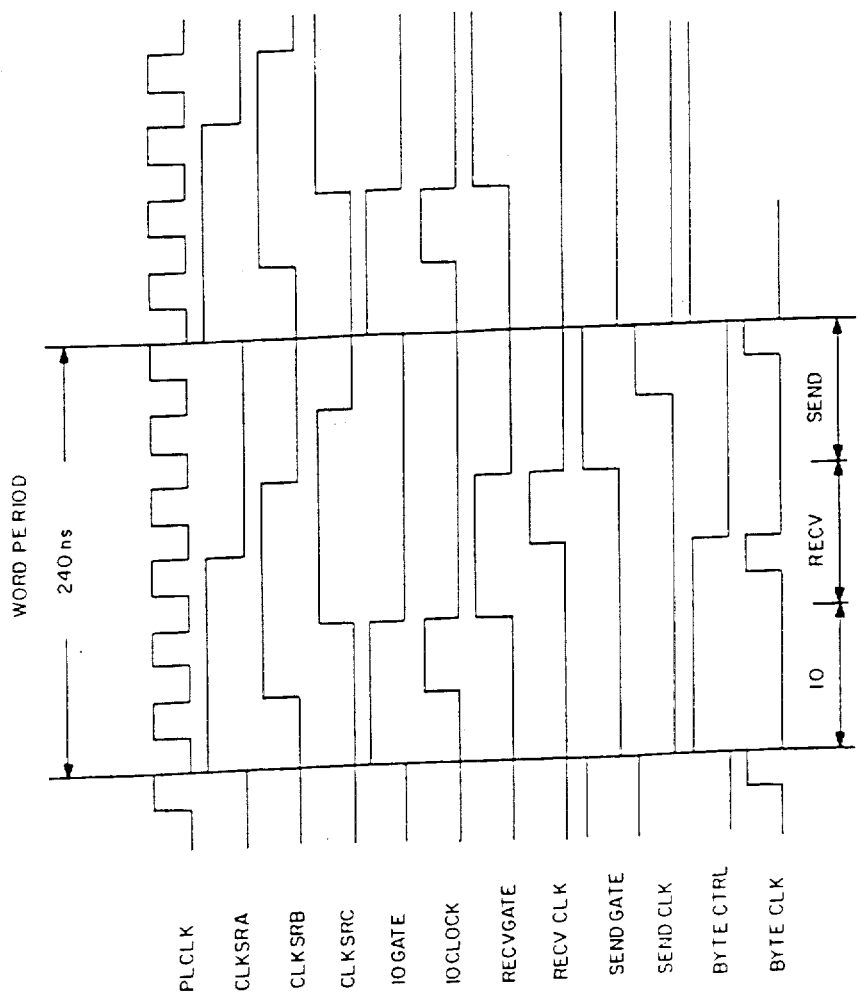
FIG. 14 is a timing diagram showing various clock and phase waveforms used in the interface circuits of FIG. 13.

The timing system used is based upon clock pulses, phase control waveforms and phase subdivision waveforms generated by interface clock circuits 156 (FIG. 13) and having the timing relationships shown in FIG. 14, to which reference is also made. The interface clock circuits 156 receive the network word clock from the nearest node and a phase locked clock source 157 includes means for maintaining zero time skew as previously described in conjunction with FIG. 4. The nominal network word clock rate of 240 ns. in the network is subdivided in time in the interface clock circuits 156 because a frequency multiplier (not shown in detail) held in phase locked relationship provides a faster clock defining reference period of 40 ns. duration (shown in FIG. 14 as PLCLK). The basic word period is defined by the opposite-going half cycles of a cyclic signal designated CLKSRA having a total 240 ns. duration. Two other signals of like frequency and duration are generated from PLCLK by frequency dividers 158 at times delayed by one and two cycles of PLCLK respectively from CLKSRA, and these are designated CLKSRB and CLKSRC respectively.

From these signals, control logic 159 develops timing waveforms, designated IO GATE, RECV GATE and SEND GATE, denoting successive equal thirds of the word period. These intervals are appropriately referred to as IO, receive and send phases. The phases defined by the gate signals are each further subdivided into two equal half intervals by IO CLK, RECV CLK and SEND CLK signals which define the last half of each of the phases. Byte clocking functions are governed by BYTE CTRL and BYTE CLK signals.

The IO, RECV and SEND phases provide the basis for time division multiplexed operation of the random access memory 168 and the microprocessor system busses. The interface can receive or send no more than one word per word period from or to the high speed network, and receiving and sending are obviously never concurrent. Transfer rates to and from the microprocessor system are substantially lower, but even if equal the capacity of the interface circuits would not be taxed. The interface system arrangement hinges in large part on direct access to the random access memory 168, and substantially obviates the need for internal processing or software. Thus as the system cycles through the successive phases in each word period, words are successively advanced in non-conflicting progressions along their predetermined signal paths for the different functions taking place. For example, sending a message to the bus may be interleaved with reception of a message from the microprocessor, each being interchanged using a different portion of the memory 168.

Intercommunication between the data bus for the microprocessor system and the network interface is effected in IO (which may also be referred to as Read/-Write) management circuits 160. A write gate 162, for words from the microprocessor system, and a system read register 164, for transferring words to the microprocessor system provide the coupling between the microprocessor's bus and the bus interface to the network interface.

A memory address register 165 and parity generator and check circuits 166 are also incorporated in the network interface subsystem. In this example the high speed storage comprises a 4K word×17 bit random access memory 168, the internal subdivision of which and the use of dedicated memory portions within which have previously been described. The size of the random access memory can readily be reduced or expanded to meet the needs of a particular application.

Receive message buffer management circuits 170 are coupled to the data bus of the microprocessor and in turn are coupled to the address bus for the memory 168. The term "received messages" refers both to the incoming messages from the network for entry into the circular buffer at a location referred to as PUT and to the subsequent transfer of that message to the microprocessor system when a GET value specifies where the system is to sequence in extracting a received message for transfer to the microprocessor system. Address values for accessing the random access memory 168 are entered into a GET register 172, a TOP register 174, a PUT counter 175 and a BOTTOM register 176 respectively. The PUT counter 175 is updated by incrementing from an initial position defined by the BOTTOM register 176. The TOP register 174 provides an opposite limit reference. Both TOP and BOTTOM may be manipulated by software control to modify both the size of the receive buffer and the absolute location with H.S. RAM. When the contents of the PUT register equal the contents of the TOP register, the PUT register is reset to the contents of the BOTTOM register, thus effecting the circular nature of usage of the buffer. The GET, TOP and BOTTOM registers and the PUT counter are shared in managing both the incoming message and output message complete circular buffers.

Entries are made in the GET register 172 under software control, because the length of the then active message in the buffer determines the next address. Comparison circuits 178, 179 coupled to the outputs of the GET register 172, the PUT counter 175 and the TOP register 174 are used in detecting and indicating overrun conditions. An overrun exists when the GET and PUT settings are set equal or when GET is attempted to be set greater than TOP. In either instance an overrun status indication is to be sent until the condition can be corrected.

The concatenated manner in which the "receive message" circular buffer is arranged and operated is particularly useful in the present system. Hardware management of PUT and dynamic management of GET can be employed with cross-checks being available to avoid conflict. However, other buffer systems may be employed, although perhaps at some added expense in circuitry and software. The receive message format in memory 168 also, referring now to FIG. 21B, contains identifying data in the form of map results, data length and key length, derived as described hereafter.

A DSW management section 190 within the interface includes a destination selection word register 192 into which the destination selection word is entered for transfer to the address bus. In using the DSW to address the dedicated DSW section of the memory 168, the output on the data bus, from the memory, returns data from which the DSW management section 190 may also determine that the message packet is appropriate for the processor. It will be noted from FIG. 13 that the Destination Selection word comprises 2 bits of map nybl address, 10 bits of map word address, and 4 bits for map selection. The "nybl" address is used to delineate a subsection of a word from memory 168. The 4 map selection bits are applied to a map result comparator 194, which receives relevant map data from the memory 168 via a multiplexer 196. The multiplexer 196 receives 16 bits, representing 4 different map data nybls stored at the address defined by the 10 map word address bits in the DSW. The memory 168 is specifically organized in comparable fashion in the dedicated map section to facilitate this comparison. The appropriate one of the four map nybls is selected by the 2 remaining bits in the DSW, applied to control the multiplexer 196. A comparison is made, and the resulting map code is entered in the map result register 197 and inserted in the incoming message entered in the memory 168. If the comparison shows that a "one" bit is not present in any of the selected maps, a "reject" is generated to indicate that the processor module is not intended to receive the message packet.

Referring to FIG. 15, there is shown in general form an advantageous way to subdivide the memory 168 in the dedicated destination selection portion and to make the map result comparison. Each map is organized as 4096 words×1 bit, and further subdivided (see FIG. 8) into specific processor ID, class ID and hashing sectors. Using the 12 address bits (10 address and 2 nybls) the common map address is selected and a 1 bit output is derived from each map. (The multiplexer and nybls of FIG. 13 are not shown for simplicity in FIG. 15). The four parallel bit outputs can be compared to the 4 map selection bits in a group of four AND gates 198, so that if one or more compare, the output of an OR gate 199 goes true. The map result can be entered in the map result register 197 of FIG. 13 and the message can be accepted in the memory 168. Alternatively, the message is rejected and a NAK is transmitted.

The command word management section 200 includes a command register 202 that receives the command word. The TN field of the command word has access to the address bus so that the referenced receive TN may be examined to determine the proper response message (see FIG. 18). In addition, during a Start Merge command, a data path exists from the TN field to the PTNR 206 in order that the PTN value may be changed in conjunction with a Start Merge command.

Figure 21B:
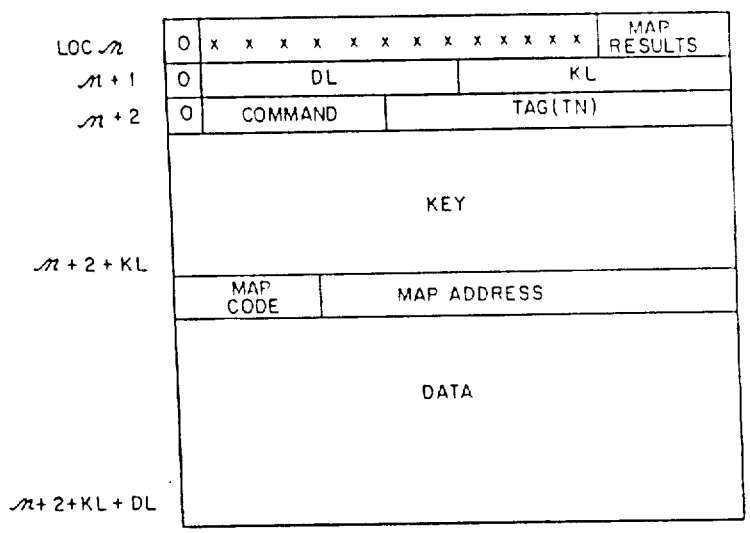

The incoming messages entered into the memory 168 also include, as discussed relative to FIG. 21B, for address vector purposes, the value of the length of the data field and the key field, if these fields are used. These values are derived by a receive data length counter 210 and a receive key length counter 211, each of which counts the sequence of words in the appropriate field as the fields are presented by the input source.

A send message management section 220 is also used to encompass the functions of accepting processed packets for memory 168 and transferring them to the network at a later time. This section 220 comprises a send transaction vector counter 222, a send data length counter 224 and a send key length counter 226 coupled bidirectionally to the data bus. The send transaction vector counter 222 is coupled to the address bus, while the send data length counter 224 is coupled to an address generator 228 which is in turn coupled to the data bus. The output buffer section and the circular buffer comprising the output message complete vector section of FIG. 8 are both used in sending messages. In this instance, however, message packets are entered serially, but then fetched in a sequence defined by the vectors.

Within the interface, the separate operating phases are carried out at mutually exclusive times, and this time sharing permits the memory 168 to receive and supply network message packets at the network clock rate, operate internally at an effectively higher rate, and communicate with the microprocessor system, which operates asynchronously at its slower clock rate. To control gating of the messages to the various counters and registers, phase controls respond to control bits which generate command, DSW, data and other signals denoting the individual fields within the messages. Send state controls 250, receive state controls 260 and R/W state controls 270 receive the clock pulses, identify the fields within the data and control sequencing of data flow during the send, receive and processor clock.

Control of the interface is then effected by three finite state machines (FSMs) one each for the send, receive and processor (R/W) phases. The FSMs are implemented in a conventional manner, using programmable logic arrays (PLAs), a state register and action ROMs. Each FSM is advanced to its next state once per network clock cycle. Because of the number of control signals to be generated, the outputs of the PLAs are further encoded by action ROMs. Those skilled in the art will readily appreciate that translation of the control sequences implied by the operation of the network as described to FSM mode so as to incorporate conventional details and operations is a tedious but straight-forward task.

Figure 17:
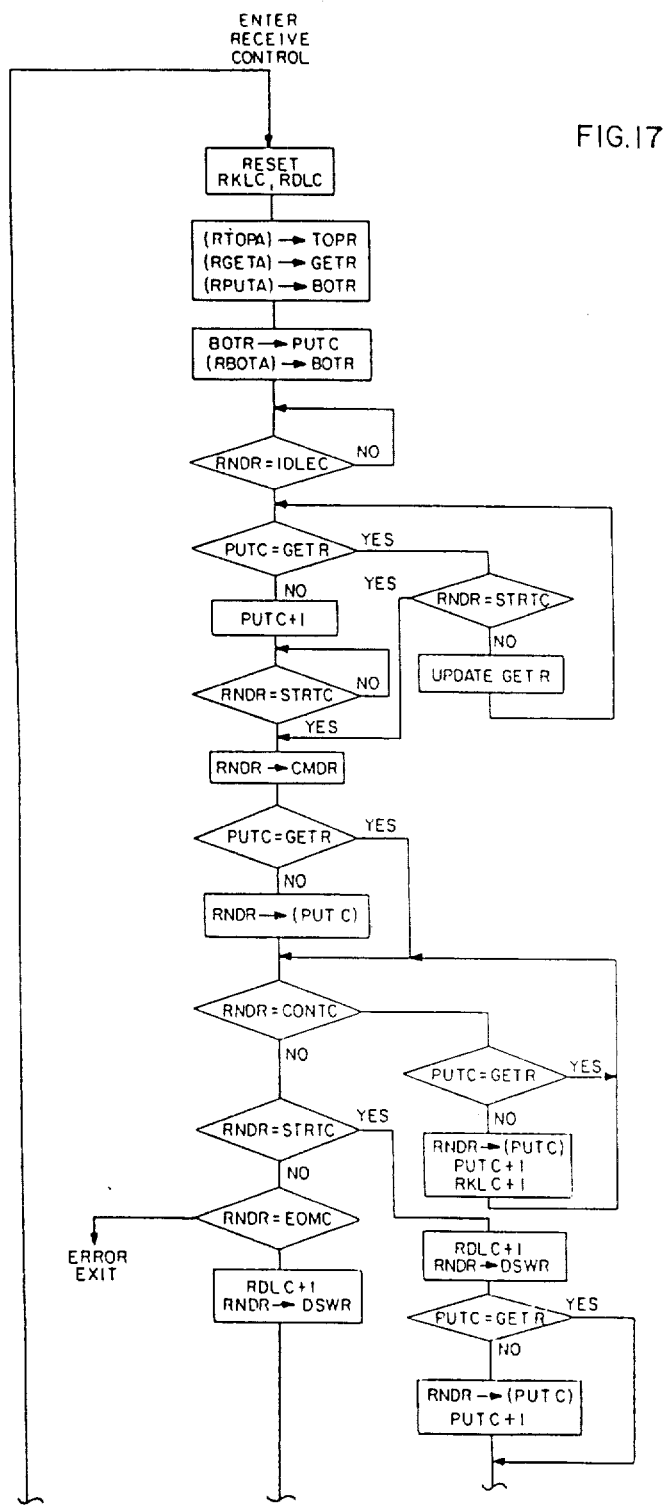
FIG. 17 and FIG. 17A are flow diagrams depicting status changes in receiving a message to be abutted with FIG. 17 on the top.
Figure 17A:
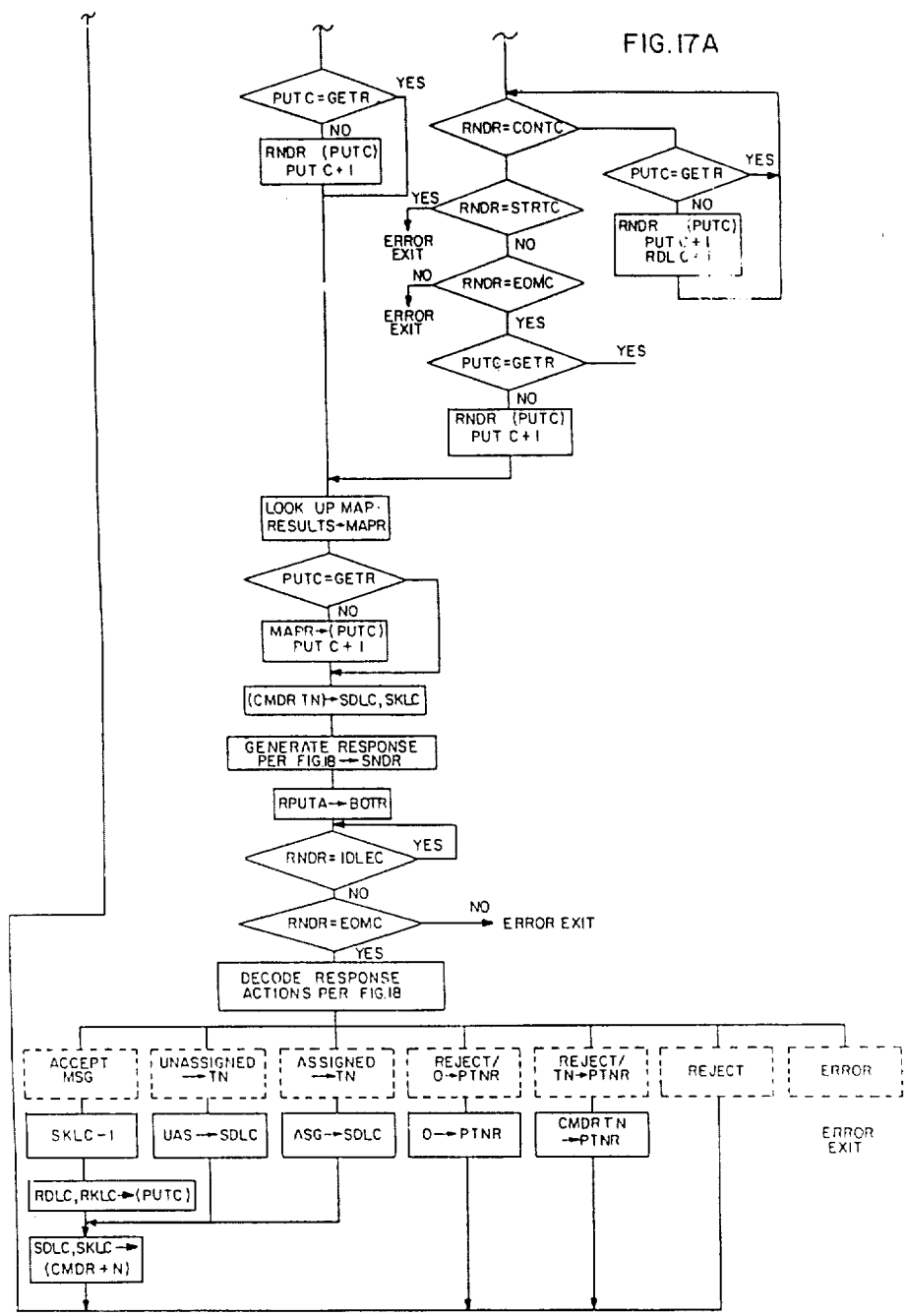
Figure 19:
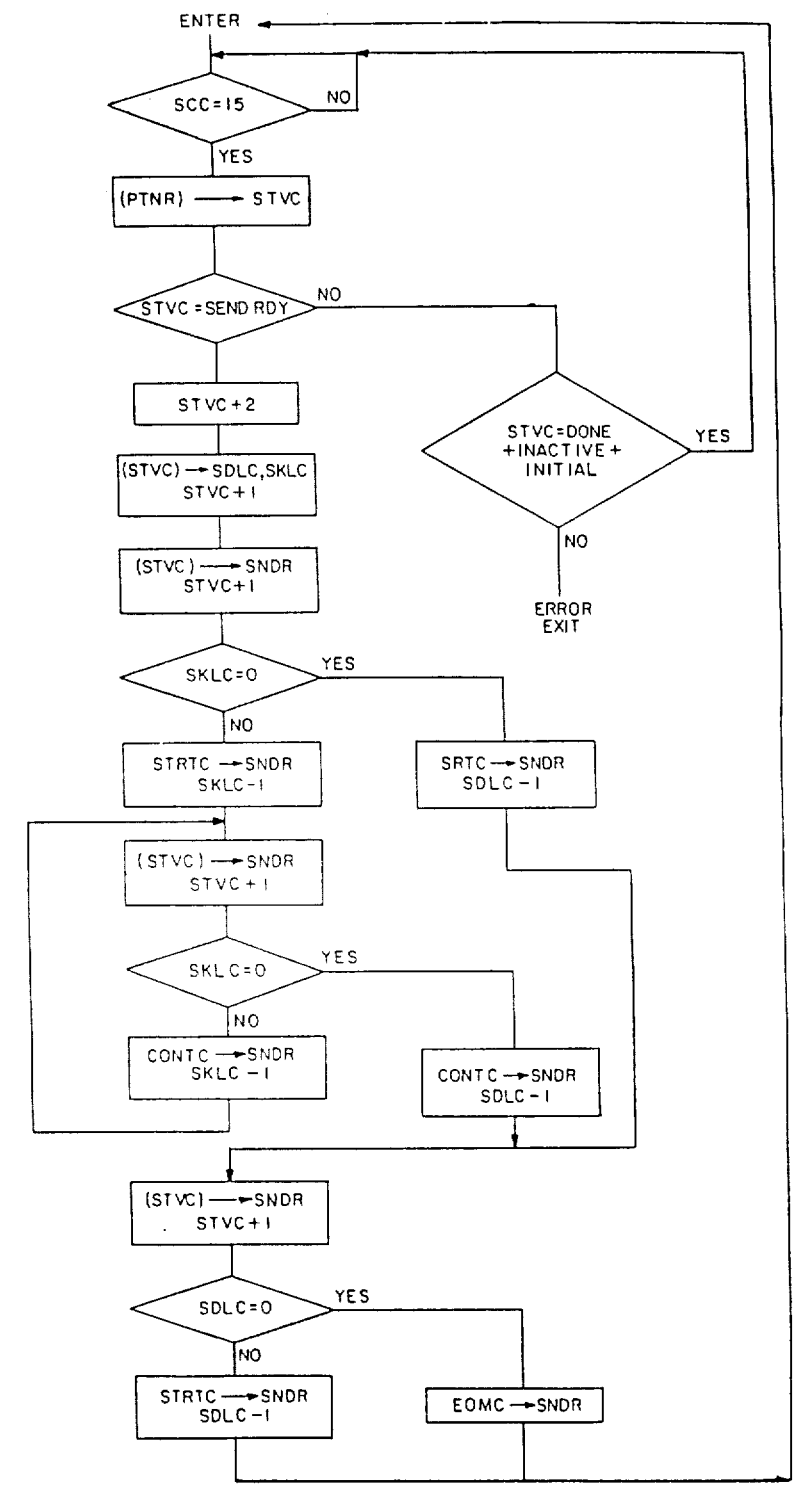
FIG. 19 and FIG. 19A are flow diagrams depicting status changes in sending a message to be abutted with FIG. 19 on the top.
Figure 19A:
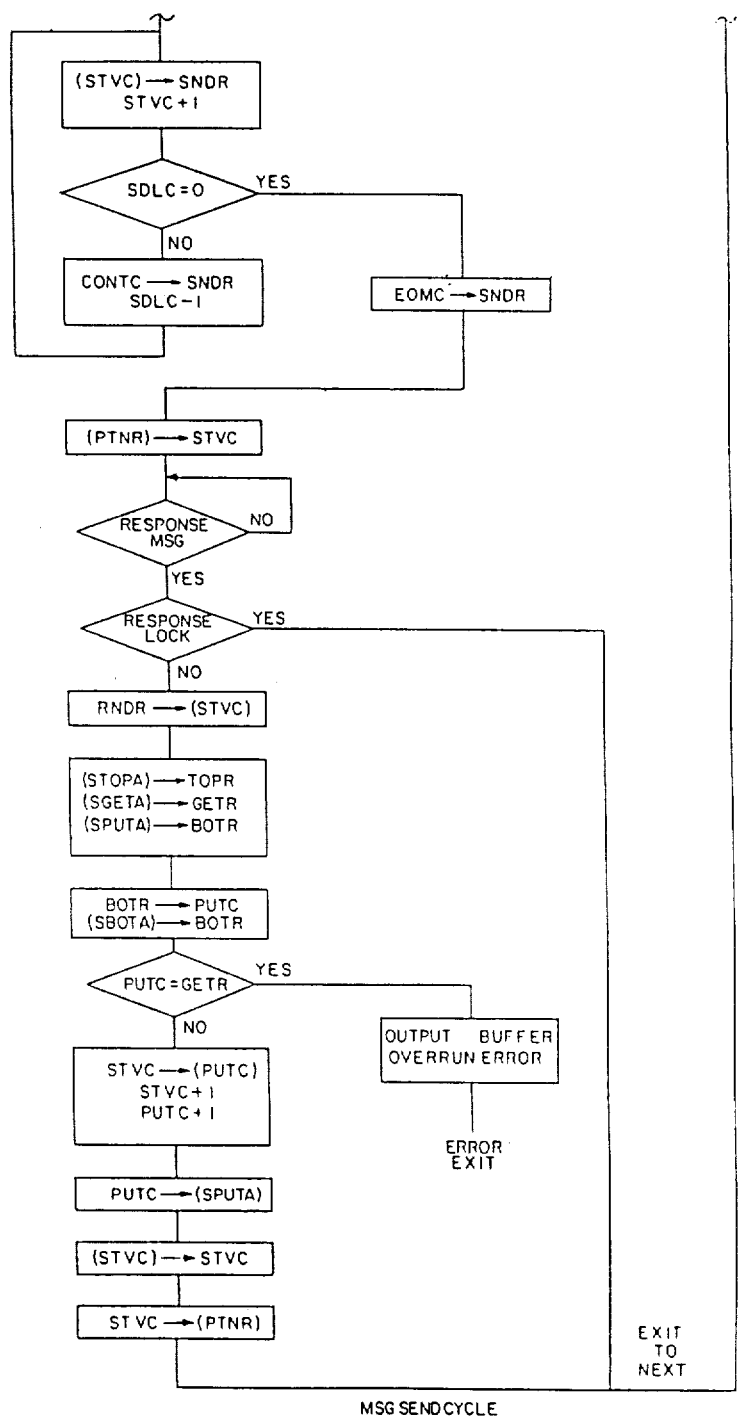

The state diagrams of FIGS. 17 and 19, and the matrix diagram of FIG. 18, are included to provide comprehensive detail as to internal design features that may be used within a complex system. In FIG. 17, which pertains to the receive phase, and FIG. 19, which pertains to the send phase, the designations used correspond to those employed elsewhere in the specification and drawings. For example, the following terms apply:

RKLC = Receive Key Length Counter
RDLA = Receive Data Length Counter
RNDR = Receive Network Data Word Register
PUTC = Put Counter
GETR = Get Register The state diagrams thus are essentially self explanatory, when taken in conjunction with FIG. 13 and the specification. The state diagrams detail the sequences and conditional statements involved in complex message management and inter-processor communication. In FIG. 17, the states labeled "Generate Response" and "Decode Response" and the conditional statements indicated by dashed line rectangles are in accordance with the designated responses and actions set out in the matrix diagram of FIG. 18. FIG. 18 depicts both the responses generated and the actions undertaken for any given combination of primary message and readiness state pertaining to a given TN. Obviously, normal system operation involves some message rejection but very few Error Conditions.

In both FIGS. 17 and 19, many of the conditional determinations can be made concurrently, while the state steps will be changed sequentially. In either event, the Send and Receive operations are regular progressions which do not require external control because of the organization of the messages and manner of operation of the network.

A number of features that are used in typical processor systems, or in multiprocessor systems, are not germane to the invention and are therefore not depicted. These include parity error circuits, interrupt circuits, and various means of monitoring activity, including a watchdog timer and a wide variety of test functions.

Examples of System Operation

The following are provided as examples of how the integrated system of FIGS. 1, 8 and 13 functions in different modes of operation internally while cooperating with the network and the H.S. RAMs. These examples demonstrate how interrelations between the priority scheme, the addressing techniques utilized and the transaction identities provide both local control and global intercommunication.

Figure 16:
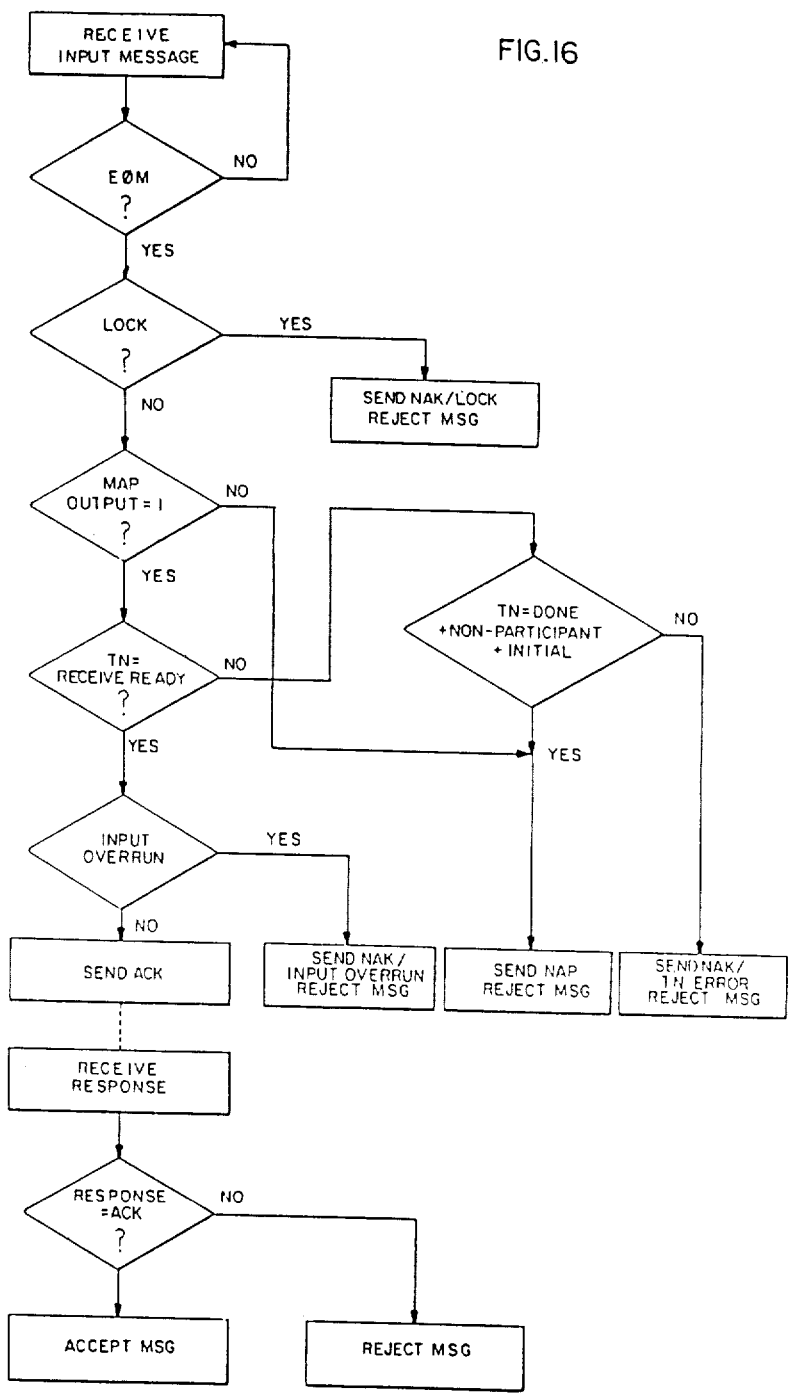
FIG. 16 is a simplified flow diagram depicting status changes on reception of an input data message.

Primary Data Message Reception and Transmission—FIG. 16, to which reference is now made in addition to the other Figures, is a simplified state diagram of the states involved in the ultimate acceptance of a primary message. Reception of the message, at buffers and in storage, does not effectuate acceptance until these logical states have been satisfied. Although depicted as a serial train of events, determinations are essentially made in parallel or concurrently because conditions are mutually exclusive or circuitry bypasses intermediate stages in arriving at a certain operating level.

A message on the network of FIG. 1 is passed through the receive network data register 146 of FIG. 13 until the EOM state is identified, at which point it is known that the message is complete. If a LOCK condition exists, the system references the response directory in the H.S. RAM 26" of FIG. 8, sending the NAK/LOCK reject message.

Alternatively, if the LOCK condition does not exist, the system moves to the map comparison check, carried out within the DSW management section 190 in the interface as shown in FIG. 13. If a proper comparison exists, as indicated by Map Output = 1, the system can continue to receive the message. If not, the message is rejected and a NAP is sent.

Having a correct Map determination, the system is then ready to check for TN status by making reference to the directory of the TN's as shown in FIG. 8, specifically to determine whether the local status is "receive ready". It is assumed that the TN was previously assigned by a prior primary message.

If this check reveals that the TN is in the done, non-participant or initial states, a NAP reject message is sent. If the status is some other condition that is invalid, the reject message is a NAK/TN error, both types being again taken from the response directory of FIG. 8. If the status is "receive ready" another determination can be made.

This determination is for "input overrun", and is made in the input/output management buffer section 170 of FIG. 13, by comparing the GET and PUT addresses as previously described. The transaction number is also checked for a receive message count of zero, which also indicates input overrun. If the overrun condition does exist, the NAK/input overrun is sent and the message is rejected.

When all conditions are satisfied, an ACK message is derived from the response directory in H.S. RAM 26" and transmitted on the network, in priority competition with other processor modules, some of which may also have acknowledged the message. At this point the message is accepted if the common (i.e. merged) response from the network is an ACK affirming that all selected receiving processor modules can accept the message. If the response is in any other form, the message is rejected by all processors.

In this example of reception and response, it should be noted that after a primary message has been received, all processors generate one of the ACK, NAK, or NAP responses. After receiving one of these response messages, processors may attempt to transmit a primary message. (They may also do so after a delay that is equal to or greater than the total latency delay through the network as discussed above under "Active Logic Node"). Note further that if several processors transmit identical messages, they may all win, in effect, in contention on the network. In this case, all of the transmitting processors receive the ACK response. This fact is of importance in the operation of the broadcast and global semaphore modes, which are described in detail in later examples.

Practical examples of the invention incorporate substantially more responses and perform a number of different actions in addition to those just described. FIG. 18 demonstrates these in the vertical columns entries for Lock, TN error, and Overrun interrupt conditions the nine different previously identified status levels and the Acknowledgment and Not Applicable Processor responses.

When a processor module is ready to transmit a message, the PTN value stored in the PTN register 206 of FIG. 13 is available, and it need only be ascertained that the TN status is in the "send ready" condition. As seen in FIG. 12, the "send ready" entry contains the next message vector address for the output message. The assembled output message will be transmitted on the network and, if it loses in contention, it is repeated until successful, and a response is received, unless the PTN is changed in the interim. After successful transmission and acknowledgment, the address vectors are changed. The next message vector is obtained from the second word of the present message (FIG. 21A) that is transmitted from the send transaction vector counter 222 to the random access memory 168. The PUT counter 175 is advanced by one if the output message section is not in an overrun condition, which would be indicated by PUT equals GET. Finally, the next message vector from the send transaction vector counter 222 is entered into H.S. RAM at the transaction number address specified by the present transaction number register 206. Thus if the new TN is in the "send ready" state, the vector value again points to the location of the next message pertaining to the transaction 30 identity Refer to FIG. 21A the format of an output message in H.S. RAM.

Message management in transmitting messages, however, can involve a number of variants, including an internal or external change in the PTN. Errors, overrun or locked conditions can cause the system to shift the transaction number to TN0, causing the system to revert to the non-merge mode and examine the status at TN0 until the "send ready" state is identified or a new TN is assigned. Refer to the flow chart of FIG. 19 for a delineation of states and conditions that may be used in a detailed example.

Output Message Complete Buffer Example—Upon completion of transmission of a message, as evidenced by any response message except LOCK, a pointer to the newly-completed output buffer is placed in the Output Message Complete Circular Buffer section of H.S. RAM (see FIG. 8). The pointer is simply a 16 bit word which gives the address of the output message buffer. (The format of an output message buffer is shown in FIG. 21A. It should be noted that the output message buffer includes a place to record the response message received from the network).

The output message complete circular buffer provides communication between the network interface hardware 120 and supervisory programming on the microprocessor 105. Programs in the microprocessor place messages to be output in H.S. RAM. As described in a subsequent example in detail, output messages can be chained together, with TNs acting as head-of-chain pointers, to form complex sequences of activity. A further factor is that because the network can be multiplexed among TNs (also described in detail below), messages may be output in various orders depending on events throughout the network.

It is important, however, to quickly recover the space in H.S. RAM taken by a successfully transmitted packet so that the space can be reused for another outgoing packet. The output message complete circular buffer serves this function.

When a data message has been successfully sent and a non-Lock response received, the network interface advances the PUT pointer at 0510 (hex) in H.S. RAM (see FIG. 10) by one and stores the address of the first word of the output message just sent at the address in the PUT register. (If the PUT value becomes larger than the TOP pointer at 0512 (hex), it is first reset to be the same as the BOT pointer, which is stored at 0513 (hex)). If the PUT pointer becomes larger than the GET pointer (location 0511 (hex)), the circular buffer has overrun, and an error interrupt is generated to the microprocessor.

Asynchronously, software executing in the microprocessor examines the output message buffer pointed to by the GET pointer. After completing any processing required, the processor advances the GET pointer by 1 (if GET becomes larger than TOP, it is reset to BOT). If, GET=PUT, there are no more output messages to service. Otherwise additional output messages have been successfully sent, and must be processed. Processing includes returning H.S. RAM output buffer space to a free pool, so that it can be reused for other packets.

It is important to note that the output message complete circular buffer is distinct from the input message circular buffer, and the two circular buffers are managed by different PUT, GET, TOP, and BOT pointers. In one implementation, as shown by FIG. 13, circular buffer management hardware 170 can be shared by both circular buffers, although this is not essential.

Initializing Procedures—Each processor module has access to the TNs in its own high speed random access memory 168 (FIG. 13) comprising the directory of potentially available TNs. Those TNs which are unassigned, however, are specifically so designated by the transaction number value in the relevant location. Consequently, the microprocessor system 103 can identify the unassigned transaction numbers and select one for use in initiating communications with other processor modules pertaining to a given transaction identity.

Although TNs are locally assigned and updated under local microprocessor control, global control through the network is achieved by the primary control messages "relinquish TN" and "assign TN". No deadlock condition can arise between competing processor modules that may desire the same TN, because the network will give priority to the lower-numbered processor. Other attempting processors will receive a NACK/TN error response which indicated that they must try to reserve a different TN. There is thus complete flexibility in reserving and referencing these transaction identities within the system and locally.

It will also be noted that repeated use is made of the TN in shifting between the base transmission mode, TN0, and the merge mode, when TN is greater than 0. The system is thus able to change not only the focus of its operations but also the character of its operations by a single broadcast transmission of the TN.

A different and particularly useful technique for transmitting changes of global status is the forced parity error propagation previously discussed in conjunction with FIG. 4. This unique indication, interleaved among other transmissions, enables discontinued system resources to be surveyed and appropriate action to be undertaken.

Processor-to-Processor Communications—There are two forms of specific processor communication, one directed to an individual destination and the other directed to a class of processors. Both types of transmissions utilize the DSW, and both functions are carried out by broadcasting in the non-merge mode.

When specifically communicating between an originating processor and a single destination processor, a destination processor identification (DPID) is used in the DSW. Referring to FIG. 8, when this value is used to address the selection map portion of the H.S. RAM 26" at each receiving processor module, only that specific desired processor module provides an affirmative response and accepts the message. Transmission and ultimately successful reception of the acknowledgment enable both processors to take whatever future action is required.

When a class of processors related to a control process are to receive a message, the map nybl and map address within the DSW specify the corresponding section in the selection map portion of the H.S. RAM. All receiving processors then transmit acknowledgments, competing for access to the originating processor module until the communication interchange is finally complete.

The full broadcast mode of processor communication may be used with primary data messages, as well as status, control and response messages. The inherent capabilities of the priority protocol and prioritizing network facilitate the interjection of such messages into other message sequences.

The hashing mode of processor selection is predominantly used in data processing tasks in a relational data base system. Primary and backup disjoint data subsets are distributed in accordance with an appropriate algorithm among the different secondary storages. When two processors respond concurrently, because one is responsible for the primary and the other for the backup, subset, the primary message will be prioritized. A higher priority command code (see FIG. 12) can be chosen to insure this condition. Maintenance of the reliability and integrity of the data base is also achieved by using the various multiprocessor modes to best advantage for each condition that arises. If, for example, the secondary storage having responsibility for a primary data subset fails, it can be updated by a specific processor-to-processor communication. An error can be corrected or a part of the data base can be rolled back in similar fashion or by operating in a class mode.

Transaction Number Example—The transaction number concept provides powerful new hardware facilities for the control of a multiprocessor system. In the present system, the transaction number implements a "global semaphore", plays important roles in sending and receiving messages on the network, and in rapidly ascertaining the readiness of a given task distributed among plural processors.

The physical realization of transaction numbers (TNs) is as a set of 16 bit words in H.S. RAM 26. The words are formatted as shown in FIG. 12 to achieve a variety of functions. Because TNs are stored in H.S. RAM, they can be accessed by both the microprocessor 105 and the network interface 120.

Global Semaphore—The term "semaphore" has come into common use in computer science literature to denote a variable used for control of asynchronously executing processes. A semaphore has the property that it can be tested and set in one uninterruptible operation.

Consider, for example, a semaphore variable with two states: UNASSIGNED and ASSIGNED. The test-and-set operation is then defined as: "if the semaphore is in the UNASSIGNED state, set it to the ASSIGNED state and indicate success; otherwise if the semaphore is already in the ASSIGNED state, leave it in the ASSIGNED state, but indicate failure." The semaphore thus permits the process which successfully tested and set the semaphore to proceed with its task, where a process which fails must either wait for the semaphore to be reset to the UNASSIGNED state or try to test and set another semaphore controlling another equivalent resource. It will be readily seen that if the test-and-set operation could be interrupted, two processes could simultaneously gain access to the same resource, resulting in unpredictable erroneous results.

Every multiprocessor system implements in hardware a concept which can be equated to semaphores to control access to system resources. Prior art systems, however, can maintain only one copy of the semaphore. It is desirable to maintain plural copies of a semaphore, one in each processor, in order to reduce contention for simple test only access to semaphores, and to use multiple-valued semaphore variables for other purposes, as will be discussed below. The problem is that multiple copies of a semaphore must be manipulated in exact synchronism, or else the access-to-resources integrity which semaphores are intended to enforce will be lost.

A plural-copy, or "global" semaphore is provided by the present system. The following table contrasts the operations on global semaphores with a simple semaphore:

| Operation/Property | Simple Semaphore | Global Semaphore |
|---|---|---|
| states | 2 (UNASSIGNED, ASSIGNED) | n (UNASSIGNED, ASSIGNED, ...) |
| number of semaphore "copies" | 1 | m (number of processors) |
| test | returns either ASSIGNED or UNASSIGNED | returns highest priority (numerically lowest) state of all m copies. |
| reset | sets semaphore to UNASSIGNED, regardless of prior state. | sets all m copies of the semaphore to UNASSIGNED, regardless of prior state. |
| test-and-set | if semaphore is UNASSIGNED, set to ASSIGNED and indicate success - else if semaphore is ASSIGNED, leave it alone and indicate failure. | if all m copies are UN-ASSIGNED, set all m copies to ASSIGNED and indicate success; else if any copy is in any state other than UNASSIGNED, leave all copies unchanged and indicate failure. |

In the present system, the ASSIGN TN and RELINQUISH TN commands provide the test-and-set and reset functions respectively on transaction numbers used as global semaphores. With reference to FIG. 12, the NAK/TN error response provides the failure indication, where the SACK/ASSIGNED response provides the success indication.

The nature of the network, including the synchronous clocking scheme employed for nodes and the broadcast of the priority packet simultaneously to all processors, is the basis for implementation of the global semaphore concept. With this concept in place, the system can allocate, deallocate, and regulate access to plural copies of any desired system resource simply by associating the resource with a TN. It is important to notice that the control of a distributed resource can be effected with nearly the same modest software overhead of a simple semaphore. This is a considerable advance on prior art systems which either cannot manage distributed resources or require complex software protocols and lead to hardware bottlenecks.

State of Readiness—The set of values BUSY, WAITING, READY (send or receive), DONE, and NON-PARTICIPANT (refer to FIG. 12) provide the capability to rapidly ascertain the state of readiness of a task associated with a TN. In the present system, the following table shows the meaning associated with each state:

BUSY—The processor is working on the task in question, and results are not ready.

WAITING—The processor has completed processing, and is waiting for all other processors to complete processing for this task.

SEND—Data is available in H.S. RAM for output

READY—for this task (TN).

RECEIVE—Space and other needed resources are available

READY—in this processor to receive data for this task (TN).

DONE—The processor has no further data to send for this TN.

NON-PAR—The processor does not have any processing

TICIPANT—for this task.

INITIAL—This TN has never been used since the processor started.

A task is associated dynamically with a TN by use of the ASSIGN TN command. Success (a SACK/ASSIGNED response to the ASSIGN TN message) indicates that all active processors have successfully assigned the TN to a task. Note from FIG. 11 that since the NAK/TN ERROR response has higher priority (lower value), if any processor's network interface 120 detects a conflict in the use of the TN, all processors see the failure response.

Further, the OPID (originating processor ID) field of the response on the network will indicate the first (lowest numbered) processor with a conflict—a fact of use to diagnostic routines.

By software action, each processor will process the task and will set the TN to BUSY, WAITING, SEND READY, RECEIVE READY, DONE, or NON-PARTICIPANT as appropriate. Any processor, including the processor which issued the original ASSIGN TN, can readily ascertain the state of completion of the task (TN) by issuing either a STATUS REQUEST or START MERGE command at any time.

The STATUS REQUEST corresponds to a simple test of the multiple-valued global semaphore. Notice from FIG. 11 that the highest priority status response (SACK) message will win in contention on the network, thus indicating the least state of readiness. Further, the OPID field will indicate the identity of the first (lowest numbered) processor in the least ready state.

This latter property is used to implement the "non busy" form of waiting for completion of a task distributed to plural processors. The processor which originally issued the ASSIGN TN is considered the original "wait master". That processor then designates some other processor the new "wait master" on any arbitrary basis. When the new "wait master" has itself reached the desired state of readiness, it interrogates all processors by issuing either START MERGE or STATUS REQUEST. If all other processors have become ready, the SACK will so indicate If some processors are still not ready, the OPID field of the SACK response will indicate the first least ready processor. The "wait master" instructs that processor to become the new "wait master". Eventually, all processors will become ready, but in the meantime, the system only tries to interrogate status when it is known that at least one processor has become ready. The system is thus not burdened by periodic status interrogations, which consume resources without producing results. Further, this scheme guarantees that the system will know that all processors have completed work at the exact moment when the last processor to complete is done. Those skilled in the art will recognize that many other "waiting" schemes are feasible within the context of the invention.

The START MERGE command is a special kind of test-and-set instruction. If the status of the global semaphore is SEND READY or RECEIVE READY, the Present Transaction Number Register (PTNR) 204 (see FIG. 13) is set to the transaction number in the START MERGE message (see FIG. 3), thus setting the PTNR register. If any active processor is in a lesser state of readiness, the PTNR will not be altered.

The STOP MERGE command is the corresponding reset operation, and unconditionally resets the PTNR of all active processors to TN0.

As discussed below, messages pertaining only to the PTNR current global task are output by the network interface 120. The START MERGE and STOP MERGE commands thus provide the ability to time multiplex the network among plural tasks, which can arbitrarily be suspended and/or resumed.

An important detail of the present system is that the network interface 120 must insure that a command from the network and the microprocessor 105 cannot access a TN simultaneously. In the present implementation this is accomplished by a signal from the receive state controls 260 to the read/write state controls 270 which is asserted whenever a command from the network which could alter a TN is being processed. For this brief time, access to the H.S. RAM is denied to the processor by the controls 270. Those skilled in the art will recognize that many alternate implementations are possible within the scope of the invention.

Receive Control—Another function of the TN is control of incoming messages A given task can be associated with an incoming message stream on plural processors by the ASSIGN TN command. When the TN for that task in a given processor is set to RECEIVE READY, the TN then additionally indicates a count of packets that processor is prepared to accept (FIG. 12). The network interface 120 decrements the count (by arithmetically subtracting 1 from the TN word) for every packet successfully received, until the count reaches zero. At that time, a NACK/OVERRUN response is generated, signaling sending processors that they must wait until the NACKing processor is ready to accept more input. Note also from FIG. 18 that in this case, the PTNR is also reset to TN0.

This mechanism leads to straightforward implementation of control of flow of packets through the network 120. It guarantees that a processor will not become congested with unprocessed packets and thus become a bottleneck to the system.

Send Control—Referring to FIG. 21A, it can be seen that each message in H.S. RAM contains a field for a new TN vector value. After a message is sent and the corresponding response received successfully, the new TN vector from the message just sent is stored in H.S. RAM at the address for the Present Transaction (from the PTNR). The TN is thus updated for every message sent, and thus can automatically be set to any desired state on successful transmission of a message.

Referring to FIG. 12, the SEND READY TN format includes a 14 bit address in H.S. RAM which is used to point to the next packet to be output for the given task (TN). Thus, the TNs in H.S. RAM also serve as head pointers to FIFO queues of messages for various tasks. Within a given task (TN), each processor will thus attempt to output its packets in the serial order defined by the New TN Vector chains.

When combined with the facilities for rapidly multiplexing the network among TNs (tasks) discussed previously, it becomes apparent that complex sets of tasks distributed among many processors can be managed with minimal software overhead. The coaction of the network, interface, and processors provides facilities to allocate, deallocate, suspend, resume, and otherwise control resources and tasks copies of which are distributed among potentially hundreds or even thousands of processors.

DSW Examples—The destination selection word (FIG. 3) coacts with DSW logic 190 (FIG. 13) and the DSW section of H.S. RAM 26 (FIG. 8) to provide several modes by which the network interface 120 of each receiving processor can rapidly determine if the message being received is intended for processing by the associated microprocessor 105. As described above, the DSW in the received message both selects and is compared to a nybl in the DSW section of H.S. RAM.

Processor Address—As shown in FIG. 8, a part of the DSW section of H.S. RAM is devoted to processor address selection nybls. In the present system, each of the 1024 possible processors is associated with a bit address in this part of H.S. RAM. The bit is set to 1 at the bit address which corresponds to the processor's ID, all other bits in this section are set to 0. Each processor thus has only one bit set in this section.

Hash Maps—Another part of the DSW section of H.S. RAM is devoted to hash maps. In the present system, two of the map selection bits are devoted to hash maps, giving two complete sets of 4096 possible values. In the hashed mode, keys to records stored on secondary storages are put through a hashing algorithm which results in a "bucket" assignment between 0 and 4095. A processor which has responsibility for a given "bucket" of records has a 1 bit set in the map bit whose address corresponds to the bucket number. Other bits are set to 0. A given processor can be assigned responsibility for plural buckets simply by setting plural map bits.

In the present implementation, it is readily appreciated that map bits can be set so that for a given map selection bit, each bit address is set to 1 in only one processor, and further that every bit address is set to a 1 in some processor. As a direct consequence, each processor (AMP) is responsible for a distinct disjoint subset of the records of the data base, and further, across the entire system, a complete set of records exists.

Although the present example is couched in terms of the relational data base problem those skilled in the art will readily appreciate that the same technique can be applied to any problem domain where disjoint subsets of the problem can be assigned to different processors in a multiprocessor complex.

It is further worth noting that with two complete maps, the scheme described above can be arranged so that buckets assigned to a given processor in one map can be assigned to different processor(s) in the other map. If one map is considered as "primary" and the other as "backup", then as a direct consequence, records which are primary on a given processor can be guaranteed to be backed up on other processor(s). Further, the number of processors which provide backup to a given processor is completely flexible.

Those skilled in the art will recognize that the number of distinct map sets which can be realized within the scope of this invention can be greater than two, and further, that the number of buckets can be any value.

Class—In both of the previous examples, examination of a given bit address in every processor shows that that bit address is set to a 1 in only one processor; the corresponding bit address in all other processors is set to 0. However, it is possible and useful for a corresponding bit address to be set to 1 in plural processors. This is referred to as "class address" mode.

The class address is thought of as the name of a process or capability, a copy of which exists in plural processors. Any processor which has the process or capability in question has a 1 bit set in the corresponding bit address.

A message is sent to a class address by setting that class address in the DSW (FIG. 3). All active processors which "belong" to the class, as indicated by a bit set to 1 at the appropriate spot in H.S. RAM will respond to the packet with an ACK. Processors which do not belong to the class respond with NAP.

The DSW thus provides in hardware most of the routing calculations needed to control the flow of messages in a multiprocessor system. Further, programs can be independent of knowledge of in what processors various capabilities of the system reside. Since the maps are part of H.S. RAM, and thus can be accessed by the microprocessor 105, it is further possible to relocate a capability from one processor to another dynamically.

Merge Example—In complex multiprocessor systems, tasks may require a series of interrelated actions to be undertaken. This is particularly true in a relational data base system handling complex queries, in which reference to a number of secondary storages may be needed to assemble data into a file that can then be redistributed in a particular way to a number of processors. The following example briefly delineates how the system of FIGS. 1, 8 and 13 can readily carry out these functions, by manipulating the TNs, DSWs and global semaphores.

First, a merge coordinator, typically but not necessarily an IFP 14 or 16, identifies a class of AMPs (from AMPS 18–23) that are to merge a file, acting as data sources. An unassigned TN is selected and assigned to identify the data source function. The second principal function, of distributing or hashing the file to another set of AMPs (which may be the original processors) is referenced to a different hitherto unassigned TN.

The coordinator for the merge function uses the DSW to identify the class of processor modules that are to perform work in merging of a file related to the first TN. Each participant elevates the status of its TN to a busy or waiting status, and control of the merge operation is then passed over (assigned) to one of the participants in the merge. After reception and acknowledgment of the message packets pertaining to the merge task that has been defined, each participant (all other processor modules are nonparticipants for that transaction number) carries forward with its subtask, updating its status level as appropriate. Consequently, when the assigned merge coordinator reaches the end of its task, it can request status from all other participants as to that transaction number, and receive a response that indicates the least ready of the participants. Control of the merge can be passed to the least ready respondent, which can then poll all of the other participants at such time as its work is completed, and this process can be repeated if necessary until a response has been received that indicates that all participants are ready. The then active coordinator can then, using a DSW to identify the class of participants, initiate the transfer of messages to H.S. RAM 26, accompanied by update of the status levels to "send ready" with appropriate output message vector information. When subsequent polling reveals that all participant AMPs are in a send ready state, the coordinator issues a start merge command for the specified TN.

During merge, the processed data packets are to be directed to the class of processor modules which are then to distribute the results to secondary storage in accordance with the relational data base. Whether or not the receiving processors are the same as the now originating processors, the class of participants in the distribution is identified by a DSW and the transaction is identified by a new TN. All participants in the new transaction will have been assigned that TN and will have elevated their readiness state to "receive ready". The DSW can be a hashing selection designation instead of a class designation, but in any event all of the participants are enabled to receive the broadcast messages during merge. Initiation of the start merge is followed by concurrent transmission of the message packets by each sending participant on the network with dynamic prioritizing taking place. When it completes its set of messages, each sending participant tries to send an identical End of File message of lower priority than the data messages The End of File messages lose in contention with data messages, until such time as all participants send End of File, when the End of File finally carries through. The coordinator then transmits an End of Merge message, and can follow this with a Relinquish TN which completes the transaction. Overrun, error or lock conditions can be treated appropriately by reinitiating the merge or the transmission.

When a merge has been completed relating to one TN, the system can then shift to the next successive TN in the sequence Each processor module will have queued the appropriate message packets for that TN and can again commence trying the network to carry the merge operation forward. Separate intra-processor merges accompanied by efficient use of the network merge enables the system to carry out extremely large sort/merge tasks with marked superiority to prior art systems. The time to sort a file in a system in accordance with the invention having n records and m processors can be shown to be:

$$C_1 \frac{n}{m} \log_2 \frac{n}{m} + C_2 n$$

where $C_2$ is a constant, estimated for the present implementation to be about 10 microseconds for 100 byte message; and $C_1$ is a constant estimated to be about 1 millisecond for a typical 16 bit microprocessor. The approximate sort/merge times, in seconds, for combinations of n and m under different relationships are shown in the following table, based on 100 byte records:

| M processors | FILE SIZE N RECORDS | | | | |
|---|---|---|---|---|---|
|  | 1,000 | 10,000 | 100,000 | 1,000,000 | 10,000,000 |
| 1 | 10 | 130 (2 min.) | 1,700 (¼ hr.) | 20,000 (5½ hr.) | 230,000 (3 days) |
| 10 | 0.7 | 10 | 300 (5 min.) | 1,700 (½ hr.) | 20,000 (5½ hr.) |
| 100 | 0.04 | 0.8 | 11 | 140 (2 min.) | 1,800 (½ hr.) |
| 1,000 | 0.011 | 0.13 | 1.7 | 20 | 230 (4 min.) |

Comparing these examples to prior art systems is not readily feasible because two interrelated sorting sequences (processor and network) are involved and because few systems even exist that have this capability. Moreover, the system sorts and merges long and variable length messages whereas most sort capabilities are rated in terms of bytes or words.

A significant further factor is that the present system is truly a multiprocessor and not dedicated to sort-/merge operations. It can shift with complete flexibility between merge and non-merge operations, both locally and globally, and do so without software penalties or loss of system efficiency.

Task Request/Task Response Cycle Example—Any processor 14, 16 or 18-23 on the network 50, referring to FIG. 1, can formulate a request, in the form of a message packet, for a task to be performed by one or more other processors. In the relational data base system, most of these tasks will originate with the host computers 10, 12 and be entered into the system via the interface processors 14, 16, but this is not a necessary condition. The message packet that is formulated is put into competition on the network 50 with packets from other processors to gain priority at a time dependent upon the priority level of other tasks and the level of activity on the processor. The task may be defined by a single message packet or continuation packets that are assigned higher priority levels within the data message groupings (see FIG. 11) so as to minimize delay in the reception of the continuation portion.

The message packet contains the transaction identity in the form of the transaction number, which inherently distinguishes, by the choice made, between the non-merge or default mode (TN0) and the merge mode (all other TNs) as to the manner in which results are to be derived. Further the message packet contains the DSW, which implicitly identifies the target processor and the mode of multiprocessor operation, whether by specific processor identification, plural processor class or hashing, in this instance to a part of the relational data base. A message packet, being broadcast through the network 50 to any target processor is locally accepted at that processor and the reception is acknowledged by a response. All processors 14, 16, and 18-23 provide a concurrent response following the EOM to the network 50, but the ACK from the target processor(s) gains priority and is received by the originating processor.

The target processor or processors then asynchronously perform the processing required by the request packet, at such time as the message is transferred through the local H.S. RAM 26 and interface 120 (FIGS. 8 and 13) into the local microprocessor. For a relational data base task, the DSW typically references a part of the disjoint data subset stored at the associated disk drive although tasks sometimes may be performed that require no reference to the data base. Any specific operation or algorithm may be executed by the individual processor, and if plural processors have been targeted, each can work on a disjoint subset of the overall task. A variable length message packet is structured such that the request can specify the operations to be performed and the files to be referenced in the data base system. It should be noted that there may be numerous message packets in conjunction with a given task, and to provide adequate sorting distinctions within the network 50, the optional key field (FIG. 3) becomes important.

The task response packet that is generated by each processor that is to respond is shifted from the microprocessor into the local H.S. RAM 26 via the control logic 28 of FIG. 1 where it is stored in the send message format of FIG. 21A. Where the task response requires continuation packets to be employed, these are transmitted after the lead packet but given the higher continuation priority. Where the system is operating in the merge mode and each processor generates a number of packets pertaining to a transaction number, the packets may first be locally chained together in a sort order for subsequent merge into a global sort order on the network 50.

The task result packet or packets are sent from the processors 14, 16 and 18-23 to the network 50 in concurrent groupings, with a single priority message packet being broadcast back to all processors after the predetermined network delay. The transfer of these task result packets may, dependent upon the nature of the task, be targeted for the original request or to one or more other processors, and may be transferred in accordance with any one of the multiprocessor modes. The most general case in the relational data base system is a concurrent merge and redistribution using hashing for destination selection. Thus it is seen that each processor can act as an originator, coordinator or responder, or all three, in a task request/task response cycle. Because multiple task request/task response cycles are involved, the processors 14, 16 and 18-23 and the network 50 are multiplexed among the tasks, but the multiplexing is done on a priority as well as a time basis.

Complex Query Example—In the relational data base system, using the host computers 10, 12 and a distribution of the relational data base among the disk drives 38-43 in accordance with an algorithm defining the tuples and the primary and backup disjoint data subsets, complex queries are entered into the system from the host computer 10 or 12 at the IFP 14 or 16. The message packet is first parsed by the IFP 14 or 16, in order to transform the message from the host into task requests for the AMPS 18-23. At the outset, the IFP 14 or 16 may be required to initiate request packets to derive information from one or more specific AMPs to obtain the system data that is needed to parse the message from the host. Having the data needed for processing the request, the IFP 14 or 16 may then require any number of task request/test response cycles with the AMPs 18-23, and actually process the data and satisfy the request from the host. In the sequences, the task request and task response cycle enumerated above are utilized, and may be of arbitrary length. The IFP 14 or 16 then communicates with the host via the IFP interface. This response may simply provide the data needed for the host computer 10 or 12 to generate another complex query.

STAND ALONE MULTIPROCESSOR SYSTEM

Figure 20:
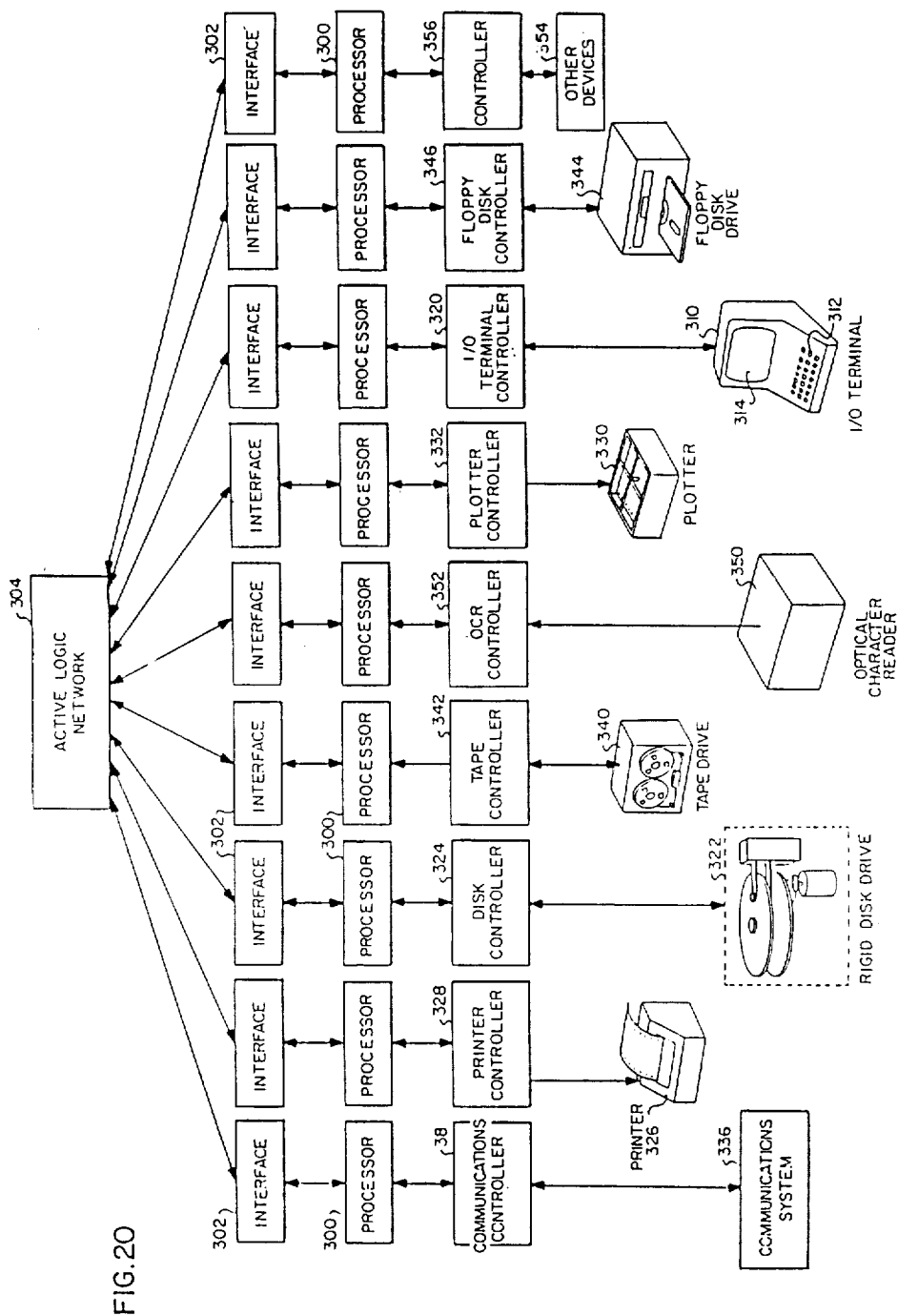
FIG. 20 is a block diagram of a stand alone system in accordance with the invention.

The primary example of a system in accordance with the invention, discussed above in conjunction with FIG. 1, exemplifies a backend processor that may be utilized in conjunction with a host computer and its existing software package. As noted above, however, the present invention is of particular advantage for a wide range of processing applications, particularly those of the type in which processing tasks may be readily subdivided and distributed without requiring massive central processing power. FIG. 20 illustrates one simplified example of a stand alone multiprocessor system in accordance with the invention. In FIG. 20, all of a number of processors 300 are coupled by interfaces 302 to an active logic network 304, such as previously described. It is understood that redundant active logic networks 304 may be utilized for data integrity. The processors 300 may again use 16 bit microprocessor chips, and incorporate adequately large main RAM memory. Only nine processors 300 are shown, each associated with a different peripheral, in order to depict the versatility of the system. In actuality the system becomes far more efficient with many more processors on the network, although particular advantages can be gained in system reliability and data integrity even with relatively few processors.

In the present example, the processors 300 may be physically separated by convenient distances, inasmuch as the maximum internode spacing of 28 feet for the stated data rates allows a large array of processors to be utilized on one building floor or on several adjacent floors without undue crowding.

In the stand alone system the peripheral controllers and peripherals themselves can vary much more widely than in the backend processor example discussed above. It is convenient to assume that each input and output device is associated with a separate processor 300. For example, an I/O terminal 310 including a keyboard 312 and display 314 is coupled to its respective processor 300 by a terminal controller 320, even though a 16 bit processor might control a substantial network of relatively slow terminals. The I/O terminal shown merely illustrates how manual keyboards and other manual entry and processing devices may be tied into the system. Using the processing power of the processor 300, the terminal 310 can comprise a word processor, and it can communicate via the network 304 with a data base, other word processors, or various output devices. Large secondary memories, such as a rigid disk drive 322 may be coupled to their respective processor by disk controllers 324, it being understood that more disk drives or a different form of mass memory could be used in a large system. Output devices, such as a printer 326 and a plotter 330 interface with their processors 300 via a printer controller 328 and plotter controller 332, respectively. Interaction with other systems, not shown, is via a communications system 336, such as a TTY or one of the larger networks (e.g. Ethernet), through a communications controller 338. Some processors 300 may be coupled to the network 304 without a peripheral device (not shown).

Bidirectional data transfers may take place using a tape drive 340 and tape drive controller 342, and a floppy disk drive 344 with its associated controller 346. Tape drives not only provide large storage capacity for on-line use, but can also be employed for disk drive backup. For this purpose tape is used to retain data that was stored, as of a fixed point in time in a sealed rigid disk system. Because these backup operations are usually performed during low load periods (e.g. nights or weekends) long "streaming" transfers can take place through the network 304. Similarly, because floppy disk drives 344 may be used for program entry during system initialization, some network time is available in these modes for transfers of substantial amounts of data. An optical character reader 350 provides another source of input data for the system through its controller 352. Finally, peripheral units, labeled simply "other devices 354" can be coupled to the system via a controller 356 to provide further capabilities as needed.

Using the technique of concurrently transmitting message packets from the various processor modules, and prioritizing these message packets into a single or common message packet that is concurrently broadcast within a predetermined fixed time interval back to all processor modules, each processor that is on line can have equal access to other modules in the system. Because the global semaphore system using prioritized transaction numbers and readiness indications, as well as destination selection entries in the messages, permits any processor to act as controller, the system can function in either a hierarchical or non-hierarchical manner. It is highly significant that the system can be expanded, or contracted, without requiring software elaboration or modification.

Where access for messages substantially longer than those previously described but still relatively limited in length is required, this can still be accomplished. For example complex computer graphics systems (not shown may require access only to particular parts of an extensive data base to generate sophisticated two dimensional and three dimensional representations. A word processing system may need, from the data base, only small sequences of data at any one time because of the slowness of the human operator. In these and other situations the capability of the system for handling variable length messages and giving priority to continuation messages can be of benefit. While situations that call for concentrated processing power and extremely long message transfers impose limits on use of the system, there are other circumstances in which it functions to much greater advantage. Any dynamic situation involving the manipulation of different data forms and inherent sorting or merging functions falls in this category. Management decision making involving the gathering, collation and analysis of complex data is one such example, while the preparation and assembly of the visual and graphical input for a periodical is another.

Conclusion

It will be immediately evident to those skilled in the art that the system of FIG. 1 is expandable to incorporate any number of processors (up to a practical limit imposed by data transfer capacity) without any need for software modification. It will also be appreciated that the system circumvents in large measure the need for supervisory and overhead software to ascertain the status of units, to establish task and processor priorities and to assure efficient usage of processor capability.

Clear benefits are derived for data base systems and for other systems in which it is similarly feasible to subdivide the overall task into subtasks that can be processed independently. In the relational data base context for example a dramatic increase in secondary storage capacity requires only that the additional data base be properly integrated into the primary and backup structure Stated in another way, the network can be indefinitely expanded because being based upon a binary progression with standardized intersections or nodes there is no change with expansion in the functions performed at each individual node. Further, no setup sequence or external control of node operation is required. Consequently if a system in accordance with the invention is coupled as shown in FIG. 1 to serve as back-end processor for one or more host computers, the system user can arbitrarily expand (or contract) the data base without changing either operating system software or applications software. From the standpoint of the host processor system the back-end processor is transparent, whatever its configuration, because its interaction with the host processor remains the same. Conversion of the back-end processor to service a different host processor system requires only that the IFPs converse properly with the new host processor channel or bus.

The network configuration in one exemplification enables up to 1024 microprocessors to be used in a single array without excessive delay in transferring messages through the network or encountering undue delays due to interprocessor competition. Those skilled in the art will readily see how to extend the example described to more than 1024 processors. For a system using 1024 processors, the maximum line length between active nodes in a practical example is found to be 28 feet, which presents no problems in configuring an array. The delay introduced by the network is constant for all messages, and is $2\tau N$, where $\tau$ is the byte clock period and N is the number of tiers in the hierarchy. As is evident, doubling of the number of processors by adding another tier imposes only a minimal increase in the delay. Because data messages will necessarily be long (of the order of 200 bytes) and because the prioritizing is done during data transfer along the network with respect to all competing messages, the network can carry data messages with much higher utilization percentages than prior art systems.

Important economic and operative aspects of the system also derive from the fact that standardized active logic circuits are used instead of software or even firmware in the network system. Using modern LSI and VLSI techniques, reliable circuitry can be incorporated at low cost in relation to overall processor and peripheral equipment costs. Expenditures of time and money for software are limited to the important aspects that pertain to data base management or other problem-domain tasks. For example, the system organization is such that all of the functions needed to maintain the integrity of a data base can be carried out within the message packets and network configurations. Such functions as polling, change of status and recovery of data are provided for within the system.

An important further consideration is that this network compares very favorably to the conventional ohmic wire bus in its capability for rapid data transfer. Message packets are transmitted concurrently for a time, and transferred while priority is being determined, so that delays for conventional status requests, responses and priority determinations are avoided. Moreover, the inter-nodal couplings can be kept to less than a predetermined length, even for an extremely large number of processors, so that propagation time through the bus is not a limitation on data transfer rate.

It has been established that the system approaches the optimum in terms of efficiency of usage of the microprocessors and the network as well. What is important is that all microprocessors be kept busy and that the network be utilized to full advantage. The IFP-network-AMP configuration effectively makes this possible because microprocessors whose transmitted message packets lose in contention for priority simply retry at the earliest feasible time, thus helping to assure a high bus duty cycle. The high speed random access memories contribute further to this result, because they accumulate both input message packets to be processed and output messages to be transmitted, and thus a backlog of work is constantly available for each microprocessor and a backlog of message packets are also available for the network. When all input buffers are filled, a processor indicates that fact on the network. Further, when the input buffers used in an IFP to receive messages from a host computer are full, an indication to that effect is placed on the channel. Both internally and externally, therefore, the system is self pacing.

The system is realized in such a way, employing both the architecture and the message organization, as to carry out numerous other functions necessary to a versatile multiprocessor system. The prior art, for example, devotes considerable attention to schemes for assessing and monitoring changes in the status of the global resource. In accordance with the present invention, however, the parity channel alone is arranged and utilized as the means for communicating both the existence of parity errors and the fact of a change in processor availability. Shut down of one or more processors is substantially immediately communicated throughout the system such that an interrupt sequence can be initiated. Using the prioritized sort of responses, the nature of the change in global capability can be identified with far less circuity and system overhead than previously.

The single query, prioritized global response that is achieved by the use of global semaphores and the active logic network has profound systems implications. Obtaining an unambiguous global result by a broadcast query in this fashion bypasses any need for complex software and overhead. Distributed update and other status identifying operations can be realized even though numerous simultaneous operations are taking place at different processors.

The system also provides, by using the network, transaction numbers, global semaphores, and destination selection words, superior capabilities for distributing work and collecting results in a multiprocessor system. A number of multiprocessor modes and control messages are available and priority levels are easily defined and changed using only the priority protocol. The capability of simultaneously broadcasting to all processors, in conjunction with message sorting in the network, insures that any processor grouping or individual processor can be reached and that processed results can be derived in orderly fashion. Complex queries to a relational data base system can thus initiate any sequence needed for a data base operation.

Another advantage of the system lies in the redundancy which can readily be built into a multiprocessor, such as a relational data base system. Dual networks and dual interfaces provide redundancy which permits the system to continue to operate if one network fails for any reason. The distribution of the data base into disjoint primary and backup subsets reduces the probability of data loss to a minimal level. Where a failure or change does occur, the integrity of the data base can be maintained because of the versatile controls that can be used.

What is claimed is:

1. A multiprocessor system distributing a workload among individual processors and operating with low usage of executive software and inter-processor communication to provide an overall workload processing function divisible into parallel processing subtasks, comprising:

- at least one processor system providing tasks for processing in the form of task messages;
- interface processor means coupled to receive the task messages from the processor system and including means to transform the task messages into subtask request packets including information as to one or more appropriate recipients;
- a plurality of processor modules, each having assigned responsibilities with respect to the workload and each including circuit means responsive to the subtask request packets to determine whether the subtask is appropriate therefor, means for executing an appropriate subtask and means for providing a responsive task result packet after executing the subtask, the task result packet competing for priority with task result packets from at least one other processor module and with the subtask request packets from the interface processor means;
- bidirectional network means coupling the interface processor means to the processor modules and the processor modules to each other and including means for concurrently receiving the packets and for determining priority between contending packets and distributing each packet having priority concurrently to all processor modules, whereby the subtasks can be performed by the appropriate one or more processor modules without monitoring the operation of other processors or using software to determine routing for the packets.

2. The system as set forth in claim 1 above, wherein the subtask request packets include hash values characterizing the processing subtasks involved, and wherein the processor modules each comprises table lookup means responsive to the hash values included in a received request packet for recognizing the subtask represented by the request packet.

3. The invention as set forth in claim 2 above, wherein the table lookup means at each processor module comprise random access memory means defining disjoint portions of the workload processing function.

4. A multiprocessor system distributing a workload among individual processors and operating with low usage of executive software and inter-processor communication to provide an overall workload processing function divisible into parallel processing subtasks, comprising:

- at least one processor system providing tasks for processing in the form of task messages;
- interface processor means coupled to receive the task messages from the processor system and including means to transform the task messages into subtask request packets including information as to appropriate recipients;
- and hash values characterizing the processing subtasks involved;
- a plurality of processor modules, each comprising table lookup means responsive to the hash values for recognizing the subtask represented by a received subtask request packet, each table lookup means including random access memory means defining disjoint portions of the workload processing function and comprising means defining at least two random access memory sections at each processor module, one section storing data related to a primary function subset of the workload processing function, and the other section storing data related to a backup function subset of the workload processing function, wherein the backup function data for a given processor module duplicates portions of different primary function data for a number of the other processor modules, each processor module having assigned responsibilities with respect to the workload and each processor module including circuit means responsive to the subtask request packets to determine whether the subtask is appropriate therfor, means for executing an appropriate subtask and means for providing a responsive information packet after executing the subtask, the responsive information packet competing for priority with responsive information packets from at least one other processor module; and
- bidirectional network means coupling the interface processor means to the processor modules and the processor modules to each other and including means for determining priority between contending packets and distributing each packet having priority concurrently to all processor modules, whereby the subtasks can be performed by the appropriate processor modules without monitoring the operation of other processors or using software to determine routing for the packets.

5. The invention as set forth in claim 4 above, wherein each of the processor modules further comprise a secondary memory containing a portion of the data base for a data base management system.

6. The invention as set forth in claim 4 above, wherein the interface processor means comprises a number of interface processor modules, and the bidirectional network means comprises a plurality of active circuit nodes including means for merging packets from the processor modules into a succession of packets following a predetermined order of priority.

7. The invention as set forth in claim 6 above, wherein the active circuit nodes include control means for transferring such indication to the originating processor module.

8. The invention as set forth in claim 7 above, wherein the network means includes means for transferring messages between the interface processor means and the processor modules, and between the various processor modules with uniform delay in transfer, and wherein the processor modules include means for terminating transmission in response to an indication of unsuccessful transmission.

9. The invention as set forth in claim 8 above, wherein the responses have priorities related to each other and to the subtask request packets from the processor modules, and wherein the network means determine priorities between contending responses.

10. The invention as set forth in claim 9 above, wherein the contending packets, including responses, are concurrent in time, and wherein the processor modules each includes means for initiating packets, including responses, synchronously with other processor modules.

11. A multiprocessor system comprising:

at least one processor system comprising data transmission means, the processor system generating task messages on the data transmission means;

at least one interface processor coupled to the data transmission means to receive task messages from the processor system, and including means to couple request packets for one or more access module processors to an active bus means in response to the received task messages, the at least one interface processor also including means to receive processed information packets from the active bus means, and to provide received processed information from the processed information packet to the processor system on the transmission means;

a plurality of access module processors receiving the request packets from the active bus means and providing packets including processed information packets to the active bus means in response to the received request packets, the at least one interface processor and the access module processors providing packets to the active bus means that initiate concurrently; and active bus means intercoupling the at least one interface processor and the access module processors for concurrently receiving processed information packets from the access module processors and including means for determining priority between contending packets while uninterruptedly transferring the priority packet with a predetermined time delay to all of the interface processors and access module processors concurrently.

12. The invention as set forth in claim 11 above, wherein said active bus means comprises means for prioritizing contending packets solely in accordance with data content thereof.

13. The invention as set forth in claim 12 above, wherein said access module processors each comprises a secondary storage having a primary portion that stores a subset of a data base, and a backup portion that contains redundant portions of different subsets of the data base that are in other secondary storages.

14. A multiprocessor system comprising:
at least one processor system comprising data transmission means, the processor system generating task messages on the data transmission means;

at least one interface processor including means for providing request packets having destination criteria related to data base subsets stored in one or more access module processors in response to the received task messages, each interface processor being coupled to the data transmission means to receive the task messages from the processor system and to provide processed information packets to the processor system on the transmission means;

a plurality of access module processors, each comprising a secondary storage having a primary portion that stores a subset of a data base and a backup portion that contains redundant portions of different subsets of the database that are in other secondary storages, said access module processors each comprising circuit means for processing the destination criteria in received request packets to determine whether the received request packet is within range of data in the secondary storage for the access module processor, such that the data may be processed and a processed packet containing processed information may be delivered by the access module processor through active bus means to the processor system without prefatory intercommunication and the at least one interface processor and access module processors providing packets concurrently; and active bus means intercoupling the at least one interface processor and access module processors for receiving concurrent packets from the processors and including means for determining priority between contending packets solely in accordance with the data content thereof while uninterruptedly transferring the priority packet with a predetermined time delay to all of the interface processors and access module processors concurrently.

15. The invention as set forth in claim 14 above, wherein said interface processors each comprises a channel controller for communication with the processor system and the bus means comprises bidirectional means having a terminus including recirculation means for transferring packets from any interface processor or access module processor to all processors.

16. The invention as set forth in claim 15 above, wherein said bus means comprises a tree network having multiple active circuit nodes including base nodes which are coupled to the interface processors and access module processors, the nodes each including means for giving priority to messages in accordance with data content thereof.

17. A multiprocessor system for performing multiple data processing tasks in different individual processors within the system without the need for substantial software to determine routing, availability and priority status comprising:
means in each of the different individual processors for providing concurrently initiated competing message packets including priority determining commands and data;

spatially distributed network means connected to the different individual processors for receiving the concurrently initiated competing message packets and including a plurality of bidirectional active circuit means merging at a return circuit means, each of the active circuit means being responsive to the commands and data in the message packets to continue transfer through the network of those competing message packets having data content priority whereby multiple messages concurrently on the network are prioritized in the time and space domains and single message packets are returned on the network via the return circuit means; and the plurality of processors each including means responsive to the message packets for responding only to those message packets appropriate to the individual processor, each processor being coupled to the network means and providing processed messages thereto, whereby tasks are automatically accepted at the appropriate processors without requiring inter-processor communications or central determinations of priority and routing.

18. The invention as set forth in claim 17 above wherein the network means includes means for delivering message packets to all processors concurrently.

19. The invention as set forth in claim 18 above, wherein the network means further includes means for indicating loss of priority contention by a message packet on the network means to a transmitting processor.

20. The invention as set forth in claim 19 above, wherein the active circuit means comprises three port devices arranged in a tree and having two downstream ports for receiving contending message packets from different processors and means for determining priority between the contending message packets.

21. The invention as set forth in claim 20 above, wherein the means for indicating loss of priority comprises control lines coupled along the three port devices of the tree back to the processors, and wherein the processors terminate transmission of a losing message packet until the network is available to receive a next message packet.

22. The invention as set forth in claim 21 above, wherein the network means includes means for indicating to the processors an availability to receive message packets and wherein the processors include means for transmitting responses to the network means for prioritized distribution thereby, and further include means for attempting message packet transmission concurrently when the network means is again available.

23. The invention as set forth in claim 22 above, wherein the network means comprises a pair of redundant networks each having a plurality of active circuit means and wherein the processors are each coupled to both of the network means.

24. In a system having a number of processors communicating via an interconnect network, the combination comprising:
a number of buffer means, each corresponding to a different one of the processors and coupled to the corresponding processor, each buffer means including at least one dedicated map reference section storing information for determining whether data within a selection field of a message indicates that the message pertains to the corresponding processor individually or as part of a class;
the processors generating messages including a selection field for referencing the dedicated map reference section of the buffer means corresponding associated with all destination processors to which a message pertains;
a number of interface means, each corresponding to a different processor, coupled to the network, to the corresponding processor and to the buffer means the corresponding processor and responsive to a selection field of a received message for referencing the dedicated section in the buffer means associated with the corresponding processor to generate, in response to information stored therein, signals indicating to the corresponding processor whether the selection field specifies that the message is intended for the corresponding processor; and
interconnect network means coupling the processors to the interface means and the buffer means, the network means receiving competing messages from the processors and being responsive to data content of the competing messages for prioritizing the competing messages to deliver a preferred message all the interface means, such that the messages may reach corresponding processors without software interaction with the processors themselves.

25. The invention as set forth in claim 24 above, wherein the buffer means comprises a random access memory having a table lookup section defining the dedicated map reference section.

26. A system for controlling routing of messages between processors in multiprocessor system comprises:
means at each processor for providing a serial message train including destination criteria for a class of processors, which class may include one or more processors in selectable groupings, said means including means for initiating the serial message trains concurrently;
table lookup means at each processor including one or more dedicated sections storing information characterizing the local destination individually and as a member of a plural class;
means coupled to each of the processors for receiving concurrently initiated messages transmitted by the processors, for selecting a single priority message chosen in accordance with data content of the messages from the messages and for delivering to all of the processors the single priority message; and
means at each processor responsive to the destination criteria in the single priority message for addressing a section of the lookup means in response to the destination criteria, and determining from the characterizing information stored in the addressed section whether the particular processor is being addressed individually or as a member of a plural class by the priority message.

* * * * *